(12) United States Patent
DiMauro et al.

(10) Patent No.: US 12,087,176 B2
(45) Date of Patent: Sep. 10, 2024

(54) METHOD AND SYSTEM FOR CREATIVITY AND LEARNING EVALUATION AND ENHANCEMENT

(71) Applicant: Renzulli Learning, LLC, New Haven, CT (US)

(72) Inventors: Michael Nicholas DiMauro, West Haven, CT (US); Sukru Murat Cebeci, Istanbul (TR); Sally Reis Renzulli, Mystic, CT (US); Joseph S. Renzulli, Mystic, CT (US)

(73) Assignee: Renzulli Learning, LLC, New Haven, CT (US)

( * ) Notice: Subject to any disclaimer, the term of this patent is extended or adjusted under 35 U.S.C. 154(b) by 382 days.

(21) Appl. No.: 17/683,686

(22) Filed: Mar. 1, 2022

(65) Prior Publication Data
US 2023/0282133 A1 Sep. 7, 2023

(51) Int. Cl.
*G09B 23/02* (2006.01)
*G06F 18/22* (2023.01)
*G09B 5/08* (2006.01)

(52) U.S. Cl.
CPC ............ *G09B 23/02* (2013.01); *G06F 18/22* (2023.01); *G09B 5/08* (2013.01)

(58) Field of Classification Search
CPC . G09B 23/02; G09B 5/08; G09B 7/00; G09B 7/02; G09B 7/06; G09B 7/08; G06F 18/22
USPC .......................................................... 434/21
See application file for complete search history.

(56) References Cited

U.S. PATENT DOCUMENTS

2013/0266924 A1* 10/2013 Zelin ........................ G09B 7/00
434/362

OTHER PUBLICATIONS

Eunice M.L. Soriano De Alencar et al., "Theory and Practice of Creativity Measurement," year 2014 Rufrock Press Inc., 182 pages.*
Renzulli Learning Marketing E-mail, Aug. 13, 2018, 1 page.
Renzulli Learning Brochure, Sep. 2018, 24 pages.
Renzulli Learning Marketing Flyer, Oct. 2018, 1 page.
Renzulli Learning Marketing E-mail, Oct. 11, 2018, 1 page.
Renzulli Learning Brochure, Oct. 2019, 4 pages.

(Continued)

*Primary Examiner* — Pierre E Elisca
(74) *Attorney, Agent, or Firm* — Calfee, Halter & Griswold LLP

(57) ABSTRACT

The present invention relates to a method and system for evaluating and enhancing or improving the creativity and intelligence of a user. The creativity and intelligence of the user are evaluated by generating and evaluating mathematical representations of user answers to creativity and intelligence prompts. The mathematical representations may include positions, orientations, and scales of interactive visualization inputs and the answers may be evaluated based on the fluency, originality, elaboration, and flexibility of the answers to the prompts. The creativity and intelligence of the user are enhanced through generating user learning groups of users with similar creativity levels, generating interactive assignments, generating user workspaces for the user learning groups, verifying completed interactive assignments, and assessing the completed interactive assignments.

20 Claims, 22 Drawing Sheets

(56) References Cited

OTHER PUBLICATIONS

Renzulli Learning, "Creativity Assessment and Creativity Development," May 13, 2020, downloaded from: https://web.archive.org/web/20200513060531/https://renzullilearning.com/creativity/, 3 pages.

Renzulli Learning, "System Features," May 13, 2020, downloaded from: https://web.archive.org/web/20200513061612/https://renzullilearning.com/system-features/, 5 pages.

Kyung-Hee Kim, "Critique on the Torrance Tests of Creative Thinking," EPSY 7060 Assessment of Gifted Children and Youth (Dr. Bonnie Crammond, Fall 2002), 19 pages.

Thomas Kluyver et al., "Jupyter Notebooks—a publishing format for reproducible computational workflows," Positioning and Power in Academic Publishing: Players, Agents and Agendas, 2016, 4 pages.

Todd Lubart et al., "Creative Potential and its Measurement," International Journal for Talent Development and Creativity—1(2), Dec. 2013, 11 pages.

Adam Paszke et al., "PyTorch: An Imperative Style, High-Performance Deep Learning Library," 33rd Conference on Neural Information Processing Systems (NeurIPS 2019), Vancouver, Canada, 12 pages.

Eunice M.L. Soriano De Alencar et al., "Theory and Practice of Creativity Measurement," 2014 Prufrock Press Inc., 182 pages.

E. Paul Torrance, "Predicting the Creativity of Elementary School Children (1958-80)—and the Teacher Who "Made a Difference"," Gifted Child Quarterly, vol. 25, No. 2, Spring 1981, 8 pages.

Mark A. Runco et al., "Enyclopedia of Creativity," 3rd Edition, vol. 1, 2020 Elsevier Inc., 1514 pages.

James C. Kaufman et al., "The Cambridge Handbook of Creativity," 2nd Edition, Cambridge University Press 2019, 784 pages.

\* cited by examiner

METHOD AND SYSTEM FOR CREATIVITY AND LEARNING EVALUATION AND ENHANCEMENT

TECHNICAL FIELD

Aspects of the disclosed technology relate to a method and system for providing computer-based technologies to end-users for education and, more particularly, to systems and methods for testing, evaluating, scoring, and enhancing or improving creativity and intelligence.

BACKGROUND OF THE INVENTION

Education has existed for centuries. However, educational methods are often employed in-person in a class or group setting with a single lesson plan applying to all of the students or individuals in the class or group. As such, educational plans are often general and limited to the common interests and lowest aptitude of students or individuals in the class or group and collaborative opportunities are limited to the class or group. Additionally, educational lessons are limited to the languages understood by the teacher and students and are generally focused on memorizing facts instead of developing or improving intelligence or creativity. Further, accessibility to in-person education is often difficult in light of circumstances such as in remote or underserved geographical locations or during global pandemics.

Existing educational assessment tools have been used to measure or evaluate abilities and aptitudes, such as the intelligence quotient ("IQ") or creativity, of individuals. However, these tests are often culturally or linguistically biased, generally limited to intelligence testing, and require a significant amount of time to proctor and score. Notably, proctors and evaluators must be present and trained to administer, review, score, and evaluate test results, which requires time and resources. Additionally, evaluator availability is also limited based on time, language, and location. Furthermore, such evaluations are generally limited to the proctored language and the assumed knowledge base and may therefore be biased.

It is therefore appreciated that a need exists for an improved creativity and intelligence evaluation and development platform capable of quickly, accurately, and automatically evaluating and enhancing or improving a user's creativity and intelligence, that is objective, accessible, and globally collaborative. In view of the above, there is an unmet need for systems, methods, and apparatuses for testing, evaluating, scoring, and enhancing or improving creativity and intelligence.

SUMMARY

This summary is meant to provide some examples and is not intended to be limiting of the scope of the invention in any way. For example, any feature included in an example of this summary is not required by the claims, unless the claims explicitly recite the features. Also, the features, components, steps, concepts, etc. described in examples in this summary and elsewhere in this disclosure can be combined in a variety of ways. Various features and steps as described elsewhere in this disclosure can be included in the examples summarized here.

In one embodiment, a method for evaluating a creativity level of a user is disclosed. The method includes generating a prompt, generating an interactive visualization input based on the prompt, receiving user input related to modification of the interactive visualization input, generating a mathematical representation of the user input, generating a creativity evaluation score from the user input, and generating a creativity evaluation level output based on the creativity evaluation score.

In another embodiment, a system for testing a creativity level of a user is disclosed. The system includes an assessment engine including a processor and a memory, a user interface, a storage, a network, and a client. The assessment engine is operable to generate a creativity evaluation prompt, generate an interactive visualization prompt, generate a mathematical representation of an answer to the creativity evaluation prompt, evaluate the mathematical representation of the answer, and generate a creativity level output based on the evaluation of the mathematical representation of the answer.

In another embodiment, a method for enhancing or improving the creativity of a user is disclosed. The method includes obtaining a user creativity level, generating a user profile for the user, generating a user learning group for the user, generating an interactive assignment for enhancing or improving the creativity of the user learning group, generating a user workspace for the user learning group, verifying a completed interactive assignment, and assessing the completed interactive assignment.

Features that are described and/or illustrated with respect to one embodiment may be used in the same way or in a similar way in one or more other embodiments and/or in combination with or instead of the features of the other embodiments.

BRIEF DESCRIPTION OF THE DRAWINGS

In the accompanying drawings, which are incorporated in and constitute a part of the specification, embodiments of the invention are illustrated, which, together with a general description of the invention given above, and the detailed description given below, serve to exemplify embodiments of this invention. It will be appreciated that illustrated element boundaries (e.g., boxes, groups of boxes, or other shapes) in the figures represent only one exemplary embodiment of boundaries. In some embodiments, one element may be designed as multiple elements or that multiple elements may be designed as one element. In some embodiments, an element shown as an internal component of another element may be implemented as an external component and vice versa. Furthermore, elements may not be drawn to scale.

DETAILED DESCRIPTION

Figure 1:
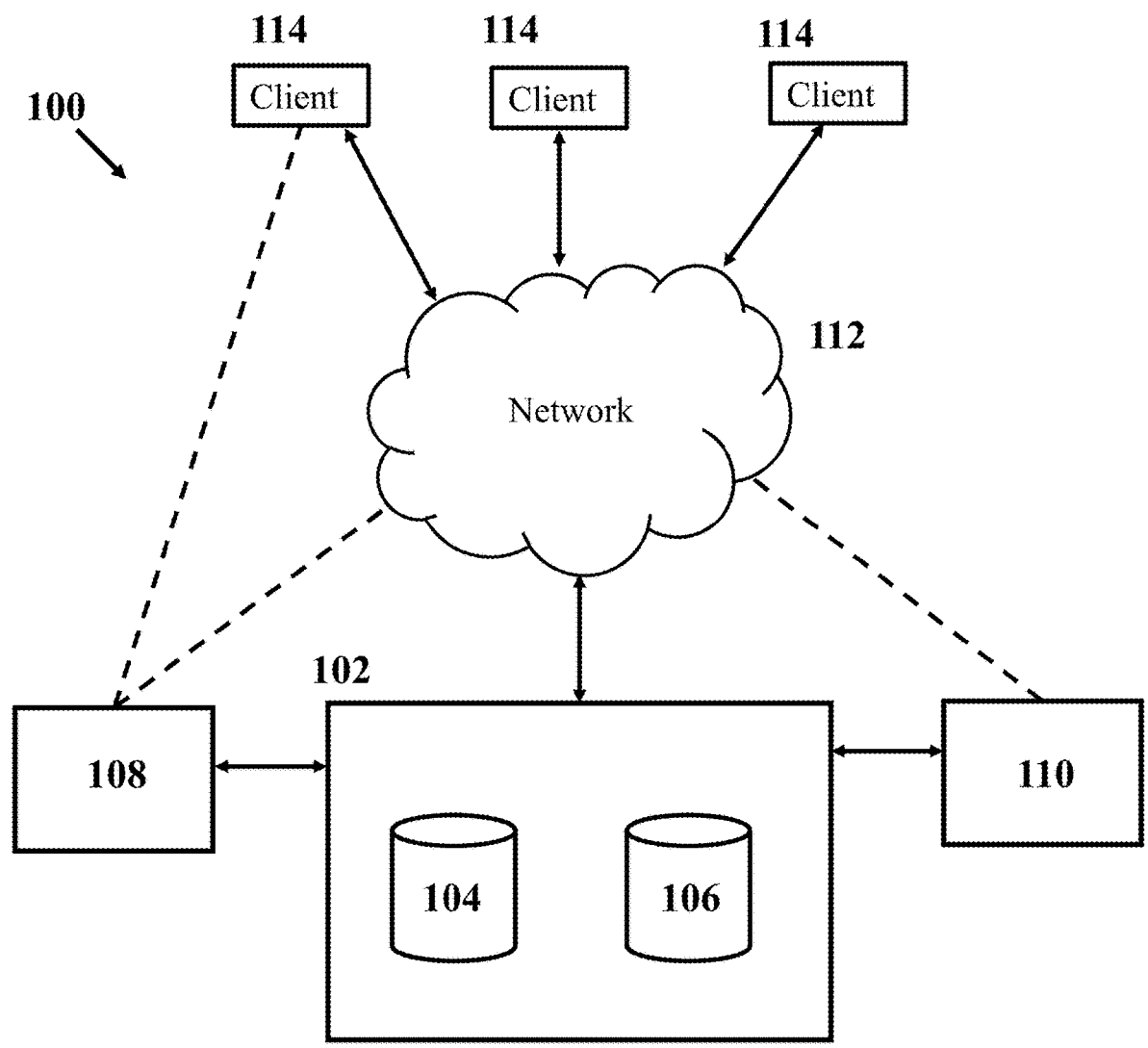
FIG. 1 shows an exemplary creativity assessment system.

The following includes definitions of exemplary terms that may be used throughout the disclosure. Both singular and plural forms of all terms fall within each meaning.

"Component," as used herein can be defined as a combination of hardware, software, or a portion thereof. A component may be associated with a device. It is appreciated that components may include at least a processor and a memory, wherein the processor is configured to execute one or more instructions stored in the memory.

"Computer" or "processor," as used herein includes, but is not limited to, one or more programmed or programmable electronic device or coordinated devices that can store, retrieve, and process data and may be any processing unit, distributed processing configuration, or processor systems. Examples of processor include microprocessors, microcontrollers, central processing units (CPUs), graphics processing units (GPUs), tensor processing unit (TPU), floating point units (FPUs), reduced instruction set computing (RISC) processors, digital signal processors (DSPs), field programmable gate arrays (FPGAs), etc., in any combination. One or more cores of a single microprocessor and/or multiple microprocessor each having one or more cores can be used to perform the operation as being executed by a processor herein. The processor can also be a processor dedicated to the training of neural networks and other artificial intelligence (AI) systems. The processor may be associated with various other circuits that support operation in the processor, such as random access memory (RAM), read-only memory (ROM), programmable read-only memory (PROM), erasable programmable read-only memory (EPROM), clocks, decoders, memory controllers, or interrupt controllers, etc. These support circuits may be internal or external to the processor or its associated electronic packaging. The support circuits are in operative communication with the processor. The support circuits are not necessarily shown separate from the processor in block diagrams or drawings.

"Network interface" or "data interface," as used herein includes, but is not limited to, any interface or protocol for transmitting and receiving data between electronic devices. The network or data interface can refer to a connection to a computer via a local network or through the internet and can also refer to a connection to a portable device—e.g., a mobile device or a USB thumb drive—via a wired or wireless connection. A network interface can be used to form networks of computers to facilitate distributed and/or remote computing (i.e., cloud-based computing). "Cloud-based computing" means computing that is implemented on a network of computing devices that are remotely connected to the device via a network interface.

"Signal," as used herein includes, but is not limited to, one or more electric signals, including analog or digital signals, one or more computer instructions, a bit or bit stream, or the like.

"Logic," synonymous with "circuit" as used herein, includes but is not limited to hardware, firmware, software and/or combinations of each to perform a function(s) or action(s). For example, based on a desired application or needs, logic may include a software-controlled microprocessor, discrete logic such as an application specific integrated circuit (ASIC), or other programmed logic device and/or controller. Logic may also be fully embodied as software.

"Software," as used herein includes, but is not limited to, one or more computer readable and/or executable instructions that cause a computer, processor, logic, and/or other electronic device to perform functions, actions, and/or behave in a desired manner. The instruments may be embodied in various forms such as routines, algorithms, modules, or programs including separate applications or code from dynamically linked sources or libraries (DLLs). Software may also be implemented in various forms such as a stand-alone program, a web-based program, a function call, a subroutine, a servlet, an application, an app, an applet (e.g., a Java applet), a plug-in, instructions stored in a memory, part of an operating system, or other type of executable instructions or interpreted instructions from which executable instructions are created.

"Module" or "engine" as used herein will be appreciated as comprising various configurations of computer hardware and/or software implemented to perform operations. In some embodiments, modules or engines as described herein may be represented as instructions operable to be executed by a processor in a processor or memory. In other embodiments, modules or engines as described herein may be represented as instructions read or executed from readable media. A module or engine may operate in either hardware or software according to application specific parameters or user settings. It will be appreciated by those of skill in the art that such configurations of hardware and software may vary, but remain operable in substantially similar ways.

"Data storage device," as used herein includes, but is not limited to, a device or devices for non-transitory storage of code or data, e.g., a device with a non-transitory computer readable medium. As used herein, "non-transitory computer readable medium" mean any suitable non-transitory computer readable medium for storing code or data, such as a magnetic medium, e.g., fixed disks in external hard drives, fixed disks in internal hard drives, and flexible disks; an optical medium, e.g., CD disk, DVD disk; and other media, e.g., ROM, PROM, EPROM, EEPROM, flash PROM, external memory drives, etc.

While the above exemplary definitions have been provided, it is Applicant's intention that the broadest reasonable interpretation consistent with this specification be used for these and other terms. Aspects and implementations of the present disclosure will be understood more fully from the detailed description given below and from the accompanying drawings of the various aspects and implementations of the disclosure. This should not be taken to limit the disclosure to the specific aspects or implementations, but explanation and understanding only.

The following description refers to the accompanying drawings, which illustrate specific embodiments of the present disclosure. Other embodiments having different structures and operation do not depart from the scope of the present disclosure. The descriptions of the invention do not limit the words used in the claims in any way or the scope of the claims or invention. The words used in the claims have all of their full ordinary meanings.

FIG. 1 shows an exemplary creativity and intelligence evaluation and enhancement system 100 of the present disclosure. The System 100 comprises at least an Assessment Engine 102 including at least a Processor 104 and a Memory 106 in data communication with one another. In exemplary embodiments, the Processor 104 may be configured to generate creativity and/or intelligence assessments, receive data from or responses to the creativity and/or intelligence assessments, generate representations of the responses to the creativity and/or intelligence assessments, evaluate said data or representations, and generate creativity and/or intelligence assessment outputs according to the data. The Processor 104 may be a single core processor, a multi-core processor, or other processor configuration as appreciated in the art. The Memory 106 is configured to store instructions which can be executed by the Processor 104. The Memory 106 of the Assessment Engine 102 may be RAM, ROM, DRAM, SDRAM, DDR SDRAM, flash memory, or any other memory configurable to store instructions to be executed by the Processor 104. The Processor 104 and Memory 106, either alone or in combination, may be configured to execute one or more computer readable instructions. The Assessment Engine 102 may include a data engine, computational engine, and/or processing logic.

The System 100 may also include a Storage 110 for long term storage of captured creativity evaluation prompts, creativity test data, creativity assessment answers, assessments, databases, assignments, educational plans, interactive assignments, answers to interactive assignments, etc. The Storage 110 may be any suitable data storage or memory device and may be in data communication with the Assessment Engine 102. It is appreciated that the data communication between the System 100 and the Storage 110 may be in real time or near real-time. In some embodiments, the Storage 110 is integrated within the Assessment Engine 102.

In exemplary embodiments, the Assessment Engine 102 is configured to evaluate, modify, transform, etc. input data from elsewhere in the System 100. In some embodiments, the Assessment Engine 102 is configured to automatically evaluate, modify, transform, etc. input data from elsewhere in the System 100. In some embodiments, the Processor 104 may be configured to implement various artificial intelligence ("AI") tools and techniques, enabling analysis of extremely large structured and/or unstructured and changing data sets, deductive or inductive reasoning, complex problem solving, and computer learning based on historical patterns, expert input, and feedback loops. "Artificial intelligence," as used herein, means a wide field of tools and techniques in the field of computer science that enable a computer to learn and improve over time. For example, the Processor 104 may implement one or more neural networks, such as an artificial neural network or a convolutional neural network, to employ various learning methods including, but not limited to, statistical learning, unsupervised learning, and reinforcement learning. The neural networks may be a plurality of interconnected software nodes or neurons that are arranged into a plurality of layers (e.g., input layers, hidden layers, and output layers). The neurons can have a many-to-many relationship with other nodes and each neuron may be configured to weight and perform calculations based on input data to ultimately calculate an output. The neural network may be trained based on a variety of inputs to adjust the node hierarchy such that the outputs of the neural network reach a desired level of accuracy.

Figure 18:
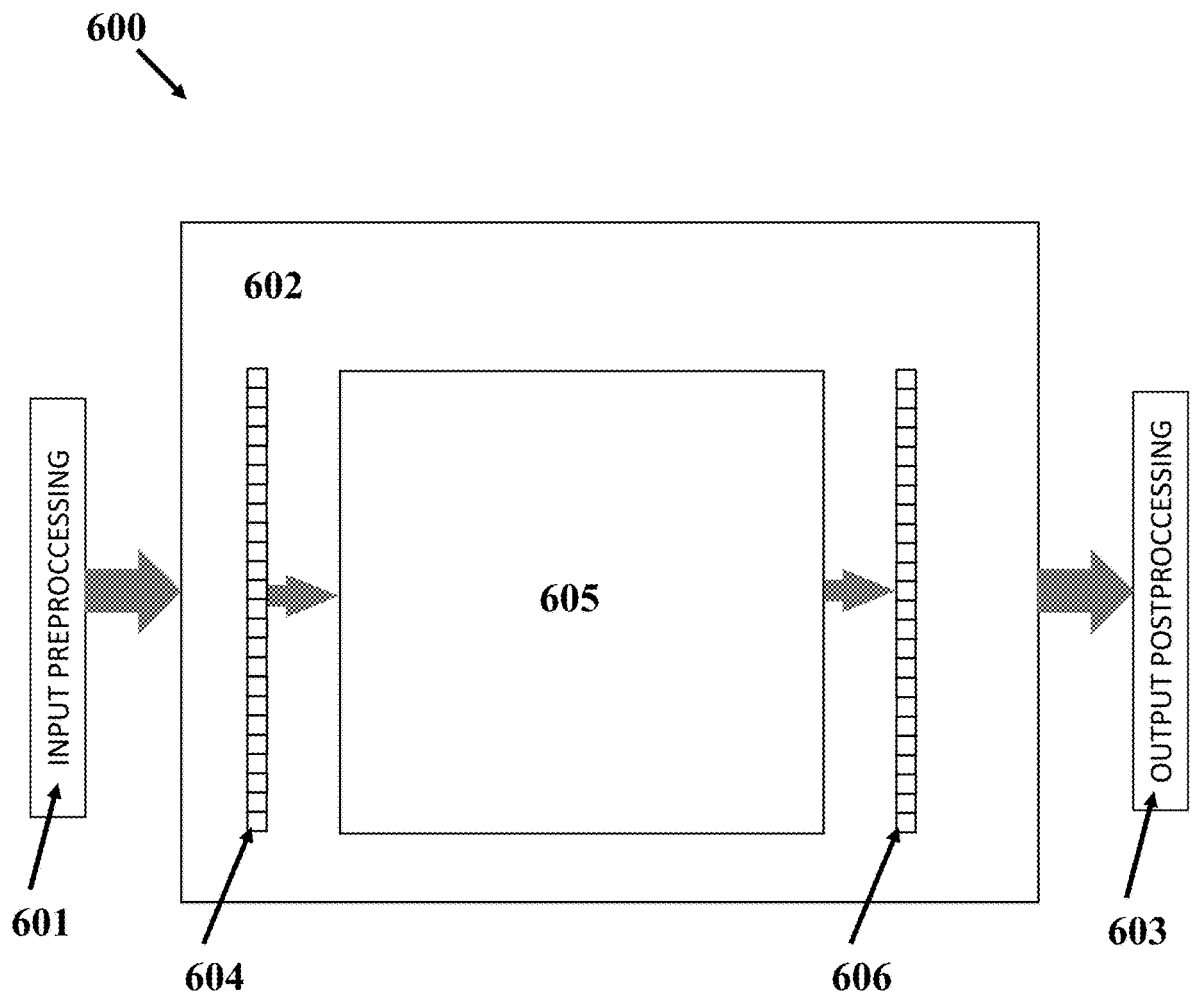
FIG. 18 shows an exemplary network architecture for use in the exemplary creativity assessment system of FIG. 1.

As shown in FIG. 18, the Processor 104 of the Assessment Engine 102 may be configured to implement a Processing Architecture 600, such as an artificial neural network, to employ various learning methods including, but not limited to, statistical learning, unsupervised learning, and reinforcement learning, to generate creativity and/or intelligence evaluation outputs based on answers provided by a user. The Processing Architecture 600 includes an Input Preprocessing Engine 601, a Calculation Engine 602, and an Output Postprocessing Engine 603 collectively configured to automatically process an input, such one or more answers provided by a user to a creativity evaluation prompt, automatically evaluate the input, such as determining the type, position, orientation, scale, and/or color of components of the input, generating evaluation scores of the components of the input, and automatically generate an output corresponding to the evaluation of the input, such as a creativity evaluation level output or score corresponding to one or more answers provided by a user to the creativity evaluation prompt.

The Input Preprocessing Engine 601 may be configured to receive one or more inputs, such as an image or representation of an answer to a creativity evaluation prompt, and preprocess, process, and/or reconfigure the inputs such that the one or more inputs may be received and evaluated by the Calculation Engine 602. The Input Preprocessing Engine 601 may be configured to automatically downscale, upscale, clean, cleanse, convert, integrate, transform, reduce, enhance, or otherwise configure or process inputs such that the Calculation Engine 602 may receive the inputs, evaluate the inputs, and generate one or more outputs corresponding to the evaluation of the inputs. For example, the Input Preprocessing Engine 601 may be configured to receive a two- or three-dimensional figure as an input and automatically downscale the figure according to a fixed ratio to improve the efficiency of the Calculation Engine 602 and/or reduce the resources necessary for evaluation by the Calculation Engine 602.

The Calculation Engine 602 may be configured to automatically receive one or more inputs from the Input Preprocessing Engine 601, evaluate or transform the inputs, and generate an output corresponding to the evaluation of the one or more inputs. For example, the Calculation Engine 602 may be configured to automatically generate a mathematical representation of one or more answers to a creativity evaluation prompt, evaluate the one or more answers, and generate a creativity evaluation level output corresponding to the fluency, originality, elaboration, and flexibility of the answers provided by the user, as described below. In some embodiments, the Calculation Engine 602 is configured to implement or employ an image recognition and classification neural network architecture. For example, the Calculation Engine 602 may implement or employ one or more convolutional neural networks (CNNs) with convolution using different size kernels, pooling (e.g., maximum, minimum, mean, or any other form), and fully connected layers in different configurations and combinations. Instead of or in addition to, the Calculation Engine 602 may be configured to implement or employ a transformers network structure.

The Calculation Engine 602 may include a plurality of evaluation or calculation layers, such an Input Layer 604, one or more Hidden Layers 605, and an Output Layer 606. The Input Layer 604, Hidden Layers 605, and Output Layer 606 may each include a plurality of interconnected nodes or neurons configured to process, weight, or evaluate one or more inputs according to node parameters and/or node hierarchies to ultimately generate or calculate an output. The nodes in the Input, Hidden, and Output Layers 604, 605, 606 may have a many-to-many relationship such that each node may receive as inputs the outputs of one or more nodes of the previous layer and may output a weighted parameter or calculation to one or more nodes in the successive layer which receive the weighted parameters or calculations as inputs. The weights, parameters, and hierarchy of the nodes may be determined or developed from training or historical data sets with known results and may be updated according to subsequent data. The node parameters, weights, and hierarchy may be trained to implement or employ image recognition, image classification, image analysis, and creativity level evaluation, such as described below.

In some embodiments, the Input Layer 604 receives the output of the Input Preprocessing Engine 601 as an input. For example, the Input Layer 604 may receive real, float, or binary values from the Input Preprocessing Engine 602, such as depending on whether the input received by the Input Preprocessing Engine 602 is in an image space or format (e.g., a two-dimensional image or a three-dimensional volumetric image) or in a vector space or format. In other embodiments, the Processing Architecture 600 may not include an Input Preprocessing Engine 601 and the Input Layer 604 of the Calculation Engine 602 may be configured to directly receive and process one or more inputs, such as answers to creativity and/or intelligence evaluation prompts. Each node of the Input Layer 604 may weight or evaluate some or all of input received, such as received directly or received from the Input Preprocessing Engine 601. The weighted or evaluated parameters of each node of the Input Layer 604 may be output to one or more nodes in the first Hidden Layer 605 as inputs.

The Hidden Layers 605 may be configured to automatically generate a mathematical representation of the input received by the Input Preprocessing Engine 601 and/or the Input Layer 604. The Calculation Engine 602 may include any number of Hidden Layers 605. The Hidden Layers 605 may be arranged such that the outputs of one Hidden Layer 605 may be the inputs of the next or successive Hidden Layer 605. Each node of the Output Layer 606 may receive as inputs the outputs of one or more of the nodes of the last Hidden Layer 605 and weight or evaluate the received inputs. The relationships, hierarchy, and weights of the nodes of the Hidden Layers 605 may be determined or updated according to sufficient training from historical with known results. The weighted or evaluated parameters of each node of the last Hidden Layer 605 may be output to one or more nodes in the Output Layer 606 as inputs. For example, the node weights, parameters, and hierarchies of the Hidden Layers 605 may be trained to generate a mathematical representation of one or more answers to a creativity evaluation prompt provided by a user, such as described below.

The Output Layer 606 of the Calculation Engine 602 may be configured to automatically generate, transform, or output a representation of the input received by the Input Preprocessing Engine 601 and/or Input Layer 604 and evaluated by the Hidden Layers 605. Each node of the Output Layer 606 may receive inputs corresponding to the weighted parameters of one or more nodes of the last Hidden Layer 605, weight or evaluate the inputs, and output weighted parameters or evaluations which may be used or combined to generate, transform, or output a representation of the evaluation of the Hidden Layers 605. The Output Layer 606 may include a different number or artificial nodes or neurons than the Input Layer 604 and/or Hidden Layers 605, such as depending on the format or representation of the input received by the Input Preprocessing Engine 601 and/or Input Layer 604. For example, the Output Layer 606 may be configured to automatically generate a dimensionality reduced representation of the input received by the Input Preprocessing engine 601 and/or Input Layer 604, as described below.

The Output Postprocessing Engine 603 may be configured to automatically process and/or postprocess one or more outputs from the Calculation Engine 602 and generate a creativity evaluation level output, such as described below. The Output Postprocessing Engine may receive as inputs the results, calculations, representations, or outputs from the Output Layer 606 to generate the creativity evaluation level output. The Output Postprocessing Engine 603 may also receive as inputs other information or values, such as the amount of time spent creating or preparing each answer to the creativity evaluation prompt. In some embodiments, the Output Postprocessing Engine 603 is configured to automatically generate a creativity evaluation level output according to the answers provided by the user and/or historical data, including historical answers or responses, known creativity and/or intelligence evaluations, and answers or responses corresponding to known creativity and/or intelligence evaluations. For example, the Output Postprocessing Engine 603 may be configured to automatically generate a frequency distribution of historical answers to creativity evaluation prompts and generate creativity outputs or scores of the answers provided by the user according to a comparison of the answers provided by the user to the frequency distribution of historical answers, as described below.

Referring back to FIG. 1, the System 100 may further include a User Interface 108 in data communication with the Assessment Engine 102. The User Interface 108 may also be in data communication with the Storage 110, a Network 112, and one or more Clients 114. The User Interface 108 may be a graphical or digital representation generated by the Assessment Engine 102 such that a user (e.g., Client 114) may interact with the Assessment Engine 102 via the User Interface 108. The User Interface 108 may be capable of being displayed on any digital display such as, but not limited to, a LCD, LED, OLED, monitor, television, cellular telephone, or tablet computer. In some embodiments, the User Interface 108 displays 3D images or videos which may be interpreted by a user with or without 3D glasses, or with or without additional hardware configured to assist in the interpretation of 3D image and video data. The Assessment Engine 102 may generate windows, images, prompts, commands, menus, forms, interactive modules, or other displays which may be displayed on or in the User Interface 108 and viewed and/or interacted with by a user, such as via one of the Clients 114. In several exemplary embodiments, the user interacts with, or edits, or displays, or performs actions with, or views, or adds/edits/replaces information on the User Interface 108.

The Assessment Engine 102, the Processor 104, the Memory 106, the User Interface 108, and the Storage 110 may be in data communication with one or more Networks 112 which may permit the Assessment Engine 102, the Processor 104, and the Memory 106 to operably communicate with each other or other components of the System 100. The Networks 112 may be any suitable wired or wireless communication system which may permit data communication between devices, computers, processors, hardware components, or other suitable components. For example, the Network 112 may be the Internet, intranet, wired connection, or any other suitable means for enabling operable communication between devices, computers, processors, hardware components, or other suitable components. The User Interface 108 and/or the Storage 110 may be directly in data communication with the Assessment Engine 102 and/or the User Interface 108 and/or the Storage 110 may be in data communication with the Assessment Engine 102 via the one or more Networks 112.

The System 100 may also include one or more Clients 114 in data communication and capable of operating or interacting with the User Interface 108 and/or the Assessment Engine 102 via the Network 112. Each Client 114 may be a computer, such as a PC, a mobile terminal, a mobile computing device, a cellular telephone, a tablet computer, a smart phone, a mobile data organizer or personal data assistant (PDA), or any other suitable device. Each Client 114 may include a processor, a memory, a display device capable displaying an image, and an input device capable of implementing user inputs or commands. The input device may allow the user to interact with the Client 114 and the User Interface 108, such as by inputting commands, selecting icons, accessing dialog boxes, typing, selecting dropdown options, navigating a page, or manipulating or adjusting a digital image. The input device may be a keyboard, mouse, stylus, microphone, speech processing means, touch screen, camera, motion sensor, motion tracker, or any other suitable means for inputting or interacting with a computer or mobile terminal as will be appreciated by those of skill in the art. The display may be a LCD, LED, OLED, monitor, television, telephone, tablet computer, virtual or augmented reality headset or glasses, or other compatible digital display configurations as will be appreciated by those of skill in the art. The display may be a standalone device operable to receive input from a variety of input devices such as a computer, tablet, phone, etc., or may be integrated with an input device. In some embodiments, the display is configured to display 3D images or videos which may be interpreted by a user with or without 3D glasses, or with or without additional hardware configured to assist in the interpretation of 3D image and video data. In certain embodiments, the display may comprise additional displays, or one or more displays configured in a display area.

In the illustrated embodiment, each Client 114 may interact with the Assessment Engine 102 and/or User Interface 108 via the Network 112. However, it will be appreciated that the System 100 may embody other configurations. For example, the Assessment Engine 102 and/or User Interface 108 may be incorporated on one or more of the Clients 114 such that the Client 114 may interact with the Assessment Engine 102 and/or User Interface 108 directly, without the Network 112.

In the illustrated embodiment, the System 100 includes three Clients 114. However, it will be appreciated that the System 100 may include any suitable number of Clients 114. For example, the System 100 may include one, two, or four or more Clients 114, each in data communication with the Network 112. In some embodiments, the Clients 114 may be operable without a connection to the Assessment Engine 102 and/or User Interface via the Network 112, such as in an offline mode, and later connected with the Assessment Engine 102 and/or User Interface via the Network 112, such as to input and/or upload answers to creativity and/or intelligence prompts created by the user or to input and/or upload interactive assignments completed by the user, as described below.

It is appreciated that the Assessment Engine 102, Processor 104, Memory 106, and Storage 110 may be configured as separate devices linked by a wireless or wired control signal, or integrated as a single device. It is further contemplated that the System 100 may be comprised of additional technical elements configured to collect, interpret, assess, and generate outputs from user creativity and intelligence evaluation and enhancement data including, but not limited to, a microphone, additional cameras, motion sensors, network or data interfaces, speakers, earphones, printers, etc.

It is appreciated that the Assessment Engine 102, User Interface 108, Storage 110, Network 112, and/or Clients 114 may be configured in combination with another or similar devices configured to capture, store, display, process, evaluate, or enhance creativity assessment or creativity development data. In certain embodiments, the exemplary creativity evaluation and development system 100 may further include additional components, including but not limited to, additional computing devices (e.g., servers, workstations, client workstations, routers, switches, controllers and various computing devices) and/or mobile devices.

In some embodiments, the Assessment Engine 102 may be operable to automatically generate a creativity and/or intelligence assessment of a user (e.g., Client 114). In some embodiments, the user may take the creativity and/or intelligence assessment via one of the Clients 114, such as through the User Interface 108. In other embodiments, the user may take some or all of the creativity and/or intelligence assessment separately from the Assessment Engine 102, Client 114, and/or User Interface 108 and input and/or upload the user's answers to the creativity and/or intelligence evaluation to the Client 114, User Interface 108, and/or Assessment Engine 102. For example, the user may form some or all answers to the creativity and/or intelligence assessment via handwriting or by positioning, assembling, manipulating, and/or otherwise configuring physical two- or three-dimensional shapes or objects and inputting the answers to the User Interface 108, and/or Assessment Engine 102 via one or more of the inputs of the Client 114, such as via webcams, cameras, two- or three-dimensional scanners, motion sensors, or other similar input devices.

Figure 2:
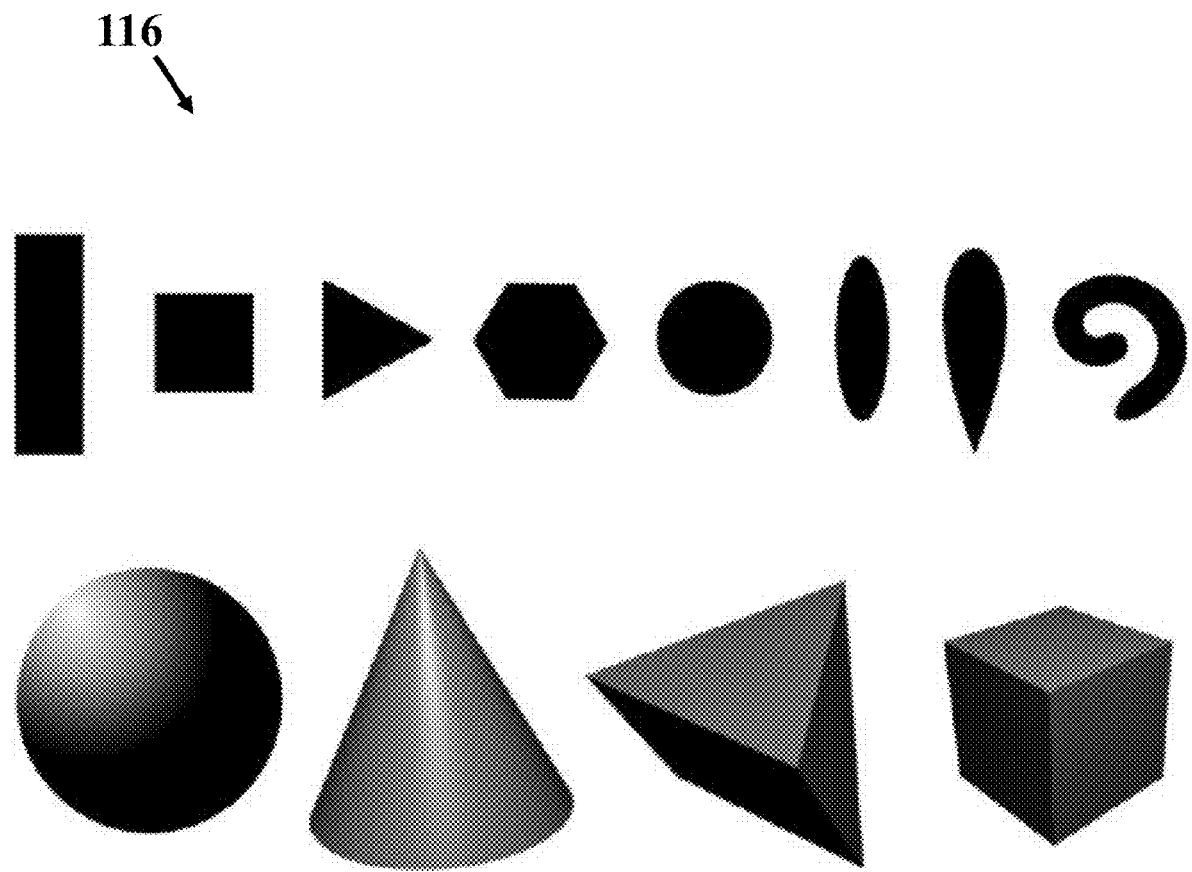
FIG. 2 shows example interactive visualization inputs.

In some embodiments, the Assessment Engine 102 may be associated with one or more Interactive Visualization Inputs 116 having predetermined sizes, shapes, and orientations. The Interactive Visualization Inputs 116 may be displayable to and manipulable by a user, such as through the User Interface 108, and/or may be physical shapes or objects which are provided to the user to form answers to one or more creativity and/or intelligence evaluation prompts. In some embodiments, the Interactive Visualization Inputs 116 may be generated and displayed on/in the User Interface 108 which may appear to a user on a display of one of the Clients 114. It is appreciated that visualization of the Interactive Visualization Inputs 116 may comprise a computer generated image overlaid on a reference or composite image received from a camera. The Interactive Visualization Inputs 116 may be a digitally generated shape, design, or image and may take the form of any suitable two- or three-dimensional shape design, or image such as those illustrated in FIG. 2. For example, each Interactive Visualization Input 116 may be a two-dimensional shape, such as, but not limited to, a rectangle, square, triangle, pentagon, hexagon, circle, oval, ellipse, petal, spiral, star, heart, semicircle, crescent, trapezium, cross, or arrow, a three-dimensional shape, such as a sphere, half sphere, cone, pyramid, cube, L-shape prism, cuboid, or cylinder, or any other suitable two- or three-dimensional shape, design, or image.

The one or more generated Interactive Visualization Inputs 116 generated by the Assessment Engine 102 and displayed on the User Interface 108 may be manipulated by a user, such as through the User Interface 108. In some embodiments, the Assessment Engine 102 may automatically generate one or more Interactive Visualization Inputs 116 in the User Interface 108. In some embodiments, once the Interactive Visualization Input 116 is generated, the user may use an input of the Client 114 to move, scale, rotate, or otherwise position the Interactive Visualization Input 116 through the User Interface 108. The user may manipulate the generated and displayed Interactive Visualization Input 116 by the input of the Client 114 captured via a keyboard, mouse, camera, microphone, motion sensor, or any other suitable input means as appreciated by those of skill in the art. For example, the Assessment Engine 102 may generate one or more Interactive Visualization Inputs 116 which may be displayed in a key or queue in the User Interface 108 and the user may use the input of one of the Clients 114 to select and drag one of the Interactive Visualization Inputs 116 into a user manipulable space or grid of the User Interface 108, such as an answer space or grid, in which the Assessment Engine 102 may generate a manipulated Interactive Visualization Input 116 correspondent to the input commands provided by the user. After the Interactive Visualization Input 116 is moved into the user manipulable space or grid, the user may manipulate the Interactive Visualization Input 116, such as, but not limited to, by positioning, rotating, scaling, coloring, or otherwise manipulating the shape, design, or image. After the Interactive Visualization Input 116 is moved or placed into the user manipulable space or grid of the User Interface 108, the Assessment Engine 102 may generate one or more other Interactive Visualization Inputs 116 in the key or queue and the process may be repeated such that the user manipulable space or grid of the User Interface 108 comprises multiple Interactive Visualization Inputs 116 generated by the Assessment Engine 102 and manipulated by the user. As detailed below, the user may position, rotate, scale, color, or otherwise manipulate Interactive Visualization Inputs 116 to form one or more answers to a creativity and/or intelligence task or prompt and thereby generate data indicative of any such answers.

Figure 4:
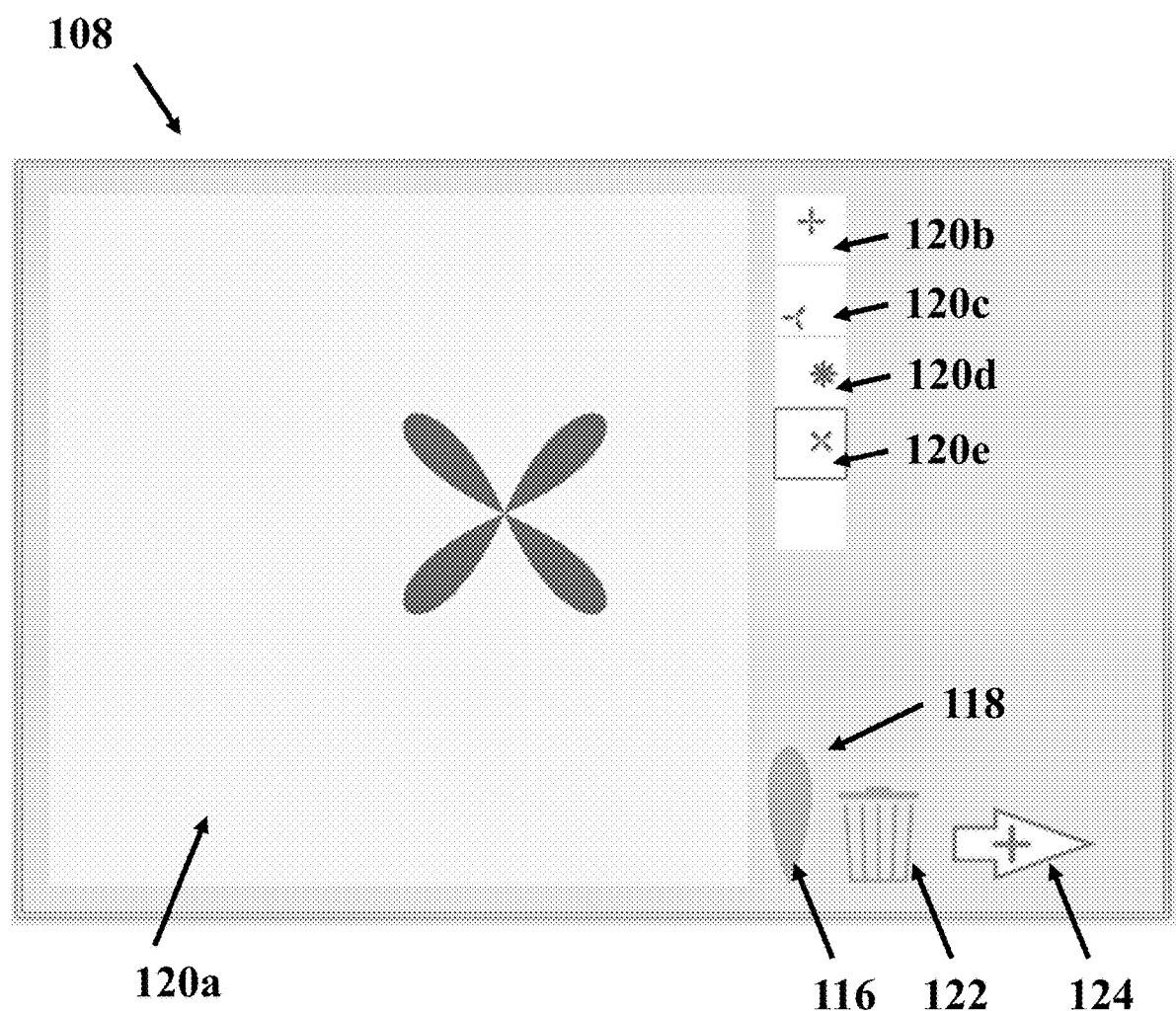
FIG. 4 shows an exemplary user interface display during a creativity and/or intelligence evaluation.

For example, as shown in FIG. 4, the User Interface 108 may be configured to display one or more Interactive Visualization Inputs 116 generated by the Assessment Engine 102 for a user to move, scale, rotate, color, or otherwise position, such as via an input of the Client 114. The user may drag one of the Interactive Visualization Inputs 116 generated by the Assessment Engine 102 in a Queue 118 in the User Interface 108 to a User Manipulable Space or Grid 120. In the illustrated embodiment, the Queue 118 contains one Interactive Visualization Input 116. However, it will be appreciated that the Queue 118 may include any number of different Interactive Visualization Inputs 116. The User Interface 108 may have any number of User Manipulable Spaces or Grids 120, which may be divided into sub-spaces or sub-grids. The user may then position, rotate, scale, color, or otherwise manipulate the Interactive Visualization Input 116 in a first User Manipulable Space or Grid 120a via input commands. The user may then drag one or more additional Interactive Visualization Inputs 116 from the Queue 118 into the first User Manipulable Space or Grid 120a and position, rotate, scale, or otherwise manipulate the additional Interactive Visualization Input(s) 116 to form an answer to a creativity and/or intelligence evaluation task or prompt, as described below. The user may also adjust the position, rotation, scale, color, or configuration of one or more Interactive Visualization Inputs 116 placed and configured in the first User Manipulable Space or Grid 120a.

After the user forms an answer in the first User Manipulable Space or Grid 120a, the user may indicate that the answer is complete and input a command via the Client 114, such as in the User Interface 108, to indicate that the answer is complete. The Assessment Engine 102 may be configured to create and/or generate a new User Manipulable Space or Grid 120, generate a new creativity and/or intelligence evaluation prompt, or terminate the creativity and/or intelligence assessment, as described below. In some embodiments, the user may indicate that the answer is complete and prompt the Assessment Engine 102 to generate a new User Manipulable Space or Grid 120 by selecting a Completion Indicator 124 in the User Interface 108 via the Client 114. For example, after the user has positioned one or more Interactive Visualization Inputs 116 in one of the User Spaces or Grids 120, the user may select the Completion Indicator 124 via an input of the Client 114 to prompt the Assessment Engine 102 to automatically generate a new User Manipulable Space or Grid 120. After the Assessment Engine 102 generates a new User Manipulable Space or Grid 120 in the User Interface 108, the user may drag and position, rotate, scale, color, or otherwise manipulate one or more Interactive Visualization Inputs 116 from the Queue 118 in the new User Manipulable Space or Grid 120 to form an additional answer to a creativity and/or intelligence evaluation prompt. The user may also select a previous User Manipulable Space or Grid 120 (e.g., 120b, 120c, 120d, 120e in FIG. 4) and adjust and/or readjust the position, rotation, scale, color, or configuration of any of the Interactive Visualization Inputs 116 contained in the previous User Manipulable Spaces or Grids 120. The user may remove one or more Interactive Visualization Inputs 116 from one of the User Manipulable Spaces or Grids 120 via a Removal Indicator 122 in the User Interface 108 which, when selected or interacted with, causes the Assessment Engine 102 to remove one or more Interactive Visualization Inputs 116 from one of the User Manipulable Spaces or Grids 120. For example, the user may select one of the Interactive Visualization Inputs 116 via the Client 114 and then select the Removal Indicator 122 to remove the Interactive Visualization Input 116 from the User Manipulable Space 120 or the user may drag the Interactive Visualization Input 116 from the User Manipulable Space 116 to the Removal Indicator 122 to remove the Interactive Visualization Input 116 from the User Manipulable Space 120. In some embodiments, the Removal Indicator 116 may allow the user to cause the Assessment Engine 102 to remove an indicated User Manipulable Space or Grid 120a, 120b, 120c, 120d, 120e such as by selecting a particular User Manipulable Space or Grid 120a, 120b, 120c, 120d, 120e and selecting the Removal Indicator 122 or by dragging the particular User Manipulable Space or Grid 120a, 120b, 120c, 120d, 120e to the Removal Indicator 122 in the User Interface 108.

In other embodiments, the Interactive Visualization Inputs 116 may be manipulable by a user separate from the User Interface 108, the Assessment Engine 102, and/or the Client 114. For example, the Interactive Visualization Inputs 116 may be physical two- or three-dimensional shapes, designs, or objects which may be provided to the user such that the user may position, rotate, manipulate, assemble, or otherwise configure the Interactive Visualization Inputs 116, such as by hand. The user may position, rotate, manipulate, assemble, or otherwise configure multiple Interactive Visualization Inputs 116 to form one or more answers to a creativity and/or intelligence task or prompt, as described below, and input and/or upload the one or more answers to the User Interface 108, Assessment Engine 102, and/or Client 114, such as via one or more of the inputs of the Client 114, such as via webcams, cameras, two- or three-dimensional scanners, motion sensors, or other similar input devices. For example, the user may position, rotate, manipulate, assemble, or otherwise configure multiple Interactive Visualization Inputs 116 to form one or more answers to a creativity and/or intelligence task or prompt and photograph, videotape, scan, or otherwise input and/or upload the one or more answers to the User Interface 108, Assessment Engine 102, and/or Client 114 via one or more inputs of the Client 114. Once input and/or uploaded, the User Interface 108, Assessment Engine 102, and/or Client 114 may generate digital representations of the one or more provided answers based on the input and/or upload from the Client 114. For example, the User Interface 108, Assessment Engine 102, and/or Client 114 may receive the one or more answers and the Assessment Engine 102 may generate digital representations of the answers in the User Interface 108 by converting the input and/or upload of the provided answers into a digital form similar to answers formed by users moving, scaling, rotating, or otherwise positioning Interactive Visualization Inputs 116 digitally generated in the User Interface 108 in the user manipulate space or grid of the User Interface 108. In some embodiments, the digital representations of provided answers generated by the Assessment Engine 102 and displayed in the User Interface 108 may be further manipulated by a user, such as via input commands from the Client 114, as described above. Data is generated that is indicative of any answers to the prompt and of any user manipulations of the prompt to create any such answers.

In some embodiments, the Assessment Engine 102 may automatically generate one or more creativity and/or intelligence tasks or prompts which may be displayed on the User Interface 108 for a user to complete. Each task or prompt may ask the user to manipulate one or more Interactive Visualization Inputs 116 to construct one or more answers or responses to the prompt, as described below. Each task or prompt may include one or more user manipulable spaces or grids corresponding with the task or prompt. In certain embodiments, the Assessment Engine 102 may generate a separate user manipulable space or grid in the User Interface 108, such as sub-spaces or sub-grids, for each answer or response the user has to the task or prompt. In other embodiments, the Assessment Engine 102 may generate a single user manipulable space or grid in the User Interface 108 for the task or prompt such that each of the user's answers or responses to the task or prompt may be separate. In other embodiments, the Assessment Engine 102 may generate one or more creativity and/or intelligence tasks or prompts which may be presented or provided to the user separately from the User Interface 108 and/or Client 114. For example, the Assessment Engine 102 may generate one or more creativity and/or intelligence tasks or prompts which may be printed out and provided to the user and provided along with physical two- or three-dimensional Interactive Visualization Inputs 116 for the user to form one or more answers to the one or more creativity and/or intelligence tasks or prompts.

In certain embodiments, the Assessment Engine 102 may be operable to automatically generate and implement a timer to control an amount of time that a user may access the User Interface 108 via one of the Clients 114 to take creativity and/or intelligence assessment. After the amount of time expires, the Assessment Engine 102 may disable the User Interface 108 or otherwise prevent the user from further answering or responding to the prompt of the creativity and/or intelligence evaluation, prevent the user from manipulating any of the Interactive Visualization Inputs 116 generated and displayed in the User Interface 108, and/or prevent the user from further accessing or answering or responding to the creativity and/or intelligence evaluation generated in the User Interface 108. For example, upon expiration of the timer, the Assessment Engine 102 may cause the User Interface 108 to terminate the current prompt or task of the creativity and/or intelligence evaluation and generate a new prompt or task in the User Interface 108 or the Assessment Engine 102 may cause the User Interface 108 to terminate the creativity and/or intelligence evaluation.

In some embodiments, the Assessment Engine 102 may be operable to automatically monitor and/or record the manner by which a user positions, rotates, scales, colors, assembles, or otherwise manipulates Interactive Visualization Inputs 116 to form one or more answers to one or more creativity and/or intelligence evaluation prompts. In certain embodiments, the Assessment Engine 102 may be operable to generate a record of each time a user positions, rotates, scales, colors, assembles, or otherwise manipulates one or more Interactive Visualization Inputs 116. For example, the Assessment Engine 102 may be operable to generate a unique timestamp including the time and change each time a user positions, rotates, scales, colors, assembles, or otherwise manipulates one or more Interactive Visualization Inputs 116, and the Assessment Engine 102 may be operable to separate the timestamps by answer and/or by prompt. In some embodiments, in addition or in the alternative, the Assessment Engine 102 may be operable to generate a recording or recreation of the process by which a user positions, rotates, scales, colors, assembles, or otherwise manipulates Interactive Visualization Inputs 116 to form one or more answers to one or more creativity and/or intelligence evaluation prompts. For example, the Assessment Engine 102 may be operable to generate a video or recording of the entire process by which a user positions, rotates, scales, colors, assembles, or otherwise manipulates Interactive Visualization Inputs 116, such as in the User Interface 108, to form one or more answers to one or more creativity and/or intelligence evaluation prompts. The Assessment Engine 102 may also be operable to generate separate videos or recordings for the process by which a user positions, rotates, scales, colors, assembles, or otherwise manipulates Interactive Visualization Inputs 116 to form each separate answer to each creativity and/or intelligence evaluation prompt. All of these types of data related to user interactions and manipulations are stored in the Memory 106 or Storage 110.

In some embodiments, the Assessment Engine 102 may be operable to automatically generate a creativity and/or intelligence evaluation output based on one or more answers or responses provided by a user via the User Interface 108 to one or more tasks or prompts generated by the Assessment Engine 102. The Assessment Engine 102 may be operable to automatically generate a digital representation, such as a mathematical representation, of each answer or response or groups or answers or responses provided by the user in response to the one or more tasks or prompts. The Assessment Engine 102 may be operable to automatically generate a creativity and/or intelligence evaluation output from the mathematical representations generated from the answers or responses provided by the user in response to the one or more tasks or prompts. For example, the Assessment Engine 102 may automatically generate the creativity and/or intelligence evaluation output indicative of the creativity and/or intelligence level of the user from the responses or answers provided by the user in the User Interface 108 based on one or more factors, such as, but not limited to, the fluency, originality, elaboration, and flexibility of the valid answers or responses provided by the user, as described below. In certain embodiments, the Assessment Engine 102 may compare or otherwise evaluate the user's answers or responses to the tasks or prompts to historical data, including historical answers or responses, known creativity and/or intelligence evaluations, and answers or responses corresponding to known creativity and/or intelligence evaluations, to determine, generate, and output the creativity and/or intelligence evaluation of the user.

In some embodiments, the Assessment Engine 102 may be operable to automatically generate a user profile for a user. The Assessment Engine 102 may generate the user profile based on the user's creativity and/or intelligence evaluation output, age, geographical location, education level, natural or native language, learning style(s), expression style(s), interests, skills, cognition, educational or mental abilities, or any other suitable information about a user as will be appreciated in the art. The user may input information about the user in the User Interface 108, such as through one of the Clients 114, and may input preferences, such as graphical or display preferences, which may update the user profile. Alternatively or in combination, the Assessment Engine 102 may generate the user profile based on historical information or data contained in the Storage 110 or from any other suitable location. The Assessment Engine 102 may alter the User Interface 108, such as the display of the User Interface 108, based on the user profile of a user. For example, the Assessment Engine 102 may translate the User Interface 108 such that it displays in the native language of the user and/or the User Interface 108 may alter the display or font of the User Interface 108 based on one or more learning or expression style of the user, such as if the user has dyslexia.

In some embodiments, the Assessment Engine 102 may be operable to automatically generate a creativity and/or intelligence enhancement module for one or more users to enhance one or more areas of creativity and/or intelligence of the users. The creativity and/or intelligence enhancement module may comprise learning or educational modules unique to the user, which may include educational assignments, tasks, evaluations, or programs, to enhance the creativity and/or intelligence of the user. The Assessment Engine 102 may generate the creativity and/or intelligence enhancement module based, in part, on the creativity and/or intelligence evaluation output generated by the Assessment Engine 102. In some embodiments, the Assessment Engine 102 may also generate the creativity and/or intelligence enhancement module based on any other suitable factor to an individual, alone, in combination with the creativity and/or intelligence evaluation output, or in any combination thereof. For example, the Assessment Engine 102 may generate the creativity and/or intelligence enhancement module for a user also based on the user's interests, skills, native language, educational level, educational progress, learning style(s), expression style(s), and/or any other suitable factor, as described below. The Assessment Engine 102 may also generate the creativity and/or intelligence enhancement module for a user to enhance identified areas of creativity and/or intelligence, such as areas of creativity and/or intelligence in which the user scored below a certain threshold or lower during the creativity and/or intelligence evaluation assessment.

In some embodiments, the Assessment Engine 102 may be operable to automatically generate an evaluator interface in the User Interface 108 for an administrative user, such as a teacher, instructor, or evaluator of one or more users. The evaluator interface may allow a teacher, instructor, or evaluator accessing the User Interface 108 via one of the Clients 114 to facilitate, monitor, track, and evaluate the creativity and/or intelligence enhancement of one or more users. For example, the teacher, instructor, or evaluator may access the user profile, creativity and/or intelligence evaluation output, and creativity and/or intelligence enhancement module of each user in the teacher's class or group and may access, edit, mark-up, grade or otherwise evaluate materials submitted by the users in the teacher's class, as described below. The Assessment Engine 102 and User Interface 108 may also be operable to generate a class environment by which the teacher via one of the Clients 114 may teach or instruct or communicate with one or more users via one of the Clients 114, such as by generating a video call or conference between the Clients 114. In certain embodiments, the Assessment Engine 102 and/or User Interface 108 may prevent the teacher, instructor, or evaluator from accessing or communicating with users or Clients 114 that the teacher does not have access to, such as users or Clients 114 not in the teacher's class.

In some embodiments, the Assessment Engine 102 may be operable to automatically generate a secure presentation environment which may be displayed via the User Interface 108 and viewed from one or more Clients 114 with permissions provided by the Assessment Engine 102 and/or User Interface 108. The secure presentation environment may be operable to display or completed interactive assignments via the User Interface 108 to one or more users with enabled permission via one or more Clients 114. For example, one of the users may submit an assignment or project, such as a completed interactive assignment, to the secure presentation environment which may be accessed through the User Interface 108 by one of the Clients 114 with the requisite permission. The user may limit the access of the submission to the secure presentation environment to users or Clients 114 in the class, district, region, state, country, or other suitable group. Alternatively, the user may select that the submission may be viewed or accessed by any Client 114 connected to the Network 112.

Figure 3:
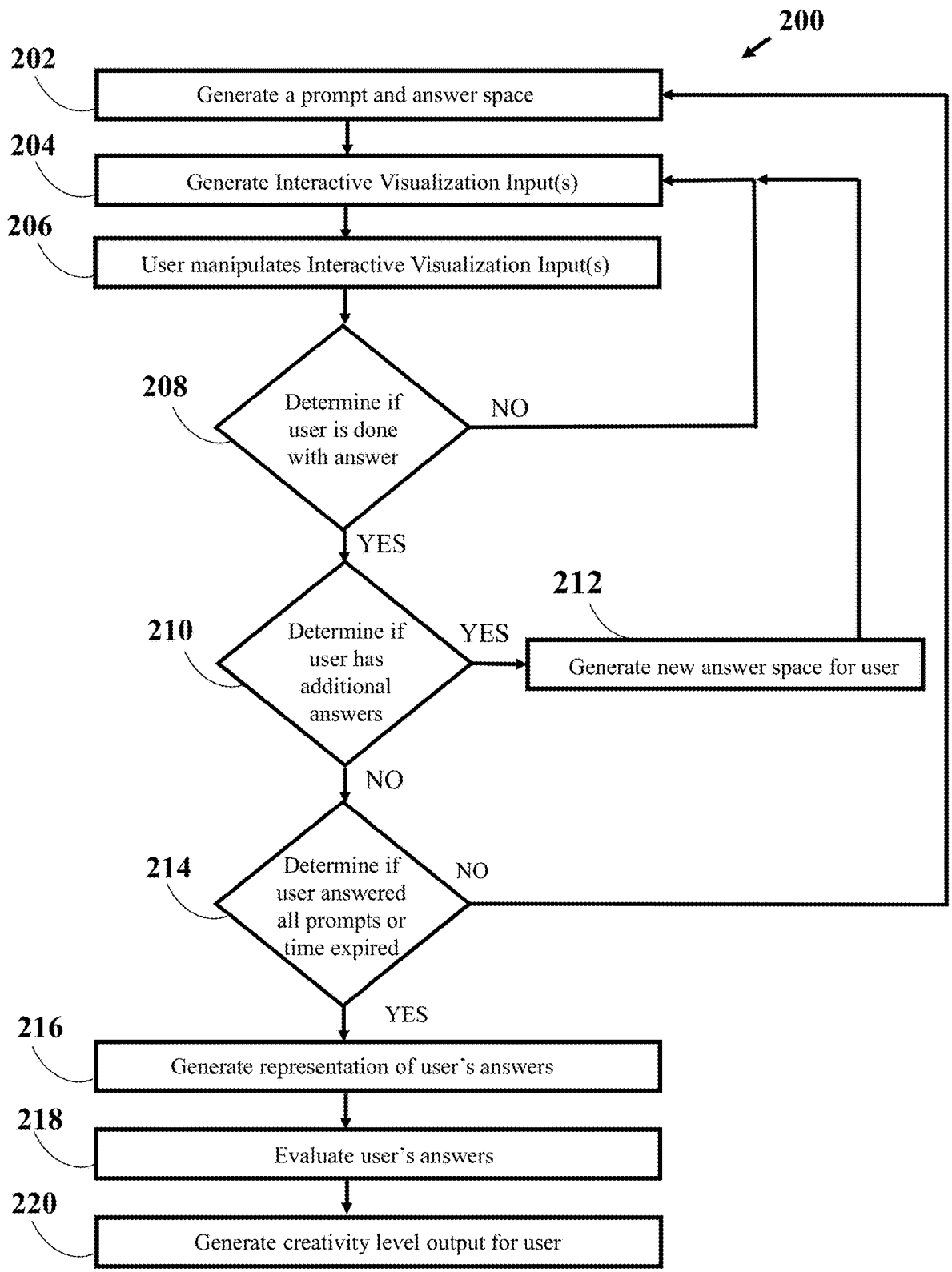
FIG. 3 shows an exemplary method for generating a creativity and/or intelligence level output for a user.

FIG. 3 shows steps according to an exemplary method 200 for generating a creativity and/or intelligence level output for a user. It will be appreciated that the illustrated method and associated steps may be performed in a different order, with illustrated steps omitted, with additional steps added, or with a combination of reordered, combined, omitted, or additional steps. The steps may be implemented in one or more computer readable instructions, such as by the Assessment Engine 102.

At step 202, a creativity and/or intelligence evaluation prompt and one or more corresponding answer spaces may be generated. The creativity and/or intelligence evaluation prompt may be any question or task which may test or assess the creativity and/or intelligence of a user. In some embodiments, the Assessment Engine 102 may be operable to automatically generate a prompt for a user to answer which may be displayed on the User Interface 108 and viewed by a user via one of the Clients 114. The Assessment Engine 102 may generate a unique prompt or may select from one of a number of stored or historical prompts, such as a prompt stored in the Storage 110. The prompt may ask the user a question or ask the user to complete a task. The prompt may be any suitable question or task to test the creativity and/or intelligence of a user. For example, the prompt may ask the user the user to, using one or more Interactive Visualization Inputs 116, create or draw as many of the following designs, items, or figures as possible: flowers, birds or animals (such as a specific type of bird or animal), buildings, vehicles, trees, robots, fish, fruits, or hats.

In other embodiments, the Assessment Engine 102 may generate one or more creativity and/or intelligence evaluation tasks or prompts which may be presented and/or provided to the user separately from the User Interface 108 and/or Client 114. For example, the Assessment Engine 102 may generate one or more creativity and/or intelligence tasks or prompts which may be printed out and provided to the user. The provided creativity and/or intelligence evaluation tasks or prompts may be any of the creativity and/or intelligence evaluation prompts which may be automatically generated, displayed on the User Interface 108, and viewed by a user via one of the Clients 114 as described above.

At step 204, one or more Interactive Visualization Inputs 116 may be generated for the user to manipulate to create an answer or response to the creativity and/or intelligence evaluation prompt. In some embodiments, the Assessment Engine 102 may be operable to automatically generate one or more Interactive Visualization Inputs 116 for the user to manipulate or otherwise use to form an answer to the prompt and the Interactive Visualization Inputs 116 may be generated and displayed in the User Interface 108 and viewed by the user via one of the Clients 114. In certain embodiments, the Interactive Visualization Inputs 116 generated by the Assessment Engine 102 may be displayed in a key or queue in the User Interface 108. The Interactive Visualization Inputs 116 may be digitally generated two- or three-dimensional shapes, designs, or images with known sizes, shapes, and orientations. Depending on the prompt, the Assessment Engine 102 may generate any number or types of Interactive Visualization Inputs 116. In some embodiments, the Assessment Engine 102 may be operable to generate one Interactive Visualization Input 116 in the User Interface 108 for the creativity and/or intelligence evaluation prompt. In other embodiments, the Assessment Engine 102 may generate two or more Interactive Visualization Inputs 116 for the creativity and/or intelligence evaluation prompt.

For example, as shown in FIG. 4, the Assessment Engine 102 may generate one or more Interactive Visualization Inputs 116 in the Queue 118 in the User Interface 108. In the illustrated embodiment, the Queue 118 contains one Interactive Visualization Input 116. However, it will be appreciated that the Queue 118 may include any number of different Interactive Visualization Inputs 116.

In other embodiments, one or more Interactive Visualization Inputs 116 may be generated and provided to the user separately from the Assessment Engine 102, User Interface 108, and/or Client 114. For example, the Interactive Visualization Inputs 116 may be physical two- or three-dimensional shapes, designs, or objects which may be provided to the user such that the user may position, rotate, manipulate, assemble, or otherwise configure the Interactive Visualization Inputs 116, such as by hand. The physical two- or three-dimensional may be physical representations of any of the Interactive Visualization Inputs 116 described above which may be physically positioned, rotated, assembled, combined, interlocked, or otherwise manipulated by a user to form an answer to a creativity and/or intelligence evaluation prompt. Any of the user manipulations of the prompt and answers to the prompt create data stored in memory that is indicative of such manipulations or answers.

As shown in FIG. 3, at step 206, the user may manipulate the one or more Interactive Visualization Inputs 116 to create an answer or response to the creativity and/or intelligence evaluation prompt. In some embodiments, the Assessment Engine 102 may be operable to permit the user to manipulate the one or more Interactive Visualization Inputs 116 displayed in the User Interface 108 via an input of one of the Clients 114. Using the input of the Client 114, the user may move one of the Interactive Visualization Inputs 116 displayed in the User Interface to a user manipulate space or grid of the User Interface 108. In certain embodiments, the user may utilize the input of the Client 114 to move one of the Interactive Visualization Inputs 116 from the key or queue of the User Interface 108 to an answer space or grid of the User Interface 108, such as a user manipulable space or grid. After the Interactive Visualization Input 116 is moved into the user manipulable space or grid, the user may utilize the input of the Client 114 to manipulate the Interactive Visualization Input 116 in the User Interface 108, such as by positioning, repositioning, rotating, scaling, coloring or otherwise manipulating the Interactive Visualization Input 116 as will be appreciated by those of skill in the art. The Assessment Engine 102 may generate and display one or more Interactive Visualization Inputs 116 in the user manipulable space or grid of the User Interface 108 according to the user manipulations via the Client 114. In some embodiments, the Assessment Engine 102 may also be configured to monitor and/or record the process by which a user process by which a user positions, rotates, scales, colors, assembles, or otherwise manipulates Interactive Visualization Inputs 116 to form one or more answers to one or more creativity and/or intelligence evaluation prompts, such as by recording timestamps or videos of the manipulations. For example, as shown in FIG. 4, the user may drag one of the Interactive Visualization Inputs 116 from the Queue 118 into a User Manipulable Space or Grid 120, such as the first User Manipulable Space or Grid 120*a*. The user may then position, rotate, scale, color, or otherwise manipulate the Interactive Visualization Input 116 in the User Manipulable Space or Grid 120 via input commands from the input of the Client 114.

In other embodiments, the Interactive Visualization Inputs 116 may be manipulable by a user separately from the User Interface 108, the Assessment Engine 102, and/or the Client 114. For example, the Interactive Visualization Inputs 116 may be physical two- or three-dimensional shapes, designs, or objects which may be provided to the user such that the user may position, rotate, manipulate, assemble, or otherwise configure the Interactive Visualization Inputs 116, such as by hand. The user may position, rotate, manipulate, assemble, combine, interlock, or otherwise configure multiple Interactive Visualization Inputs 116 to form one or more answers to a creativity and/or intelligence task or prompt, as described below, and input and/or upload the one or more answers to the User Interface 108, Assessment Engine 102, and/or Client 114, such as via one or more of the inputs of the Client 114. For example, the user may position, rotate, manipulate, assemble, or otherwise configure multiple Interactive Visualization Inputs 116 to form one or more answers to a creativity and/or intelligence task or prompt and photograph, videotape, scan, or otherwise input and/or upload the one or more answers to the User Interface 108, Assessment Engine 102, and/or Client 114 via one or more inputs of the Client 114. Once input and/or uploaded, the User Interface 108, Assessment Engine 102, and/or Client 114 may generate digital representations in the User Interface 108 of the one or more answers based on the input and/or upload from the Client 114. For example, the User Interface 108, Assessment Engine 102, and/or Client 114 may receive the one or more answers and the User Interface 108 may generate digital representations of the answers by converting the input and/or upload of the one or more answers into a digital form similar to answers formed by users moving, scaling, rotating, or otherwise positioning Interactive Visualization Inputs 116 digitally generated in the User Interface 108 in the user manipulate space or grid of the User Interface 108.

At step 208, it may be determined whether the user has completed his or her answer or response to the creativity and/or intelligence evaluation prompt. In some embodiments, the Assessment Engine 102 may be operable to automatically determine whether the user is done with the answer to the prompt. In certain embodiments, after the user has manipulated the Interactive Visualization Input 116, the Assessment Engine 102 may generate an alert or prompt in the User Interface 108 that the user may select, respond to, or otherwise interact with via the Client 114 to indicate that the user is done with the answer to the prompt. For example, the Assessment Engine 102 may generate a drop down menu or selectable button in the User Interface 108 which the user may select via the input of the Client 114 to indicate that the user is done with the answer to the prompt. If the Assessment Engine 102 determines that the user is done with the answer to the prompt, the Assessment Engine 102 may move to step 210. As shown in FIG. 4, the user may select the arrow button in the bottom-right of the User Interface 108 to indicate that the user is done with the answer to the prompt. In other embodiments, the Assessment Engine 102 may determine that the user is done with the answer to the prompt when the user inputs and/or uploads one or more answers to the User Interface 108, Assessment Engine 102, and/or Client 114 via one or more inputs of the Client 114 and the User Interface 108, Assessment Engine 102, and/or Client 114 generates digital representations in the User Interface 108 of the one or more answers based on the input and/or upload from the Client 114.

If the Assessment Engine 102 determines that the user is not done with the answer to the prompt, the Assessment Engine 102 may go back to step 204 and generate one or more additional Interactive Visualization Inputs 116 in the User Interface 108 which the user may manipulate via the input of the Client 114. The additional Interactive Visualization Inputs 116 may be the same as or different from the Interactive Visualization Inputs 116 previously generated in the User Interface 108. The user may manipulate the additional Interactive Visualization Inputs 116 generated and displayed in the User Interface 108 as previously described. For example, the user may manipulate the additional Interactive Visualization Inputs 116 in the user manipulable space or grid of the User Interface 108 such that the generated Interactive Visualization Inputs 116 displayed in the user manipulable space of the User Interface 108 may collectively form a design, shape, or image corresponding to an answer to the prompt generated by the Assessment Engine 102. In certain embodiments, the user may manipulate any Interactive Visualization Inputs 116 previously placed, manipulated, generated, and/or displayed in the user manipulable space or grid of the User Interface 108 along with any subsequently generated, displayed, and manipulated Interactive Visualization Inputs 116. As shown in FIG. 4, the user may drag one or more additional Interactive Visualization Inputs 116 from the Queue 118 into the User Manipulable Space or Grid 120 and position, rotate, scale, or otherwise manipulate the additional Interactive Visualization Input(s) 116 to form an answer to the creativity and/or intelligence evaluation task or prompt. Using inputs of the Client 114, the user may also adjust the position, rotation, scale, color, or configuration of one or more Interactive Visualization Inputs 116 placed and configured in the User Manipulable Space or Grid 120. In some embodiments, the user may also remove or delete one or more Interactive Visualization Inputs 116 that have been placed in the User Manipulable Space or Grid 120. For example, the user may prompt the Assessment Engine 102 to remove or delete one or more Interactive Visualization Inputs 116 in the User Manipulable Space or Grid 120 by selecting the Interactive Visualization Inputs 116 via the Client 114 and then selecting the Removal Indicator 122 or the user may drag the one or more Interactive Visualization Inputs 116 to the Removal Indicator 122 in the User Interface 108.

In some embodiments, the Assessment Engine 102 may limit the number of Interactive Visualization Inputs 116 which may be positioned or manipulated in the User Manipulable Space or Grid 120. For example, the Assessment Engine 102 may limit the number of Interactive Visualization Inputs 116 which may be positioned or manipulated in the User Manipulable Space 120 to a maximum number of Interactive Visualization Inputs 116, such as between 100 and 300, such as 200. If the Assessment Engine 102 determines that the maximum number of Interactive Visualization Inputs 116 have been placed in the User Manipulable Space or Grid 120, the Assessment Engine 102 may prevent the user from adding additional Interactive Visualization Inputs 116 to the User Manipulable Space or Grid 120 and/or may proceed to step 210.

As shown in FIG. 3, at step 210, it may be determined whether the user has additional answers or responses to the creativity and/or intelligence evaluation prompt. In some embodiments, the Assessment Engine 102 may be operable to automatically determine whether the user has additional answers to the prompt. In certain embodiments, the Assessment Engine 102 may generate an alert or prompt in the User Interface 108 that the user may select, respond to, or otherwise interact with via the Client 114 to indicate whether the user has additional answers to the prompt. For example, the Assessment Engine 102 may generate a drop down menu or selectable button in the User Interface 108 which the user may select via the input of the Client 114 to indicate whether the user has additional answers to the prompt. In other embodiments, the Assessment Engine 102 may determine that the user does not have additional answers to the prompt when the user does not have additional answers to input and/or upload to the Assessment Engine 102, User Interface 108, and/or Client 114 in response to the creativity and/or intelligence evaluation prompt. If the Assessment Engine 102 determines that the user does not have additional answers to the prompt, the Assessment Engine may proceed to step 214. If the Assessment Engine 102 determines that the user has additional answers to the prompt, the Assessment Engine may proceed to step 212.

In step 212, a new answer space, such as a user manipulable space or grid, may be generated for the user to create additional answers or responses to the creativity and/or intelligence evaluation prompt. In some embodiments, the Assessment Engine 102 may be operable to automatically generate a new user manipulable answer space or grid in the User Interface 108 for the user to create or provide an additional answer to the creativity and/or intelligence evaluation prompt generated by the Assessment Engine 102. In certain embodiments, the Assessment Engine 102 generates a separate user manipulable space or grid, such as a sub-space or sub-grid, for the additional answer to the prompt. The additional user manipulable space generated in the User Interface 108 may be separate or distinct from the user manipulable space or spaces in the User Interface 108 in which the user manipulated Interactive Visualization Inputs 116 in the previous answer(s) to the prompt. It will be appreciated that the new user manipulable answer space in the User Interface for the additional answer may not be distinct or separate from the user manipulable answer spaces in the User Interface in which the user manipulated Interactive Visualization Inputs 116 in the previous answer(s) to the prompt. For example, the additional user manipulable answer space in the User Interface 108 for the additional answer may not be separate or distinct from the previous user manipulable spaces and may be a sub-portion of the previous user manipulable spaces, such as a separate sub-space or sub-grid, in which the additional answers to the prompt may be separated or distinct from the answers the user previously created in response to the prompt.

As shown in FIG. 4, the Assessment Engine 102 may generate a new User Manipulable Space or Grid 120, such as User Manipulable Spaces or Grids 120b, 120c, 120d, 120e. In some embodiments, the user may cause the Assessment Engine 102 to automatically generate the new User Manipulable Space or Grid 120 by selecting the Completion Indicator 124 in the User Interface 108 via an input of the Client 114. In some embodiments, the new User Manipulable Space or Grid 120 may be generated in the User Interface 108 in the position or location of the first User Manipulable Space or Grid 120a and the first User Manipulable Space or Grid 120a may be generated or moved to another position in the User Interface 108, such as the position of any of the other additional User Manipulable Spaces 120b, 120c, 120d, 120e shown in FIG. 4. Additionally, the user may select a previous User Manipulable Space or Grid 120 (e.g., 120b, 120c, 120d, 120e in FIG. 4) and adjust the position, rotation, scale, color, or configuration of any of the Interactive Visualization Inputs 116 contained in the previous User Manipulable Spaces or Grids 120.

Referring back to FIG. 3, after the Assessment Engine 102 generates the additional user manipulable space or grid in the User Interface 108, the Assessment Engine 102 may proceed to step 204. The Assessment Engine 102 may be operable to automatically generate one or more Interactive Visualization Inputs 116 in the User Interface 108 and the user may manipulate the one or more Interactive Visualization Inputs 116 generated and displayed in the User Interface 108, as described in step 206. Repeating steps 204 through 208, the user may utilize the input of the Client 114 to manipulate one or more Interactive Visualization Inputs 116 generated by the Assessment Engine 102 in the additional user manipulable space or grid to create an additional answer to the prompt, which may be different from a previous answer. Steps 204 through 210 may be repeated until the Assessment Engine 102 determines that the user has no additional answer to the prompt. Steps 202 through 212 may be repeated as many times as desired. For example, as shown FIG. 4, the user may drag one or more Interactive Visualization Inputs 116 from the Queue 118 into any of the User Manipulable Spaces or Grids 120 and position, rotate, scale, or otherwise manipulate the additional Interactive Visualization Input(s) 116 to form one or more answers to the creativity and/or intelligence evaluation task or prompt. The user may also adjust or readjust the position, rotation, scale, color, or configuration of any number of Interactive Visualization Inputs 116 placed in any of the User Manipulate Spaces or Grids 120 (e.g., User Manipulable Spaces or Grids 120a, 120b, 120c, 120d, 120e).

At step 214, it may be determined whether the user has answered all of the creativity and/or intelligence evaluation prompts and/or whether a timer generated by the Assessment Engine 102 expired. In some embodiments, the Assessment Engine 102 may be operable to automatically determine whether the user has answered all of the prompts generated by the Assessment Engine 102. In certain embodiments, the Assessment Engine 102 may generate an alert or prompt in the User Interface 108 that the user may select, respond to, or otherwise interact with via the Client 114 to indicate whether the user has answered all the prompts generated by the Assessment Engine 102. For example, the Assessment Engine 102 may generate a drop down or selectable button in the User Interface 108 which the user may select via the input of the Client 114 to indicate whether the user has answered all prompts of the creativity and/or intelligence evaluation. In other embodiments, the Assessment Engine 102 may be operable to determine whether the user has answered a predefined or predetermined number of prompts as desired for the creativity and/or intelligence evaluation. In other embodiments, the Assessment Engine 102 may determine that the user has answered all the creativity and/or intelligence evaluation prompts when the user does not have additional answers to input and/or upload to the Assessment Engine 102, User Interface 108, and/or Client 114 in response to any of the creativity and/or intelligence evaluation prompts. If the Assessment Engine 102 determines that the user has answered all of the prompts generated by the Assessment Engine 102, the Assessment Engine 102 may proceed to step 216. If the Assessment Engine 102 determines that the user has not answered all the prompts of the creativity and/or intelligence evaluation, the Assessment Engine 102 may proceed back to step 202 and the Assessment Engine 102 may be operable to generate an additional creativity and/or intelligence evaluation prompt for a user to answer which may be displayed in the User Interface 108 and viewed by the user via the Client 114. The Assessment Engine 102 may generate a unique prompt that is different from any previously generated prompts or the Assessment Engine 102 may select a unique prompt that is different from any previously generated prompts from a number of stored or historical prompts, such as a prompt stored in the Storage 110. The generated prompt may be similar to any of the prompts generated in step 202 to test or evaluate a user's creativity and/or intelligence. After the Assessment Engine 102 generates the additional prompt, steps 204 through 214 may be repeated until the Assessment Engine 102 determines that the user has answered all the prompts to the creativity and/or intelligence evaluation.

Alternatively or in addition, the Assessment Engine 102 may be operable to automatically determine whether a timer generated by the Assessment Engine 102 and set to a predetermined amount of time expired. If the Assessment Engine 102 determines that the generated timer expired, the Assessment Engine 102 may proceed to step 216. If the Assessment Engine 102 determines that the generated timer has not expired, the Assessment Engine 102 may proceed back to step 202 and the Assessment Engine 102 may be operable to generate an additional creativity and/or intelligence evaluation prompt for a user to answer which may be displayed in the User Interface 108 and viewed by the user via the Client 114, as described above.

In certain embodiments, the Assessment Engine 102 may terminate any of the steps, such as any of steps 202 through 214, and proceed to step 216 upon expiration of the timer generated by the Assessment Engine 102. For example, the Assessment Engine 102 may terminate user's access to the creativity and/or intelligence evaluation through the User Interface 108 upon the expiration of a predetermined amount of time.

While steps 202-214 have been described as being implemented or performed in the User Interface 108, it will be appreciated that steps 202-214 may be implemented or performed separately from the Assessment Engine 102, User Interface 108, and/or Client 114. For example, the Assessment Engine 102 may generate one or more creativity and/or intelligence tasks or prompts which may be printed out and provided to the user and provided along with physical two- or three-dimensional Interactive Visualization Inputs 116 for the user to form one or more answers to the one or more creativity and/or intelligence tasks or prompts. The user may then position, rotate, scale, color, combine, assemble, interlock or otherwise manipulate the Interactive Visualization Inputs 116 separately from the User Interface 108, the Assessment Engine 102, and/or the Client 114, such as by hand. The user may position, rotate, manipulate, assemble, interlock, or otherwise configure multiple Interactive Visualization Inputs 116 to form one or more answers to a creativity and/or intelligence task or prompt and input and/or upload the one or more answers to the User Interface 108, Assessment Engine 102, and/or Client 114, such as via one or more of the inputs of the Client 114. For example, the user may position, rotate, manipulate, assemble, combine, interlock, or otherwise configure multiple Interactive Visualization Inputs 116 to form one or more answers to a creativity and/or intelligence task or prompt and photograph, videotape, scan, or otherwise input and/or upload the one or more answers to the User Interface 108, Assessment Engine 102, and/or Client 114 via one or more inputs of the Client 114. Once input and/or uploaded, the User Interface 108, Assessment Engine 102, and/or Client 114 may generate digital representations in the User Interface 108 of the one or more answers based on the input and/or upload from the Client 114. For example, the User Interface 108, Assessment Engine 102, and/or Client 114 may receive the one or more answers and the User Interface 108 and/or Assessment Engine 102 may generate digital representations of the answers by converting the input and/or upload of the one or more answers into a digital form similar to answers formed by users moving, scaling, rotating, combining, assembling, interlocking, or otherwise positioning Interactive Visualization Inputs 116 digitally generated in the User Interface 108 in the user manipulate space or grid of the User Interface 108.

At step 216, representations of the one or more answers provided by the user may be generated. In some embodiments, the Assessment Engine 102 may be operable to automatically generate a representation of each of the answers or responses provided by the user via the User Interface 108 or input and/or uploaded to the Assessment Engine 102, User Interface 108, and/or Client 114 by the user in response to the one or more prompts generated by the Assessment Engine 102. The Assessment Engine 102 may generate a representation of the Interactive Visualization Inputs 116 in each of the user manipulable spaces or grids (e.g., User Manipulable Spaces or Grids 120a, 120b, 120c, 120d, 120e in FIG. 4) in the User Interface 108 or input and/or uploaded to the Assessment Engine 102, User Interface 108, and/or Client 114 by the user for each of the answers provided by the user such that the Assessment Engine 102 may evaluate each of the answers provided by the user and generate a creativity level output for the user, as described below. For example, the Assessment Engine 102 may be operable to generate a mathematical representation of the answers corresponding to the type, position, orientation, scale, and color of each Interactive Visualization Input 116 in the answers provided by the user.

At step 218, the one or more answers to the creativity and/or intelligence evaluation prompts may be evaluated. In some embodiments, the Assessment Engine 102 may be operable to automatically evaluate or score the answers provided by the user to the prompts generated by the Assessment Engine 102. The Assessment Engine 102 may be operable to automatically evaluate the answers provided by the used based on the representation of the answers generated in step 216. The Assessment Engine 102 may be operable to evaluate the answers provided by the user according to any number of factors, methods, and/or algorithms to generate a creativity and/or intelligence level output for the user, such as described below. For example, the Assessment Engine 102 may be operable to automatically evaluate the generated mathematical representations corresponding to the Interactive Visualization Inputs 116 in the answers provided by the user based on the fluency, originality, elaboration, and flexibility of the of the answers, as described below. The Assessment Engine 102 may also be operable to evaluate the answers provided by the user in relation to historical answers (e.g., answers stored in the Storage 110) of similar users, such as users with similar ages and/or educational levels.

At step 220, a creativity and/or intelligence level output may be generated based at least in part on the answers provided by the user and corresponding to a creativity and/or intelligence level of the user. In some embodiments, the Assessment Engine 102 may be operable to automatically determine the creativity and/or intelligence level of the user and automatically generate a creativity and/or intelligence level output for the user based on the creativity and/or intelligence level of the user. The Assessment Engine 102 may be operable to automatically determine the creativity and/or intelligence level of the user based on one or more calculation methods for evaluating the answers provided by the user or comparison to historical data corresponding to the evaluations determined by the Assessment Engine 102 in step 218. For example, as described below, the Assessment Engine 102 may automatically add, weight, or otherwise factor the evaluation scores of the fluency, originality, elaboration, and flexibility of the users answers according to a weighted formula and compare the weighted score to historical data of known scores corresponding to known creativity and/or intelligence levels, such as creativity and/or intelligence levels stored in the Storage 110. In some embodiments, the Assessment Engine 102 may also consider or factor the age and/or educational grade or level of the user in generating the creativity and/or intelligence level output, such as by generating a rank or percentile grade for the fluency, originality, elaboration, and/or flexibility score of the user compared to scores of other users with the same or similar age and/or educational grade or level. The Assessment Engine 102 may then automatically generate a creativity and/or intelligence level output corresponding to the user's creativity and/or intelligence level. The generated creativity and/or intelligence level output may be displayed in the User Interface 108 and may be used to update the user profile.

Figure 5:
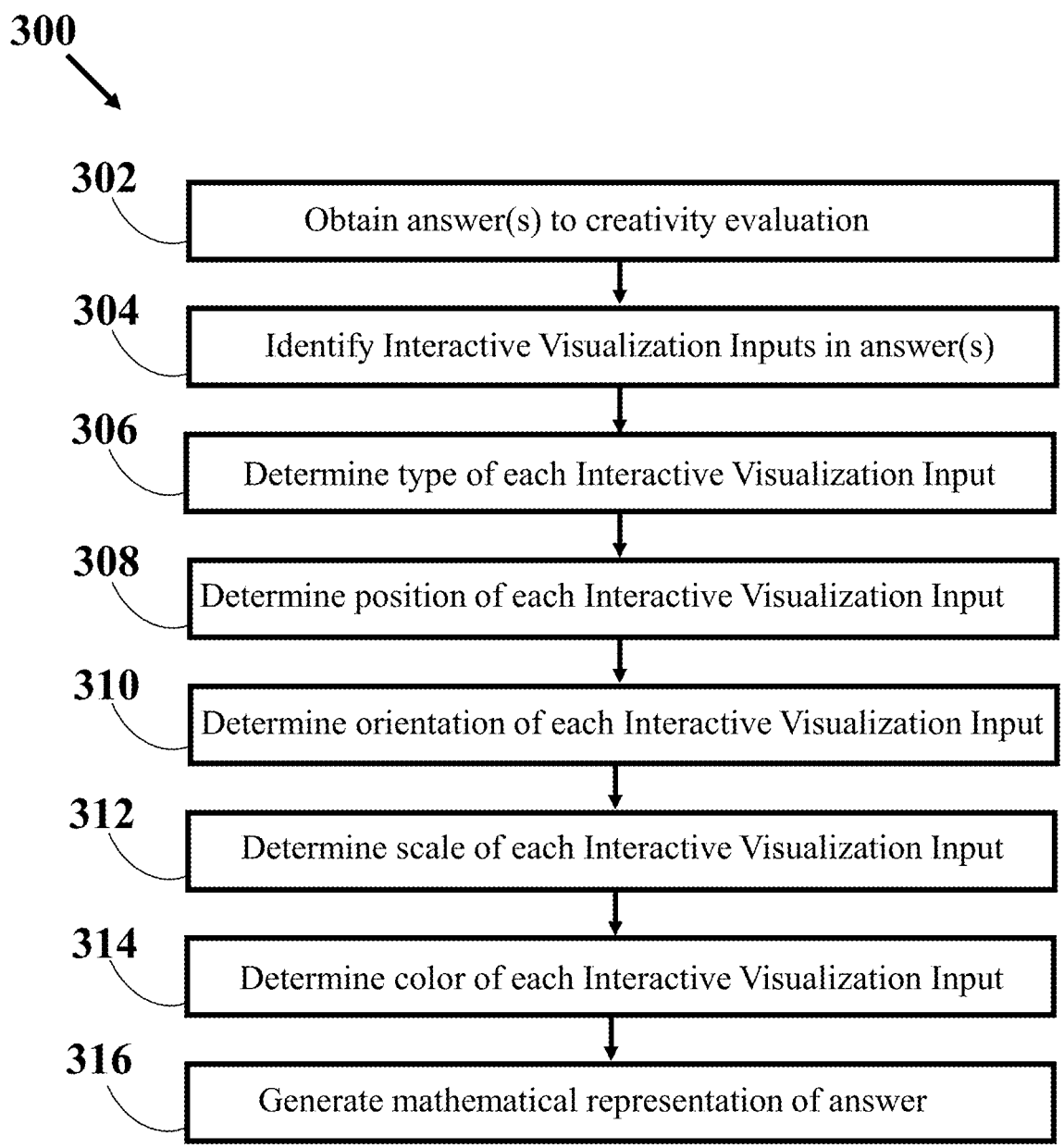
FIG. 5 shows an exemplary method for generating a mathematical representation of one or more answers provided by a user in response to one or more creativity and/or intelligence evaluation prompts.

FIG. 5 shows steps according to an exemplary method 300 for generating a mathematical representation of one or more answers provided by a user in response to one or more creativity and/or intelligence evaluation prompts. It will be appreciated that the illustrated method and associated steps may be performed in a different order, with illustrated steps omitted, with additional steps added, or with a combination of reordered, combined, omitted, or additional steps. The steps may be implemented in one or more computer readable instructions, such as by the Assessment Engine 102.

At step 302, one or more user answers to one or more creativity and/or intelligence evaluation prompts may be obtained. In some embodiments, the Assessment Engine 102 may be operable to automatically obtain one or more answers comprising one or more Interactive Visualization Inputs 116 displayed or stored in one or more user manipulable spaces or grids in the User Interface 108 (e.g., User Manipulable Spaces or Grids 120a, 120b, 120c, 120d, 120e in FIG. 4). The Assessment Engine 102 may obtain or receive the answers to one or more prompts directly from the User Interface 108, from the Storage 110, through the Network 112, or through any suitable means as would be appreciated by those of skill in the art. In other embodiments, the user may input or upload the user's answers to the creativity and/or intelligence test to the Client 114, User Interface 108, and/or Assessment Engine 102. For example, the user may take some or all of the creativity and/or intelligence assessment via handwriting or positioning, assembling, manipulating, assembling, combining, interlocking, and/or otherwise configuring two- or three-dimensional shapes or objects and inputting and/or uploading the answers to the User Interface 108, and/or Assessment Engine 102 via one or more of the inputs of the Client 114.

At step 304, the Interactive Visualization Inputs 116 in the user answers to one or more creativity and/or intelligence evaluation prompts may be identified. In some embodiments, the Assessment Engine 102 may be operable to automatically identify each Interactive Visualization Input 116 in each of the answers provided by the user in the user manipulable spaces or grids in the User Interface 108. The Assessment Engine 102 may be operable to identify each Interactive Visualization Input 116 in the user manipulable spaces or grids in the User Interface 108 in isolation or separate from the other Interactive Visualization Inputs 116 in the user manipulable spaces or grids in the User Interface 108 for each of the answers provided by the user. In certain embodiments, the Assessment Engine 102 may be operable to identify each Interactive Visualization Input 116 in each of the separate user manipulable spaces or grids, such as each sub-space or sub-grid, in isolation or separate from the other Interactive Visualization Inputs 116 in the respective user manipulable space, grid, sub-space, or sub-grid. In other embodiments, the Assessment Engine 102 may be operable to isolate or separate each Interactive Visualization Input 116 into a unique or separate user manipulable space, grid, sub-space, or sub-grid.

At step 306, the type of each Interactive Visualization Input 116 in each of the answers to the creativity and/or intelligence prompts may be determined. In some embodiments, the Assessment Engine 102 may be operable to automatically determine the type of each Interactive Visualization Input 116 in each of the answers provided by the user in each answer to the one or more prompts. The Assessment Engine 102 may determine whether the Interactive Visualization Input 116 in the user manipulable space, grid, sub-space, or sub-grid or input and/or uploaded to the Assessment Engine 102, User Interface 108, and/or Client 114 is a two- or three-dimensional shape, design, or image. For example, the Assessment Engine 102 may be operable to determine whether the Interactive Visualization Input 116 in the answer is a petal, triangle, ellipse, sphere, pyramid, or cube. In certain embodiments, the Assessment Engine 102 may not determine the type of each Interactive Visualization Input 116 in one or more answer to one or more prompts, such as when the Assessment Engine 102 generated a single Interactive Visualization Input 116 in the User Interface 108 for a user to manipulate in response to a prompt.

At step 308, a position of each Interactive Visualization Input 116 in each of the answers to the creativity and/or intelligence prompts may be determined. In some embodiments, the Assessment Engine 102 may be operable to automatically determine the position of each Interactive Visualization Input 116 in the user manipulable spaces, grids, sub-spaces, or sub-grids in the User Interface 108 or generated by the Assessment Engine 102 based on inputs and/or uploads from the user for each answer generated or provided by the user. In certain embodiments, the Assessment Engine 102 may be operable to determine a mathematical representation of the position of each Interactive Visualization Input 116 corresponding to the spatial coordinates of each Interactive Visualization Input 116 relative to a point on the user manipulable space, grid, sub-grid, or sub-space in the User Interface 108, such as an origin or center point of the user manipulable space, grid, sub-grid, or sub-space. For example, the Assessment Engine 102 may determine or identify the x-y coordinates of each two-dimensional Visualization Input 116 or the x-y-z coordinates of each three-dimensional Interactive Visualization Input 116. The Assessment Engine 102 may determine the position of each Interactive Visualization Input 116 based on a center point of the Interactive Visualization Input 116, a unique feature of the Interactive Visualization Input 116, the edges or corners of the Interactive Visualization Input 116, or any other suitable point of reference of the Interactive Visualization Input 116. For example, the Assessment Engine 102 may determine the position of a petal-shaped Interactive Visualization Inputs 116 by its point, the position of a circular or spherical Interactive Visualization Inputs 116 by the center point, the position of a rectangular or cuboid-shaped Interactive Visualization Input 116 by the corners, or any other suitable method as would be appreciated by those of skill in the art. Alternatively, the Assessment Engine 102 may determine the position of each Interactive Visualization Input 116 using radial coordinates by determining a distance of a reference point of the Interactive Visualization Input 116 from a pole, such as the origin or center of the user manipulable space, grid, sub-grid, or sub-space and determining the angular coordinate from the x-axis, the polar angle from the y-axis, and the azimuth from the z-axis.

At step 310, an orientation of each Interactive Visualization Input 116 in each of the answers to the creativity and/or intelligence prompts may be determined. In some embodiments, the Assessment Engine 102 may be operable to automatically determine the orientation of each Interactive Visualization Input 116 in the user manipulable spaces, grids, sub-spaces, or sub-grids for each answer generated by the user in the User Interface 108 or generated by the Assessment Engine 102 based on inputs and/or uploads provided by the user. The Assessment Engine 102 may be operable to determine a mathematical representation of the orientation of each Interactive Visualization Input 116 corresponding to the orientation of each Interactive Visualization Input 116 relative to a normal position of on the Interactive Visualization Inputs 116 in the user manipulable space, grid, sub-grid, or sub-space of the User Interface 108, such as the orientation of each Interactive Visualization Input 116 relative to the position in which the Interactive Visualization Input 116 is generated or presented in the queue in the User Interface 108. The Assessment Engine 102 may be operable to measure or determine an angle corresponding to the rotation of each two-dimensional Interactive Visualization Input 116 and the pitch, yaw, and roll of each three-dimensional Interactive Visualization Input 116 in each of the user manipulable spaces, grids, sub-grids, or sub-spaces as manipulated by the user. For example, the Assessment Engine 102 may be operable to measure or otherwise determine the angle corresponding to the rotation, pitch, yaw, and/or roll of each Interactive Visualization Input 116 in relation to a base or normal orientation of the Interactive Visualization Input 116, such as the orientation of the Interactive Visualization Input 116 as it is originally generated and displayed in the User Interface 108, such as in the key or queue of the User Interface 108. The Assessment Engine 102 may be operable to generate a representation of the pitch, yaw, and roll of three-dimensional Interactive Visualization Inputs 116 according to the a, B, y of Euler Angles or the pitch, yaw, and roll of Tait-Bryan Angles, respectively.

Figure 6:
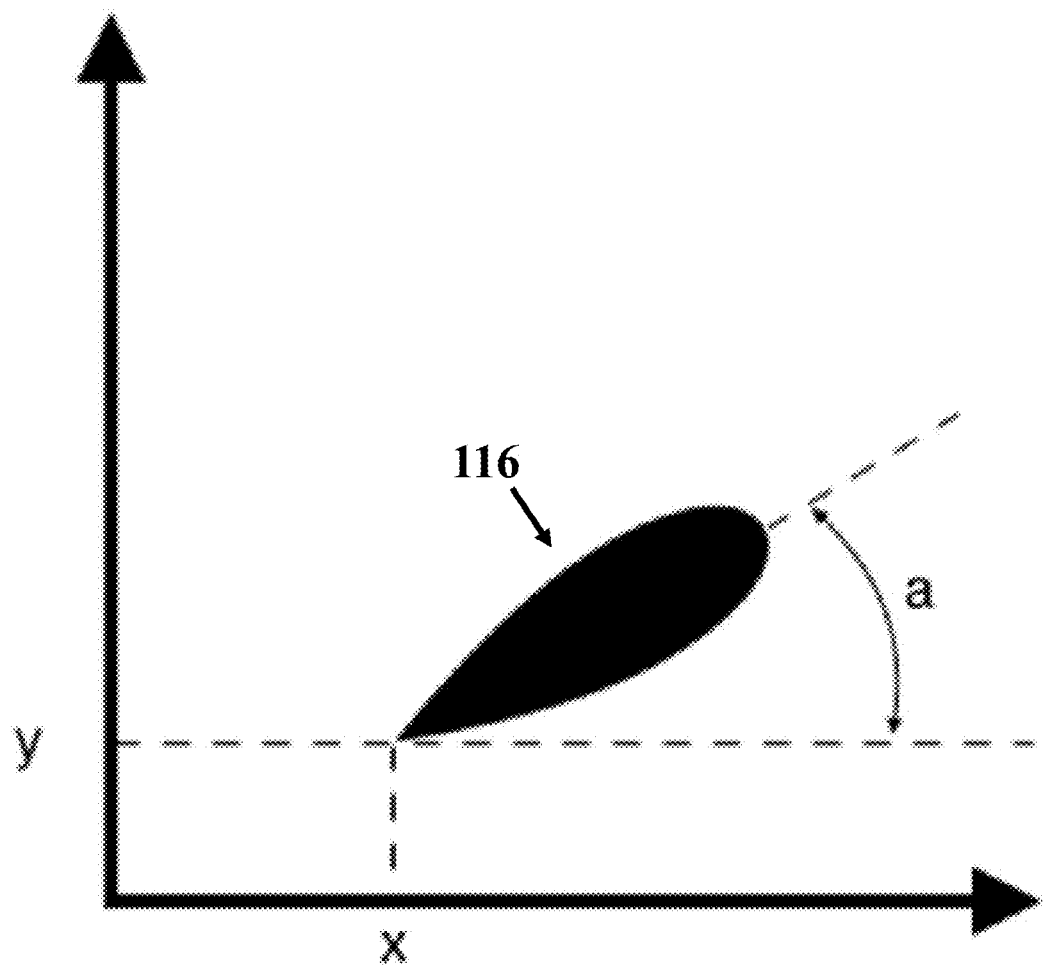
FIG. 6 shows an exemplary method for determining a mathematical representation of a two-dimensional interactive visualization input.
Figure 7:
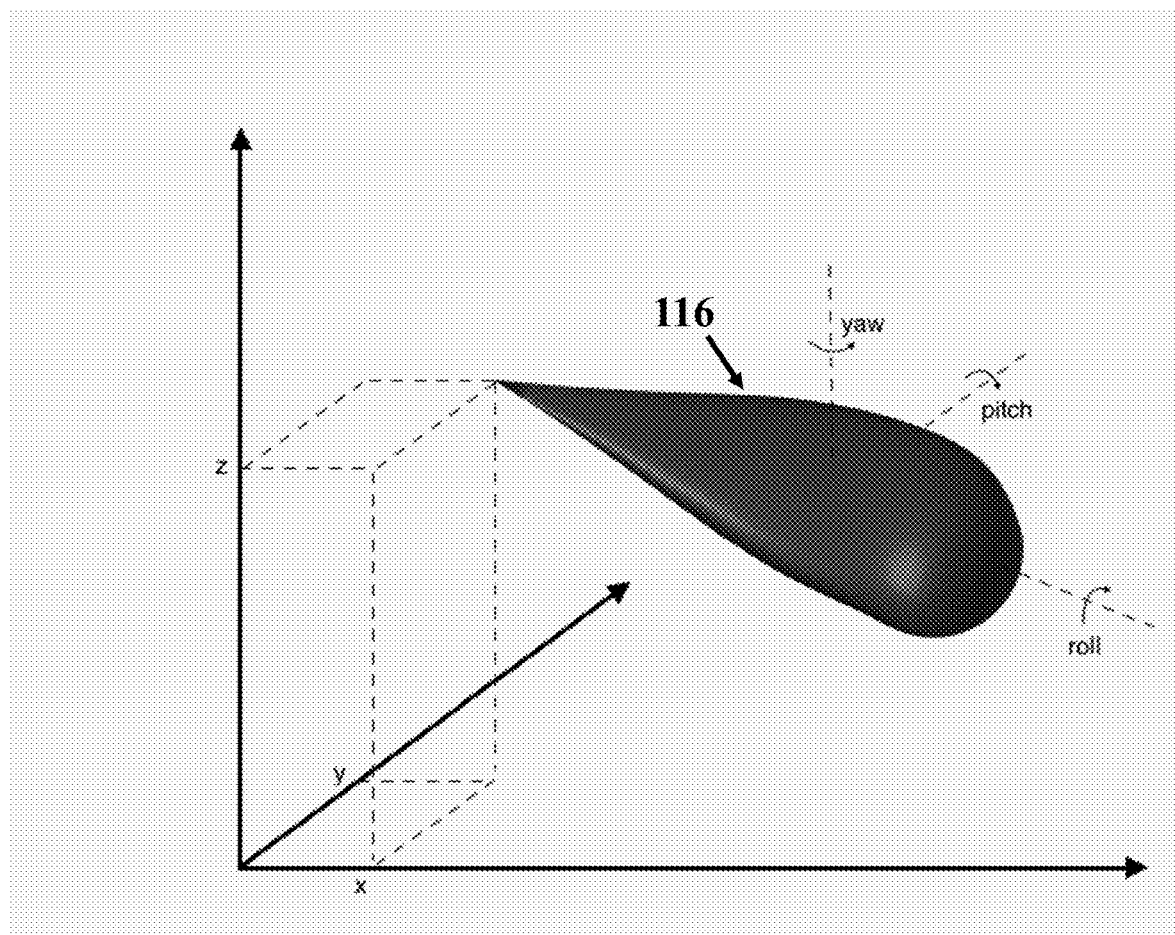
FIG. 7 shows an exemplary method for determining a mathematical representation of a three-dimensional interactive visualization input.

As shown in FIGS. 6 and 7, the Assessment Engine 102 may be operable to determine the position and orientation of two- and three-dimensional Interactive Visualization Inputs 116 in a user manipulable space, grid, sub-space, or sub-grid. As shown in FIG. 6, the Assessment Engine 102 may be operable to automatically determine the position of a two-dimensional Interactive Visualization Input 116 in a user manipulable space, grid, sub-space, or sub-grid (the x-y coordinates from the origin corresponding to the tip of the petal-shaped Interactive Visualization Input 116) and the angle of rotation of the Interactive Visualization Input 116 in the user manipulable space, grid, sub-space, or sub-grid (the angle a corresponding to the rotation of the Interactive Visualization Input 116 from a horizontal axis). As shown in FIG. 7, the Assessment Engine 102 may be operable to determine the position of a three-dimensional Interactive Visualization Input 116 in a user manipulable space, grid, sub-space, or sub-grid (the x-y-z coordinates from the origin corresponding to the tip of the petal-shaped Interactive Visualization Input 116) and the angle of roll (the angle corresponding to the rotation of the Interactive Visualization Input 116 about the x-axis), pitch (the angle corresponding to the rotation of the Interactive Visualization Input 116 about the y-axis), and the yaw (the angle corresponding to the rotation of the Interactive Visualization Input 116 about the z-axis) of the Interactive Visualization Input 116 in the user manipulable space, grid, sub-space, or sub-grid.

Referring back to FIG. 5, at step 312, a scale or size of each Interactive Visualization Input 116 in each of the answers to the creativity and/or intelligence prompts may be determined. In some embodiments, the Assessment Engine 102 may be operable to automatically determine the scale of each Interactive Visualization Input 116 in the user manipulable spaces, grids, sub-spaces, or sub-grids for each answer generated by the user in the User Interface 108 or generated by the Assessment Engine 102 based on inputs and/or uploads provided by the user. In certain embodiments, the Assessment Engine 102 may be operable to determine a mathematical representation of the size of each Interactive Visualization Input 116 corresponding to the scale of the Interactive Visualization Input 116 in the user manipulable space, grid, or sub-grid relative to a normal or original size of the Interactive Visualization Input 116. For example, the Assessment Engine 102 may be operable to measure or otherwise determine the ratio between the size of the Interactive Visualization Input 116 in the user manipulable space, grid, sub-space, or sub-grid and the size of the Interactive Visualization Input 116 as it generated and displayed in the User Interface 108, such as in the key or queue of the User Interface 108.

At step 314, a color of each Interactive Visualization Input 116 in each of the answers to the creativity and/or intelligence prompts may be determined. In some embodiments, the Assessment Engine 102 may be operable to automatically determine the color of each Interactive Visualization Input 116 in the user manipulable spaces, grids, sub-spaces, or sub-grids for each answer generated by the user in the User Interface 108 or generated by the Assessment Engine 102 based in inputs and/or uploads provided by the user. In certain embodiments, the Assessment Engine 102 may be operable to determine a mathematical representation of each Interactive Visualization Input 116 corresponding to the color of the Interactive Visualization Input 116 as manipulated by the user in the User Interface 108. For example, the Assessment Engine 102 may be operable to determine a mathematical code corresponding to the color of each Interactive Visualization Input 116 in the user manipulable spaces, grids, sub-spaces, or sub-grids, such as an HTML color code for the Interactive Visualization Input 116. In certain embodiments, the of each Interactive Visualization Input 116 in one or more answers to one or more prompts may not be determined, such as when the Assessment Engine 102 and/or the User Interface 108 generate a single color for the Interactive Visualization Input 116 in the User Interface 108 and do not permit the user to manipulate the Interactive Visualization Input 116 in response to a prompt.

At step 316, a mathematical representation of each answer to the one or more creativity and/or intelligence prompts may be generated. In some embodiments, the Assessment Engine 102 may be operable to automatically generate a mathematical representation of each answer provided by the user in the user manipulable spaces, grids, sub-spaces, or sub-grids or generated by the Assessment Engine 102 based on inputs and/or uploads provided by the user in response to the one or more prompts generated by the Assessment Engine 102. The Assessment Engine 102 may automatically generate the mathematical representation of each answer as the culmination of mathematical representations of each Interactive Visualization Input 116 in each user manipulable space, grid, sub-space, or sub-grid corresponding to a particular answer provided by the user or answer generated by the Assessment Engine 102 based on inputs and/or uploads provided by the user. For example, the Assessment Engine 102 may generate the mathematical representation of each answer as a culmination or combination of the mathematical representations of type, position, orientation, scale, and color of each Interactive Visualization Input 116 in the answer. In certain embodiments, the Assessment Engine 102 may evaluate the mathematical representations of Interactive Visualization Inputs 116 in each answer and remove the mathematical representations of one or more redundant or superfluous Interactive Visualization Inputs 116 from the mathematical representation of the answer. For example, the Assessment Engine 102 may evaluate the mathematical representations of Interactive Visualization Inputs 116 in each answer and remove the mathematical representations of each Interactive Visualization Input 116 that is entirely covered up or overlapped by other Interactive Visualization Inputs 116 in the user manipulable space, grid, sub-space, or sub-grid corresponding to the answer provided by the user.

In some embodiments, such as in embodiments in which a user may only position and rotate a two-dimensional Interactive Visualization Input 116 (e.g., FIG. 6), the Assessment Engine 102 may automatically generate a mathematical representation of the Interactive Visualization Input 116 containing three variables in the format of [x-position, y-position, angle of rotation]. The x-position may be determined as the x coordinate in the user manipulable space, grid, sub-space, or sub-grid of an identifying point of the Interactive Visualization Input 116. The y-position may be determined as the y coordinate in the user manipulable space, grid, sub-space, or sub-grid of the identifying point of the Interactive Visualization Input 116. The angle of rotation may be determined as the angle or rotation of the Interactive Visualization Input 116 in the user manipulable space, grid, sub-space, or sub-grid from a normal position from the horizontal axis.

In some embodiments, such as in embodiments in which a user may only position and rotate a three-dimensional Interactive Visualization Input 116 (e.g., FIG. 7), the Assessment Engine 102 may automatically generate a mathematical representation of the Interactive Visualization Input 116 having six variables in the format of [x-position, y-position, z-position, angle of roll, angle of pitch, angle of yaw]. The x-position may be determined as the x coordinate in the user manipulable space, grid, sub-space, or sub-grid of an identifying point of the Interactive Visualization Input 116. The y-position may be determined as the y coordinate in the user manipulable space, grid, sub-space, or sub-grid of the identifying point of the Interactive Visualization Input 116. The z-position may be determined as the x coordinate in the user manipulate space, grid, sub-space, or sub-grid of the identifying point of the Interactive Visualization Input 116. The angle of the roll may be determined as the angle or rotation of the Interactive Visualization Input 116 from a normal position about the x-axis. The angle of the pitch may be determined as the angle or rotation of the Interactive Visualization Input 116 from a normal position about the y-axis. The angle of the yaw may be determined as the angle or rotation of the Interactive Visualization Input 116 from a normal position about the z-axis.

In other embodiments, the generated mathematical representation of each Interactive Visualization Input 116 may contain different or additional variables. For example, the mathematical representation of one or more of the Interactive Visualization Inputs 116 automatically generated by the Assessment Engine 102 may include variables corresponding to the type or shape of the Interactive Visualization Input 116, the scale or size of the Interactive Visualization Input 116, and/or the color of the Interactive Visualization Input 116. Further, the Assessment Engine 102 may be configured to automatically generate a similar mathematical representation of each Interactive Visualization Input 116 in embodiments where the user forms one or more answers to one or more creativity and/or intelligence evaluation prompts separately from the User Interface 108, inputs and/or uploads the one or more answers to the Client 114, User Interface 108, and or Assessment Engine 102, and the User Interface 108, Assessment Engine 102, and/or Client 114 generates digital representations in the User Interface 108 of the one or more answers based on the input and/or upload from the Client 114. For example, the Assessment Engine 102 may generate digital representations of the one or more answers substantially similar to answers formed by a user in the User Interface 108 by positioning, rotating, scaling, coloring, or otherwise manipulating one or more Interactive Visualization Inputs 116 and generate mathematical representations of each Interactive Visualization Inputs 116 in each of the answers as described above.

Figure 8:
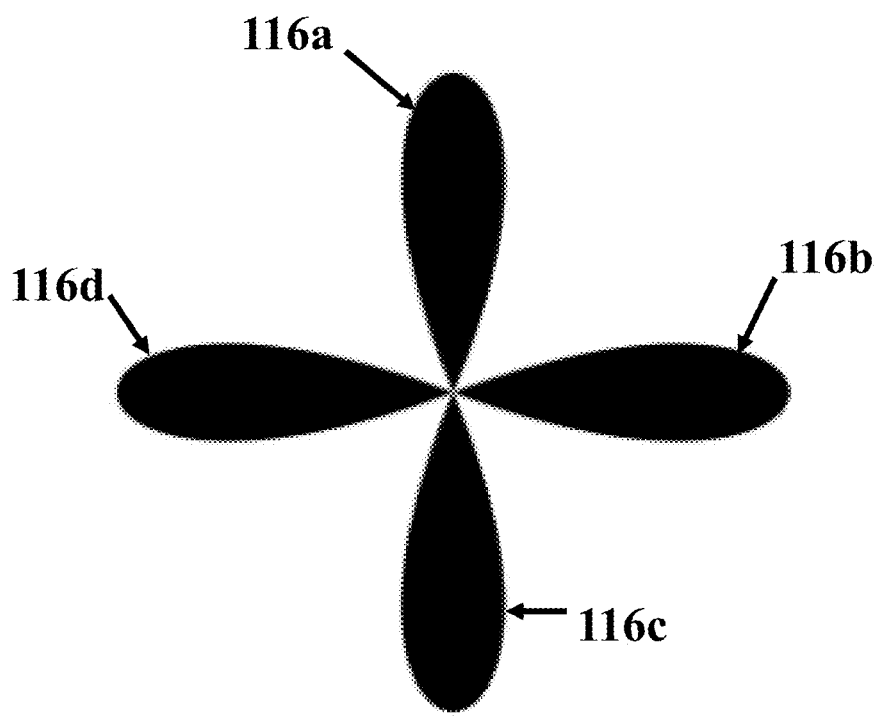
FIG. 8 shows a sample answer to a creativity assessment.

A sample answer to a creativity and/or intelligence evaluation prompt (e.g., using a two-dimensional petal-shaped Interactive Visualization Input 116, draw as many flowers as possible) is shown in FIG. 8. The sample answer may have been formed by a user positioning, rotating, scaling, coloring, or otherwise manipulating Interactive Visualization Inputs 116 in the User Interface 108, such as the User Interface 108 with Queue 118 of FIG. 4, or the sample answer may have been generated by the Assessment Engine 102 based on an answer input and/or uploaded to the User Interface 108, Assessment Engine 102, and/or Client 114 by the user. The answer includes a first Interactive Visualization Input 116a, a second Interactive Visualization Input 116b, a third Interactive Visualization Input 116c, and a fourth Interactive Visualization Input 116d. The Assessment Engine 102 may automatically generate a representation of the answer based on generated representations of each of the Interactive Visualization Inputs 116a, 116b, 116c, 116d. The Assessment Engine 102 may automatically generate the representation for each of the Interactive Visualization Inputs 116a, 116b, 116c, 116d where the variables corresponding to the x-position and y-position are generated based on the x and y coordinates of the point of each Interactive Visualization Input 116a, 116b, 116c, 116d, respectively, and the angle of rotation is generated based on a normal position of the Interactive Visualization Input 116 with the point oriented downwardly (e.g., as the Interactive Visualization Input 116 is shown in the Queue 118 in FIG. 4). The Assessment Engine 102 may generate a representation for the first Interactive Visualization Input 116a of [100, 120, 0], a representation for the second Interactive Visualization Input 116b of [100, 120, 90], a representation for the third Interactive Visualization Input 116c of [100, 120, 180], and a representation for the fourth Interactive Visualization Input 116d of [100, 120, 270]. The Interactive Visualization Inputs 116 are labeled as the first Interactive Visualization Input 116a, the second Interactive Visualization Input 116, the third Interactive Visualization Input 116c, and the fourth Interactive Visualization Input 116d. However, it will be appreciated that the Interactive Visualization Inputs 116a, 116b, 116c, 116d may be considered in any order. In some embodiments, the Assessment Engine 102 may be operable to generate each permutation and/or combination of orders of Interactive Visualization Inputs 116 for an answer such that the Assessment Engine 102 may generate fluency, originality, elaboration, and flexibility scores for the answers based on historical answers, as described below.

Figure 9:
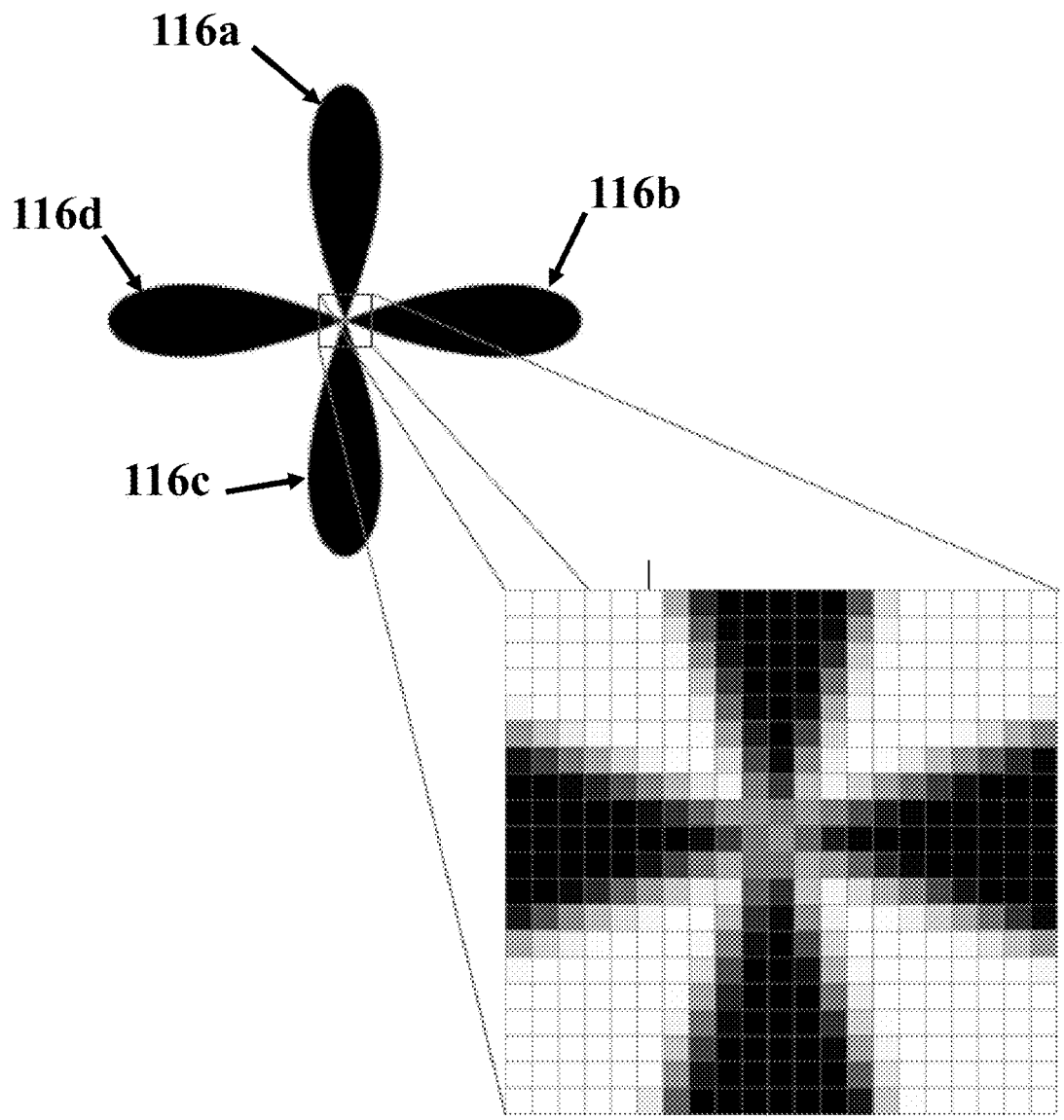
FIG. 9 shows an exemplary method for generating a mathematical representation of the sample answer of FIG. 8.

FIG. 9 shows another exemplary method for generating a representation of the sample answer for FIG. 8. In the exemplary method, the Assessment Engine 102 may be operable to automatically segment or divide the user manipulable space, grid, sub-space, or sub-grid into an array of zones, panes, or parts which are smaller than the user manipulable space, grid, sub-space, or sub-grid. The array may contain any number of zones, panes, or parts which may be any size that is smaller than the user manipulable space, grid, sub-space, or sub-grid and the Assessment Engine 102 may automatically segment or divide the user manipulable space, grid, sub-space, or sub-grid into any number of zones, panes, or parts such that the user manipulable space, grid, sub-space, or sub-grid has multiple zones, panes, or parts along the x-axis and multiple zones, panes, or parts along the y-axis. In the illustrated embodiment, the zones, panes, or parts are substantially square or rectangular. However, it will be appreciated that the zones, panes, or parts may have any suitable shape. For example, the zones, panes, or parts may be triangular or hexagonal. Also as shown in the illustrated embodiment, the sample answer is two-dimensional and the Assessment Engine 102 is operable to divide the user manipulable answer space into an array of panes having multiple columns along the x-axis and multiple columns along the y-axis. However, it will be appreciated that the Assessment Engine 102 may be operable to similarly divide or segment a three-dimensional user manipulable answer space into a plurality of smaller zones, panes, or parts that are three-dimensional in shape.

The Assessment Engine 102 may then be configured to automatically generate an identifying value or representation for each zone, pane, or part in the array corresponding to whether at least a portion of the zone, pane, or part contains at least a portion of an Interactive Visualization Input 116. As shown in the magnified cross-section in FIG. 9, the Assessment Engine 102 may analyze each of the zones, panes, or parts in the user manipulable space, grid, sub-space, or sub-grid and determine whether at least a portion of an Interactive Visualization Input 116 is contained in the zone, pane, or part. In some embodiments, the Assessment Engine 102 may be configured to generate a representation for each zone or pane that is binary depending on whether any portion of the zone or pane contains a portion of an Interactive Visualization Input 116. For example, the Assessment Engine 102 may automatically generate a representation value of 0 for zones or panes without any portions of an Interactive Visualization Input 116 and generate a representation value of 1 for zones or panes containing at least a portion of an Interactive Visualization Input 116. In other embodiments, the Assessment Engine 102 may be configured to generate a representation for each zone or pane corresponding to the amount of the zone or pane which contains a portion of an Interactive Visualization Input 116. For example, the Assessment Engine 102 may generate a representation value of 100% for zones or panes that are entirely filed with Interactive Visualization Inputs 116, a representation value of 50% for zones or panes that have Interactive Visualization Inputs 116 filling half of the zone or pane, and a representation value of 0% for zones or panes without any portion of an Interactive Visualization Input 116 contained therein. The Assessment Engine 102 may then automatically generate a representation of the user manipulable space, grid, sub-space, or sub-grid containing an answer to a creativity and/or intelligence test as a combination or matrix of the representations for each zone or pane in the array.

Figure 10A:
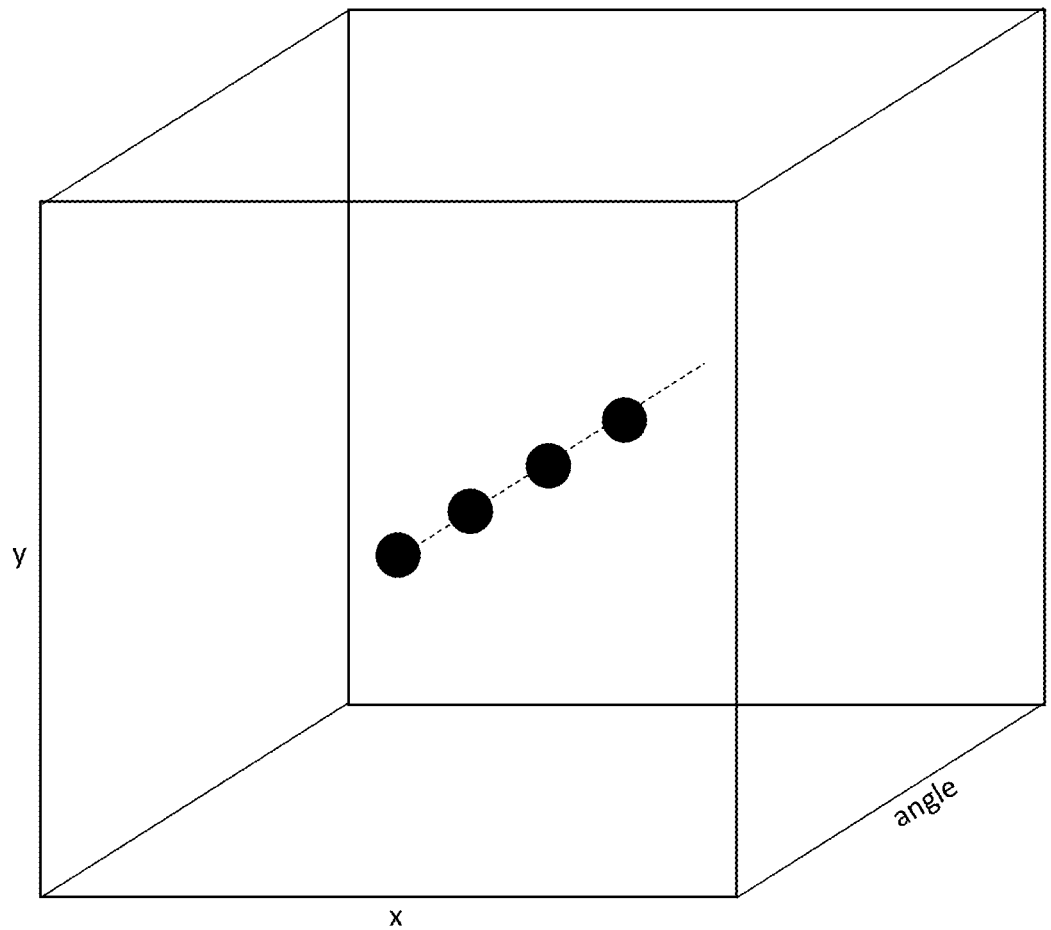
FIGS. 10A and 10B show another exemplary method for generating a mathematical representation of the sample answer of FIG. 8.
Figure 10B:
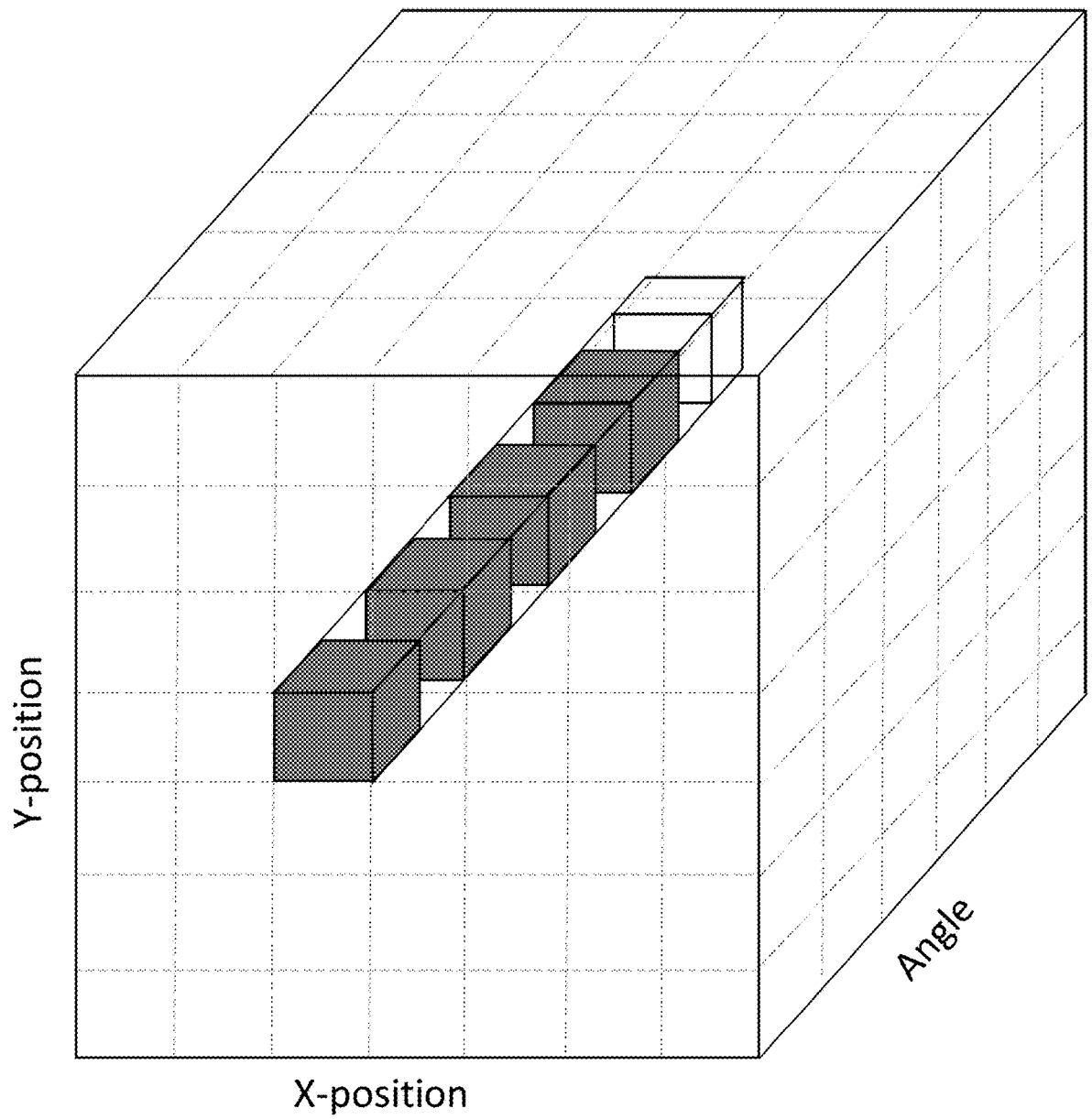

FIGS. 10A and 10B show an exemplary method for representing the generated representation of the sample answer of FIG. 8. In the exemplary method for representing the generated representation of a sample answer, the Assessment Engine 102 may be configured to automatically generate a n-dimensional grid where n is the number of variables included in the generated representation for each of the Interactive Visualization Inputs 116 contained in the answer. As the sample answer of FIG. 8 may be represented with three variables (e.g., x-position, y-position, and angle of rotation), the Assessment Engine 102 may generate a 3-dimensional grid to represent the answer. As shown in FIG. 10A, the Assessment Engine 102 may then be configured to generate a reference point in the n-dimensional grid for each Interactive Visualization Input 116 contained in an answer to a creativity and/or intelligence evaluation prompt using the n number of variables contained in the generated representation for the Interactive Visualization Input 116 as coordinates.

As shown in FIG. 10B, the Assessment Engine 102 may be configured to automatically segment or divide the n-dimensional grid of FIG. 10A into a number of n-dimensional areas, zones, or parts. In some embodiments, the Assessment Engine 102 may segment or divide the n-dimensional grid of FIG. 10A into n-dimensional areas, zones, or parts of equal size. Each n-dimensional area, zone, or part may represent a unique range of coordinates in the n-dimensional grid. The Assessment Engine 102 may automatically generate a representation or score for each area or zone in the n-dimensional grid corresponding to whether the area or zone contains a generated representation of an Interactive Visualization Input 116, such as shown in FIG. 10A. In some embodiments, the Assessment Engine 102 may generate a score of 1 for each area or zone in the n-dimensional grid which contains a generated representation of an Interactive Visualization Input 116 and a score of 0 for each area or zone in the n-dimensional grid which does not contain a generated representation of an Interactive Visualization Input 116. The Assessment Engine 102 may then automatically generate a mathematical representation of the answer to the creativity and/or intelligence prompt as a combination or matrix of the generated scores for each area or zone in the n-dimensional grid.

In the illustrated embodiment, the sample answer of FIG. 8 contains four Interactive Visualization Inputs 116 and there are four generated representations of Interactive Visualization Inputs 116 shown in FIGS. 10A and 10B. However, it will be appreciated that the answer and corresponding generated representations of Interactive Visualization Inputs 116 may have any number of Interactive Visualization Inputs 116 based on the answer formed or generated by the user.

In some embodiments, before the Assessment Engine 102 generates a mathematical representation of one or more answers provided by a user in response to one or more creativity and/or intelligence evaluation prompts, the one or more answers may be processed or preprocessed, such as to reduce the time and/or resources needed to generate the mathematical representations and/or to increase the accuracy of the mathematical representations. For example, the one or more answers may be processed or preprocessed by the Input Preprocessing Engine 601 as shown in FIG. 18. The one or more answers may be processed or preprocessed in a variety of ways and to varying degrees. For example, one or more answers may be downscaled, upscaled, cleaned, cleansed, converted, integrated, transformed, reduced, enhanced, or otherwise configured or processed to reduce the time and/or resources needed to generate the mathematical representations and/or to increase the accuracy of the mathematical representations.

Figure 19:
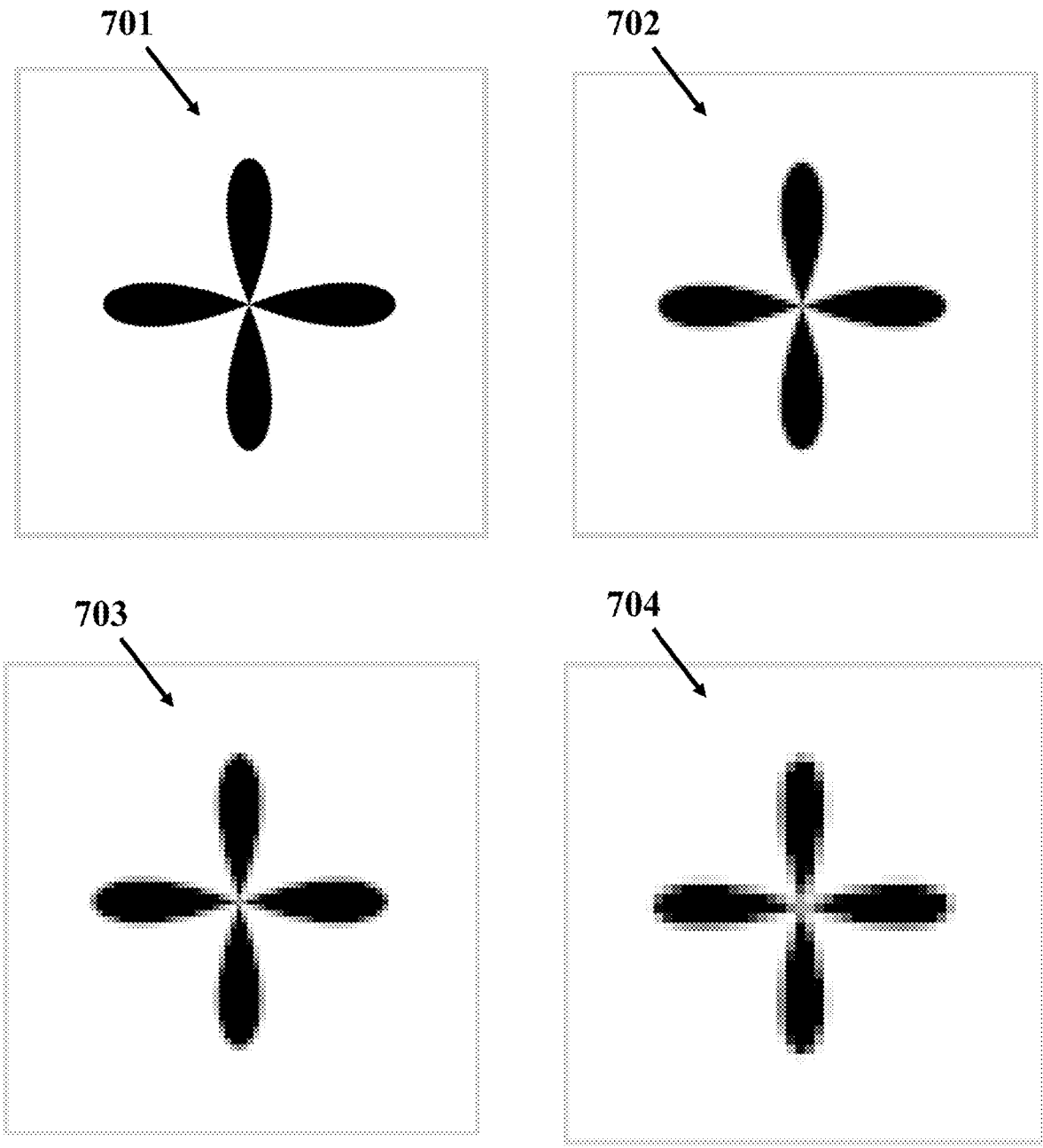
FIG. 19 shows exemplary processed samples of the sample answer of FIG. 8.

In some embodiments, the processing or preprocessing of the answers includes downscaling the answers to reduce the number of pixels or voxels in the answer and decrease the amount of time and/or resources needed to evaluate the answers and/or generate mathematical representations of the answers. Downscaling the answers results in fewer pixels or voxels needed to input into the Assessment Engine 102 to generate the mathematical representation. The answers may be downscaled a predetermined amount to reduce the time and/or resources needed to generate the mathematical representations, such as without reducing or decreasing the accuracy of the mathematical representations. As shown in FIG. 19, the sample answer of FIG. 8 is shown according to four different levels of processing or preprocessing. In a first processed sample answer 701, the sample answer of FIG. 8 is processed but not downscaled or reduced, resulting in no reduction in pixels in the processed answer. In a second processed sample answer 702, the sample answer of FIG. 8 is downscaled according to a 1:4 ratio, resulting in 16 times fewer pixels than the sample answer of FIG. 8. In a third processed sample answer 703, the sample answer of FIG. 8 is downscaled according to a 1:5 ratio, resulting in 25 times fewer pixels than the sample answer of FIG. 8. In a fourth processed sample answer 704, the sample answer of FIG. 8 is downscaled according to a 1:8 ratio, resulting in 64 times fewer pixels than the sample answer of FIG. 8. Three-dimensional answers generated by users may also be similarly downscaled. For example, a 1:4 downscale reduction would result in 64 times fewer voxels, a 1:5 downscale reduction would result in 125 times fewer voxels, and a 1:8 downscale reduction would result in 512 times fewer voxels.

Figure 11:
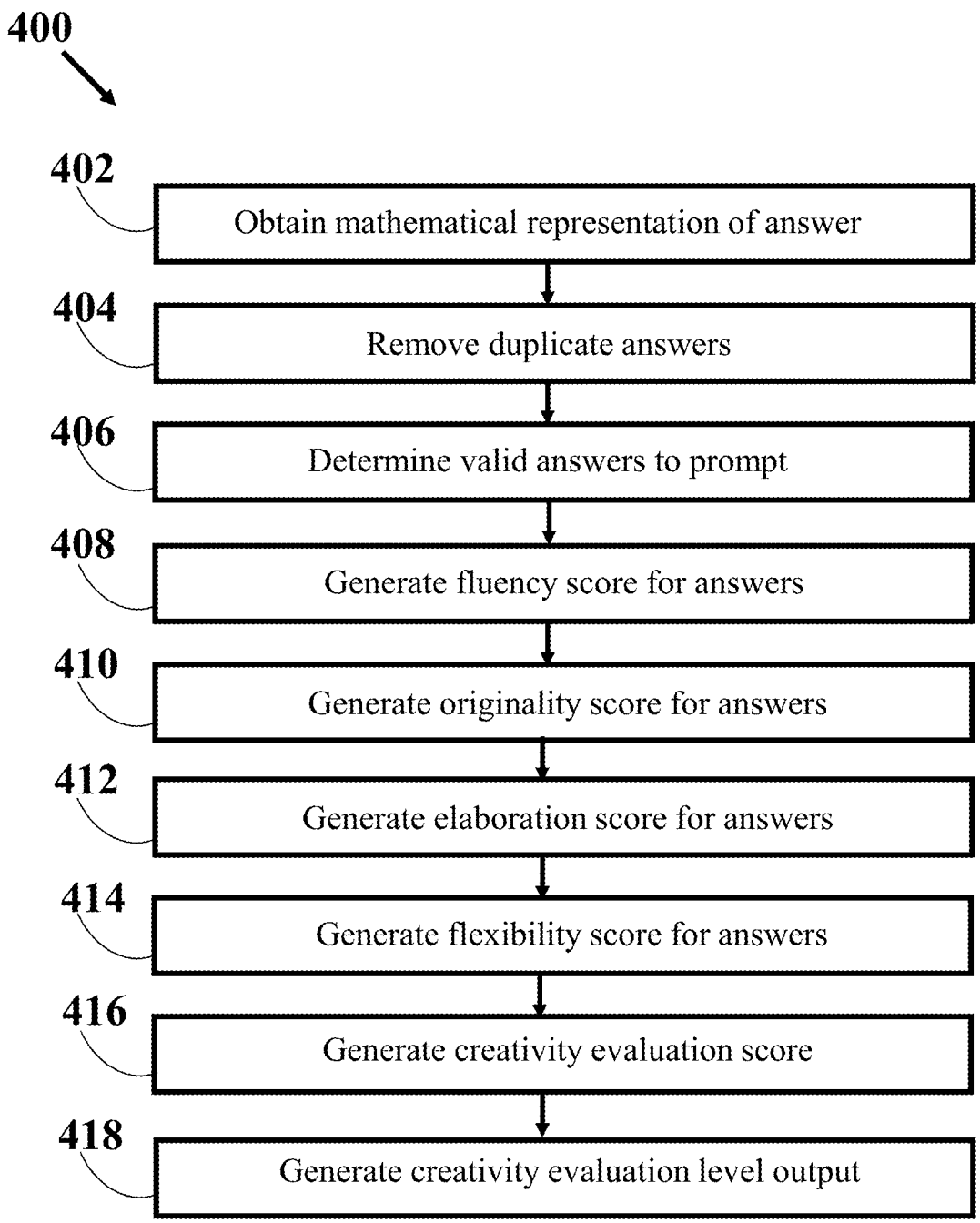
FIG. 11 shows an exemplary method for generating a creativity and/or intelligence level output of a user.

FIG. 11 shows steps according to an exemplary method 400 for generating a creativity and/or intelligence level output of a user based on the answers provided in the User Interface 108 to prompts generated by the Assessment Engine 102 and corresponding to a creativity and/or intelligence level of the user. It will be appreciated that the illustrated method and associated steps may be performed in a different order, with illustrated steps omitted, with additional steps added, or with a combination of reordered, combined, omitted, or additional steps. The steps may be implemented in one or more computer readable instructions, such as by the Assessment Engine 102.

At step 402, a mathematical representation of each answer to the one or more creativity and/or intelligence evaluation prompts may be obtained. In some embodiments, the Assessment Engine 102 may automatically receive, obtain, or generate a mathematical representation of one or more answers to one or more prompts provided by a user in the User Interface 108 via an input of one of the Clients 114. The Assessment Engine 102 may receive or obtain the mathematical representation of one or more answers to one or more prompts from the User Interface 108, Storage 110, or Network 112 or the Assessment Engine 102 may obtain the one or more answers to the one or more prompts from the User Interface 108, Storage 110, or Network 112 and be operable to generate the mathematical representation of one or more answers to the one or more prompts.

At step 404, duplicate and/or substantially similar answers to one or more creativity and/or intelligence evaluation prompts may be removed. In some embodiments, the Assessment Engine 102 may be operable to automatically remove duplicate and/or substantially similar answers provided by the user in the User Interface 108 to each prompt generated by the Assessment Engine 102 or generated by the Assessment Engine 102 based on inputs and/or uploads provided by the user. The Assessment Engine 102 may be operable to compare the mathematical representations of each answer to determine whether any of the answers are the same or substantially similar to one or more other answers to the same prompt. If the Assessment Engine 102 determines that one or more of the answers is the same or substantially similar to one or more other answers, the Assessment Engine 102 may be operable to ignore, remove, or delete the duplicate or substantially similar answer. For example, the Assessment Engine 102 may be operable to ignore, remove, or delete answers that are slight variations of other answers to the same prompt, such as answers which are only rotations of other answers to the same prompt, answers which are only scaled variations of other answers to the same prompt, or any other answers which are only slight variations from other answers to the same prompt.

In some embodiments, the Assessment Engine 102 may be operable to automatically compare and contrast mathematical representations of answers as described in FIGS. 9, 10A, and/or 10B to automatically determine whether two or more answers are the same or substantially similar. The Assessment Engine 102 may be operable to automatically compare the areas or zones of the n-dimensional grids representing the Interactive Visualization Inputs 116 of the answers to determine whether two or more answers are the same or substantially similar. For example, the Assessment Engine 102 may be operable to determine that two answers are the same or substantially similar if the areas or zones of the n-dimensional grid representing the Interactive Visualization Inputs 116 of a first answer are the same as the areas or zones of the n-dimensional grid representing the Interactive Visualization Inputs 116 of a second answer are the same or are the same but shifted one area or zone, such as shifted one area or zone over based on the x-direction, y-direction, or angle coordinates of the Interactive Visualization Inputs 116. If the Assessment Engine 102 determines that two or more mathematical representations of answers are the same or substantially similar, the Assessment Engine 102 may be operable to automatically ignore, remove, or delete the duplicate or near duplicate answers.

Figure 12:
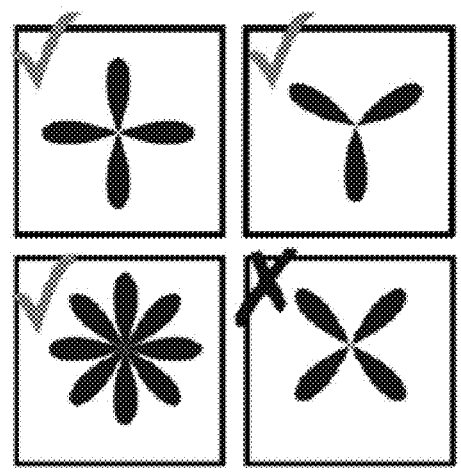
FIG. 12 illustrates an example of determining duplicate answers to a creativity assessment.

FIG. 12 shows a set of four sample answers to a prompt (using a two-dimensional petal-shaped Interactive Visualization Input 116, draw as many flowers as possible). The Assessment Engine 102 may be operable to determine that the top-left, top-right, and bottom-left answers are non-duplicative answers to the prompt. However, the Assessment Engine 102 may be operable to determine that the bottom-right answer is duplicative of the top-right answer as they are both four-petal flower designs emanating radially outward from a single origin and that the bottom-right answer is only a rotation of the top-left answer. For example, as described in FIGS. 10A and 10B, the Assessment Engine 102 may be operable to determine that the areas or zones of the n-dimensional grid representing the Interactive Visualization Inputs 116 of the top-left answer are the same as the areas or zones of the n-dimensional grid representing the Interactive Visualization Inputs 116 of the bottom-right answer only shifted along the axis corresponding to the angle of rotation of the Interactive Visualization Inputs 116. Accordingly, the Assessment Engine may be operable to ignore, remove, or delete the bottom-right answer from the collection of mathematical representations of answers to the prompt.

Referring back to FIG. 11, at step 406, the answers to the creativity and/or intelligence evaluation prompts may be assessed to determine valid answers to the creativity and/or intelligence evaluation prompts. In some embodiments, the Assessment Engine 102 may be operable to automatically determine valid answers to the prompt. The Assessment Engine 102 may be operable to determine, from the mathematical representations of answers, whether the arrangement of manipulated Interactive Visualization Inputs 116 in the user manipulable space, grid, sub-space, or sub-grid of each answer corresponds to a valid answer to the prompt. For example, the Assessment Engine 102 may be operable to determine if the arrangement of manipulated Interactive Visualization Inputs 116 in the user manipulable space, grid, sub-space, or sub-grid of each answer creates a shape, image, or design which is a suitable answer to the prompt, creates a shape, image, or design which is not a suitable answer to the prompt, or is a random arrangement which does not create a shape, image, or design. The Assessment Engine 102 may be operable to ignore, remove, or delete the answers that are not valid answers or responses to the prompt. The Assessment Engine 102 may be operable to implement any suitable method for determining whether the answers generated in the User Interface 108 represent valid answers to the prompt generated by the Assessment Engine 102. For example, the Assessment Engine 102 may implement a neural network trained from historical data, a comparison to stored data or a database, such as stored in the Storage 110, containing valid answers to the prompt.

At step 408, a fluency score for the answers provided by the user may be generated corresponding to the number of unique answers to each prompt. In some embodiments, the Assessment Engine 102 may be operable to automatically generate a numerical value or point score according to the fluency of the answers provided by the user in the User Interface 108 or input and/or uploaded to the User Interface 108, Assessment Engine 102, and/or Client 114 to each prompt. For example, the Assessment Engine 102 may compare each of the of the answers to a prompt and ignore, remove, or delete the answers which are duplicates of or substantially similar to one or more other answer and the answers which are not valid responses to the prompt, and count the non-duplicative, valid answers. In certain embodiments, the Assessment Engine 102 may be operable to determine or count the number of user manipulable spaces, grids, sub-spaces, or sub-grids which contain valid answers. In other embodiments, the Assessment Engine 102 may be operable to determine or count the total number of valid, unique answers on one or more user manipulable spaces, grids, sub-spaces, or sub-grids. The Assessment Engine 102 may automatically apply one or more calculation methods for determining a numerical point value to assign to the answers to the prompt provided by the user corresponding to the fluency of the answers. For example, the Assessment Engine 102 may be operable to generate or otherwise assign a numerical value or point score equivalent to the number of unique, valid answers provided by the user to the prompt, a numerical value or point score that is weighted according to an average number of answers provided to the prompt (which could be stored in or generated from historical data stored in the Storage 110), or a numerical value or point score that based on the number of unique, valid answers provided by the user to the prompt and weighted according to the number of unique answers provided by the user not contained in a historical data set (which could be stored in the Storage 110). In some embodiments, the Assessment Engine 102 generates the fluency score for the answers provided by the user as a count of the valid, non-duplicative answers provided by the user. The Assessment Engine 102 may also be operable to generate one or more fluency scores based on a combination of one or more calculation methods, in parallel and/or in series. For example, the Assessment Engine 102 may concurrently perform two or more calculation methods and determine the highest score, weight an overall score based on the multiple calculations, and/or generate multiple fluency scores according to the different calculation methods.

In some embodiments, the Assessment Engine 102 may be operable to automatically generate a fluency score for the answers provided by the user as a percentile rank compared to other users with similar ages and/or educational levels. For example, the Assessment Engine 102 may generate a fluency point value for the answers provided by the user as a count of the valid, non-duplicative answers provided by the user and then compare or evaluate the generated fluency point value against fluency point values of users with similar ages and/or educational levels contained in a historical data set (e.g., stored in the Storage 110). The Assessment Engine 102 may then generate a fluency score for the answers provided by the user as a percentile rank of the generated fluency point value for the user compared to the fluency point values of users with similar ages and/or educational levels contained in the historical data set.

At step 410, an originality score for the answers provided by the user may be generated corresponding to how novel, unique, or rare a given answer is in relation to other answers generated by other users. In some embodiments, the Assessment Engine 102 may be operable to automatically generate a numerical value or point score according to the originality of the answers provided by the user in the User Interface 108 to each prompt or generated by the Assessment Engine 102 based on inputs and/or uploads provided by the user. In certain embodiments, the Assessment Engine 102 may compare each of the answers provided by the user to historical answers provided by other users to the same prompt or prompts, such as historical answers stored in the Storage 110. In certain embodiments, the Assessment Engine 102 may be operable to implement a neural network, deep learning algorithm, or other suitable AI method to automatically determine the originality of each answer provided by the user in relation to historical answers provided by other users. The Assessment Engine 102 may then be operable to automatically generate a numerical score or point value for each of the answers provided by the user based on the originality of the answers provided by the user in relation to the historical answers provided by other users. In some embodiments, the Assessment Engine 102 may be operable to generate an originality score which is inversely proportional to the frequency in which a particular answer appears in responses provided by users. In other embodiments, the Assessment Engine 102 may be operable to generate an originality score according to how different a particular answer is in relation to an average historical answer to the prompt. For example, the Assessment Engine 102 may measure or calculate the difference between the overall mathematical representation of a particular answer and the average mathematical representation of historical answers provided to the prompt or the Assessment Engine 102 may measure or calculate the difference between the mathematical representation of each Interactive Visualization Inputs 116 in the answer and an average Interactive Visualization Input 116 according to historical data, such as historical data stored in the Storage 110. The Assessment Engine 102 may also be operable to automatically generate one or more originality scores based on a combination of one or more calculation methods, in parallel and/or in series. For example, the Assessment Engine 102 may concurrently perform two or more calculation methods and determine the highest score, weight an overall score based on the multiple calculations, and/or generate multiple originality scores according to the different calculation methods.

Figure 13A:
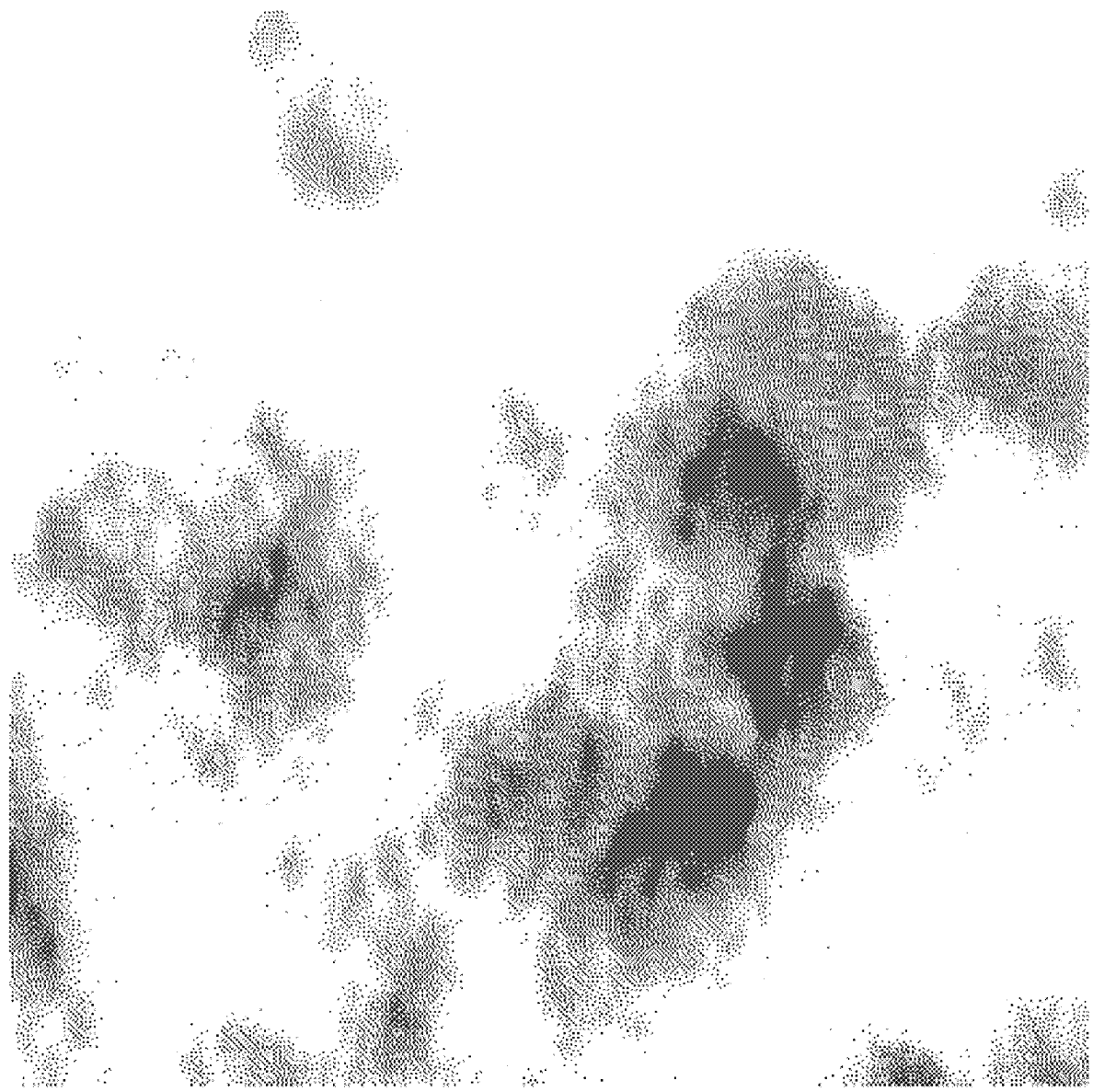
FIG. 13A shows a sample two-dimensional representation of historical answers to a creativity and/or intelligence level assessment prompt.

In some embodiments, the Assessment Engine 102 may be operable to automatically generate a two-dimensional chart or projection representing each historical answer to a creativity and/or intelligence evaluation prompt such that answers provided by a user may be compared to the historical answers to determine originality scores for the answers provided by the user. For example, the Assessment Engine 102 may be operable to generate each n-dimensional representation of the Interactive Visualization Inputs 116 of each historical answer as a two-dimensional data point and chart or project each two-dimensional data point on the historical data chart or projection. FIG. 13A shows a sample two-dimensional historical data chart or projection where each point or dot represents a unique historical answer to a creativity and/or intelligence evaluation prompt. The n-dimensional mathematical representations or projections of the historical answers may be generated and/or projected in two-dimensions through any suitable process or algorithm, such as by projections, dimensional distributions, cross-sections, principal component analysis (PCA), t-distributed stochastic neighbor embedding (t-SNE), uniform manifold approximation and projection (UMAP), nonlinear dimensionality reduction, or other suitable method for dimensionality reduction of data. The Assessment Engine 102 may also be operable to generate a two-dimensional representation or projection of each answer provided by the user and chart or project the two-dimensional representation on the historical data chart or projection. The Assessment Engine 102 may generate the two-dimensional representation or projection of each answer provided by the user based on the n-dimensional mathematical representations of the Interactive Visualization Inputs 116 of the answers provided by the user in the same manner as the historical answers.

The Assessment Engine 102 may be further operable to automatically generate an originality point score for each of the answers provided by the user based on the proximity of the two-dimensional representations of the answers provided by the user in the historical data chart or projection to historical answers contained in the historical data chart or projection. In the historical data chart or projection, high density areas represent common answers that are very similar as the historical answer representations are very close to many other answer representations, medium density areas represent less common answers as the historical answer representations are not as close to many other answer representations, and low density areas represent rare or unique answers as the historical answer representations are spaced farther apart from clusters of answer representations. In some embodiments, the Assessment Engine 102 may be operable to automatically generate an originality point score for each provided answer according to the density of the historical answer representations or projections around the representation or projection of the user answer in the historical data chart or projection, such as whether the representation of the user answer is in a high density area, a medium density area, or a low density area. For example, the Assessment Engine 102 may be operable to generate an originality point score of 0 for answers in high density areas on the historical data chart or projection, an originality point score of 1 for answers in medium density areas on the historical data chart or projection, and an originality point score of 2 for answers in low density areas on the historical data chart or projection. However, it will be appreciated by those of skill in the art that the Assessment Engine 102 may generate originality point scores for the answers based on more than three categories of density, such as four or more, and may generate originality point scores other than 0, 1, and 2, such as between 0 and 1, between 1 and 2, and greater than 2. In other embodiments, the Assessment Engine 102 may be operable to generate an originality point score for each provided answer as inversely proportional to the density of the location on the historical data chart or projection. For example, if the density of a region in the historical data chart or projection surrounding the representation or projection of a provided answer is higher than a predetermined threshold, the Assessment Engine 102 may automatically generate an originality point score of 0 and if the density of the region is lower than the predetermined threshold, the Assessment Engine 102 may generate an originality point score that is the inverse of the density of historical answer representations around the provided answer representation or projection. The Assessment Engine 102 may then be operable to automatically generate an overall originality point score for the answers provided by the user as a sum of the originality point scores for each answer provided by the user.

Figure 13B:
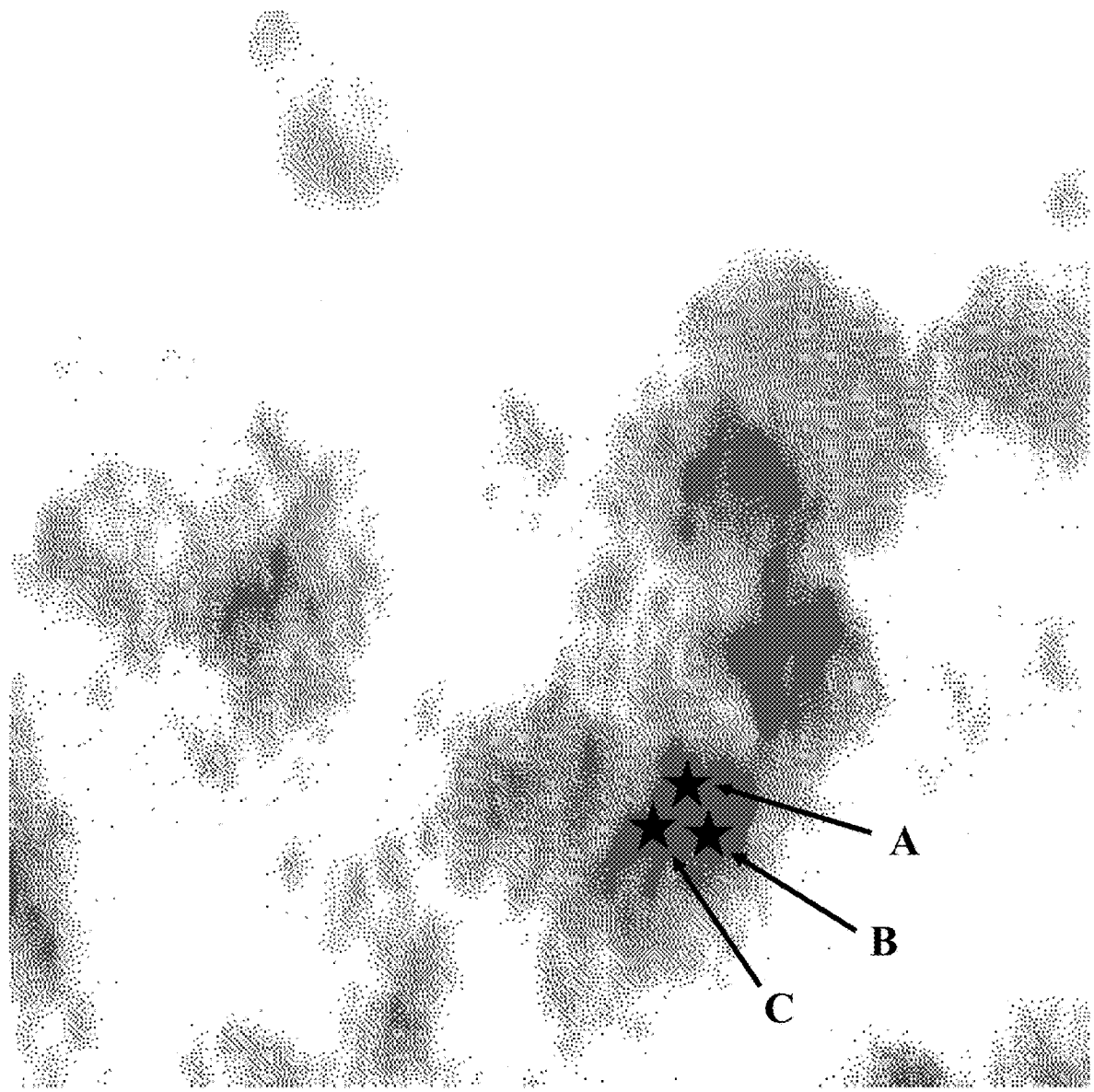
FIG. 13B shows a sample set of answers to a creativity and/or intelligence level assessment prompt compared to the sample representation of historical answers of FIG. 13A.
Figure 13C:
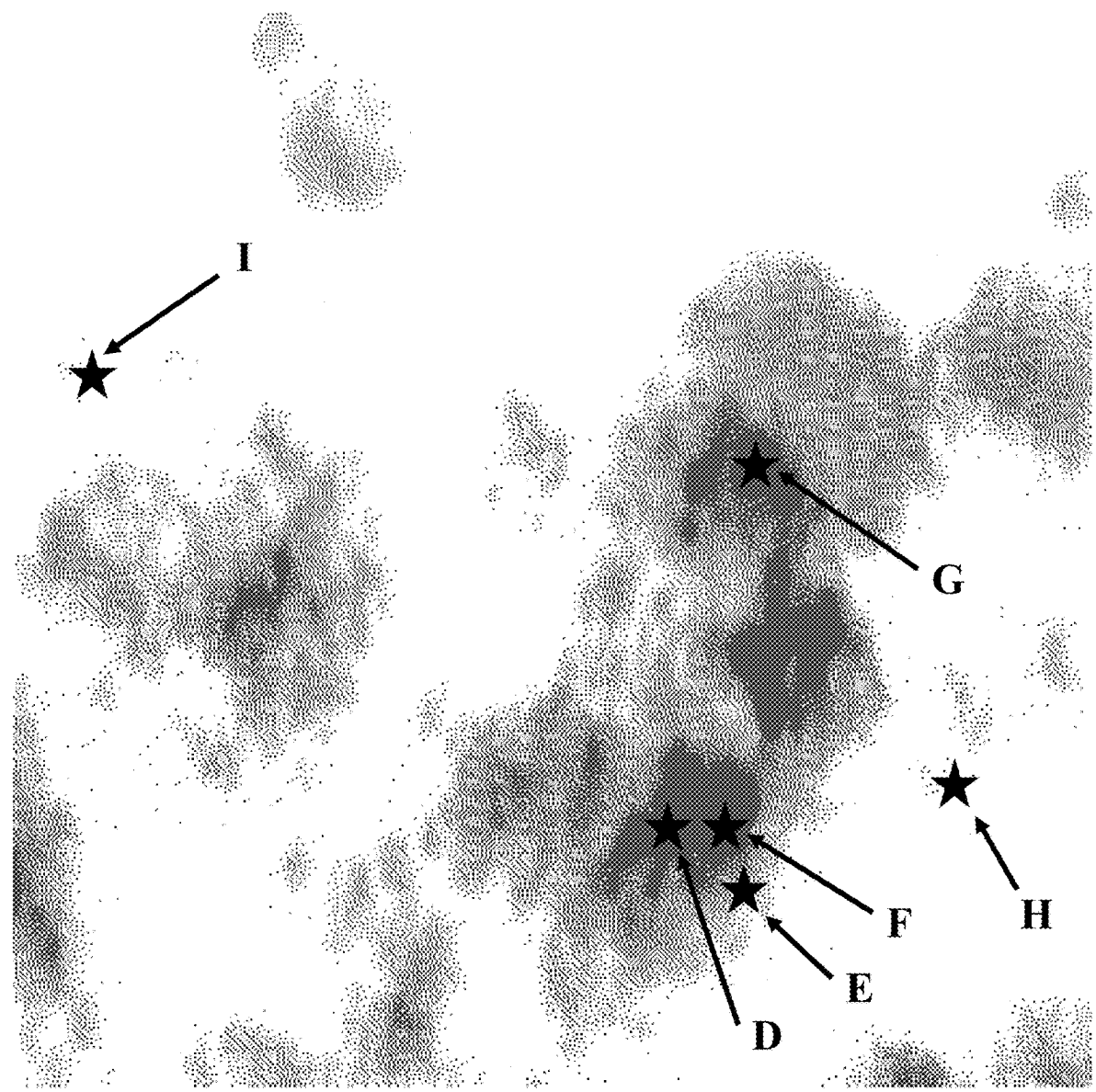
FIG. 13C shows another sample set of answers to a creativity and/or intelligence level assessment prompt compared to the sample representation of historical answers of FIG. 13A.

FIGS. 13B and 13C each show two-dimensional representations of sample answers provided by users charted or projected in the historical data chart or projection of FIG. 13A with the answers in FIG. 13C having a higher originality score than the answers in FIG. 13B. In FIGS. 13B and 13C, the two-dimensional representations of answers provided by the users are shown with stars. FIG. 13B shows an answer set with three unique answers A, B, and C. In FIG. 13B, all three answers A, B, and C are contained in an area in the historical data chart or projection with high density. FIG. 13C shows an answer set with six unique answers D, E, F, G, H, and I. In FIG. 13C, answers D, F, and G are in areas in the historical data chart or projection with high density, answer E is in an area in the historical data chart or projection with medium density, and answer H and I are in areas in the historical data chart or projection with low density. In the embodiment where the Assessment Engine 102 generates an originality point score of 0 for answers in high density areas, an originality point score of 1 for answers in medium density areas, and an originality point score of 2 for answers in low density areas, the answer set shown in FIG. 13B would receive an overall originality point score of 0 (e.g., 3*0+0*1+0*2) and the answer set shown in FIG. 13C would receive an overall originality point score of 5 (e.g., 3*0+1*1+2*2).

In the illustrated embodiment of FIGS. 13A-13C, a single two-dimensional chart or projection is generated to represent the n-dimensional historical and user answers to a creativity and/or intelligence evaluation prompt. Such a two-dimensional chart or projection may represent a single two-dimensional view, projection, or perspective of the n-dimensional representations of each historical answer and each answer provided by the user. However, it will be appreciated by one of skill in the art that the Assessment Engine 102 may generate more than one two-dimensional representation of the answers to evaluate one or more answers provided by the user and generate an originality score for the answers provided by the user. For example, the Assessment Engine 102 may generate two or more different two-dimensional charts or projections representing the n-dimensional historical and user answers such that each two-dimensional chart or projection is a different view, projection, or perspective of the n-dimensional data representing the historical answers and the answers provided by the user. The Assessment Engine 102 may be further configured to generate an originality score for the answers provided by the user based on the multiple two-dimensional charts or projections. For example, the Assessment Engine 102 may be configured to generate an originality point score as described above for each answer for each two-dimensional representation and generate an overall originality point score for each answer that is an average, weighted average, sum, or other combination of the generated originality point scores for each two-dimensional view, projection, or perspective of the answers. In other embodiments, the Assessment Engine 102 may be operable to compare the n-dimensional representations of the answers provided by a user without generating two-dimensional representations for each answer to generate the originality point score.

Figure 14A:
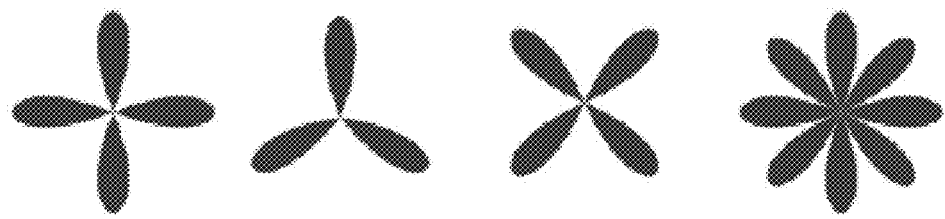
FIGS. 14A and 14B show sample answers to a creativity assessment having different originality scores.
Figure 14B:
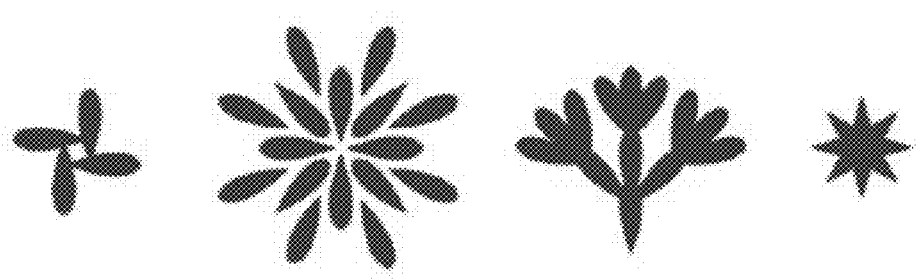

FIGS. 14A and 14B each show a set of four sample answers to prompt (using a petal-shaped Interactive Visualization Input 116, draw as many flowers as possible). The Assessment Engine 102 may be operable to automatically determine that the answers in FIG. 14B have a higher originality score than the answers provided in FIG. 14A. For example, the Assessment Engine 102 may compare the answers provided in FIGS. 14A and 14B to historical answers stored in the Storage 110 and determine that the answers in FIG. 14A are more common answers as they are radial designs emanating from a single point and that the answers in FIG. 14B are valid answers that are less common. Accordingly, the Assessment Engine 102 may generate a higher originality numerical value or point score for the answers in FIG. 14B than the answers in FIG. 14A. While the answers provided in FIG. 14B are shown as having a higher originality score than the answers provided in FIG. 14A, it will be appreciated that the originality scores may change due to the composition of historical answers. For example, over time, answers may be provided by other users such that the answers provided in FIG. 14A have the same originality score as the answers provided in FIG. 14B or such that the answers provided in FIG. 14A have a higher originality score than the answers provided in FIG. 14B.

In some embodiments, the Assessment Engine 102 may be operable to automatically generate an originality score for the answers provided by the user as a percentile rank compared to users with similar ages and/or educational levels. For example, the Assessment Engine 102 may generate an originality point value for the answers provided by the user as a sum of the point scores of each two-dimensional representation of the provided answer based on its proximity to historical answers in the historical data chart or projection and then compare or evaluate the generated originality point value against originality point values of users with similar ages and/or educational levels contained in a historical data set (e.g., stored in the Storage 110). The Assessment Engine 102 may then automatically generate an originality score for the answers provided by the user as a percentile rank of the generated originality point value for the user compared to the originality point values of users with similar ages and/or educational levels contained in the historical data set.

Referring back to FIG. 11, at step 412, an elaboration score for the answers provided by the user may be generated corresponding to the complexity of Interactive Visualization Inputs 116 arranged in each of the answers to the prompts. In some embodiments, the Assessment Engine 102 may be operable to automatically generate a numerical value or point score according to the elaboration of the answers provided by the user in the User Interface 108 to each prompt based on the number and/or complexity of Interactive Visualization Inputs 116 arranged in each of the user manipulable spaces, grids, sub-spaces, or sub-grids corresponding to each of the answers provided by the user. The Assessment Engine 102 may also be configured to automatically generate a numerical value or point score according to the elaboration of the answers generated by the Assessment Engine 102 based on inputs and/or uploads provided by the user. In certain embodiments, the Assessment Engine 102 may be operable to automatically calculate the number of Interactive Visualization Inputs 116, the number of types of Interactive Visualization Inputs 116, and/or the variation of Interactive Visualization Inputs 116 contained in each of the user manipulable spaces, grids, sub-spaces, or sub-grids corresponding to each of the answers provided by the user. In certain embodiments, the Assessment Engine 102 may be operable to automatically analyze each of the mathematical representations of answers and ignore, remove, or delete superfluous or duplicative Interactive Visualization Inputs 116 in each answer. For example, the Assessment Engine 102 may analyze each of the answers and ignore, remove, or delete the representations corresponding to Interactive Visualization Inputs 116 that are completely overlapped by other Interactive Visualization Inputs 116.

The Assessment Engine 102 may be operable to apply one or more calculation methods for generating the numerical point value to assign to the answers provided by the user based on the prompt. For example, the Assessment Engine 102 may be operable to automatically generate a numerical score or point value equal to the number of Interactive Visualization Inputs 116 contained in the answer, a numerical score or point value equal to the number of unique Interactive Visualization Inputs 116 or types of Interactive Visualization Inputs 116 provided in the answer, or a numerical score or point value that is weighted according to an average number of Interactive Visualization Inputs 116 provided to the prompt (which could be stored in or generated from historical data stored in the Storage 110).

In some embodiments, the Assessment Engine 102 automatically generates the elaboration point score as a count of the Interactive Visualization Inputs 116 arranged in each of the user manipulable spaces, grids, sub-spaces, or sub-grids. In other embodiments, the Assessment Engine 102 automatically generates the elaboration point score as a count of the Interactive Visualization Inputs 116 arranged in each of the user manipulable spaces, grids, sub-spaces, or sub-grids plus the time a user spent creating the designs, such as the time spent manipulating each petal, multiplied by a scaling factor or coefficient. In still further embodiments, the Assessment Engine 102 automatically generates the elaboration point score as a count of the Interactive Visualization Inputs 116 arranged in each of the user manipulable spaces, grids, sub-spaces, or sub-grids multiplied by a scaling factor if the Assessment Engine 102 determines that the intricacy of the answer is above a predetermined threshold. For example, if the Assessment Engine 102 determines that the intricacy of the answer is above a specific threshold, the Assessment Engine 102 may generate the elaboration score by multiplying the count of Interactive Visualization Inputs 116 by a given number, such as 2. The Assessment Engine 102 may automatically determine the intricacy of the answer based on the record of the process by which the user formed the answer and the purposeful amount of time that the user spent positioning, scaling, rotating, or otherwise manipulating each Interactive Visualization Input 116. The Assessment Engine 102 may automatically calculate the intricacy based on the amount of time the user actually spent placing or otherwise manipulating Interactive Visualization Inputs 116 to create each answer to the creativity and/or intelligence evaluation prompt. As such, the Assessment Engine 102 would ignore the time the user spent positioning, scaling, rotating, or otherwise manipulating an Interactive Visualization Input 116 that did not result in the ultimate configuration of the Interactive Visualization Input 116 or time that the user spent taking the creativity and/or intelligence evaluation without manipulating any Interactive Visualization Input 116. For example, the Assessment Engine 102 may ignore the time that the user spent moving an Interactive Visualization Input 116 without placing the Interactive Visualization Input 116 in the user manipulable space, grid, sub-space, or sub-grid.

The Assessment Engine 102 may also be operable to automatically generate one or more elaboration scores based on a combination of one or more calculation methods, in parallel and/or in series. For example, the Assessment Engine 102 may concurrently perform two or more calculation methods and determine the highest score, weight an overall score based on the multiple calculations, and/or generate multiple elaboration scores according to the different calculation methods.

In some embodiments, the Assessment Engine 102 may be operable to automatically generate an elaboration score for the answers provided by the user as a percentile rank compared to other users with similar ages and/or educational levels. For example, the Assessment Engine 102 may generate an overall elaboration point score for the answers provided by the user as a count of Interactive Visualization Inputs 116 contained in all of the answers provided by the user and then compare or evaluate the generated overall elaboration point score against overall elaboration point scores of users with similar ages and/or educational levels contained in a historical data set (e.g., stored in the Storage 110). The Assessment Engine 102 may then automatically generate an elaboration score for the answers provided by the user a percentile rank of the generated overall elaboration point score compared to the overall elaboration point score of users with similar ages and/or educational levels contained in the historical data set.

Figure 15:
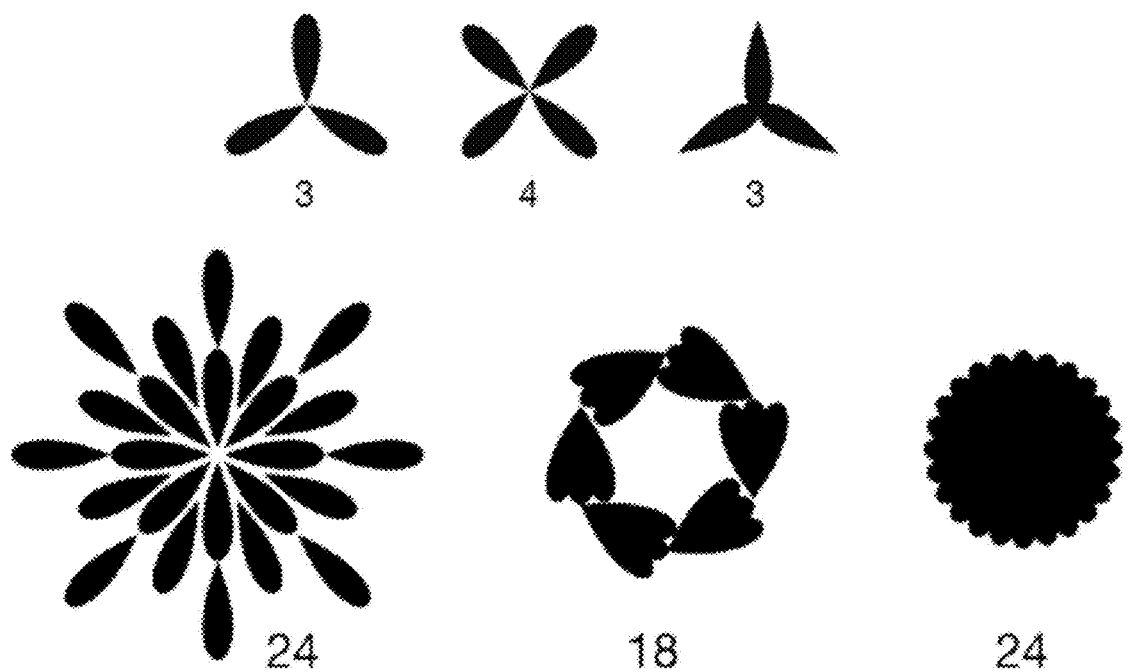
FIG. 15 shows sample answers to a creativity assessment having different elaboration scores.

FIG. 15 shows a set of six sample answers to a prompt (using a petal-shaped Interactive Visualization Input 116, draw as many flowers as possible). In some embodiments, the Assessment Engine 102 may be operable to generate a numerical value or point score based on the elaboration of each provided answer based on the number of Interactive Visualization Inputs 116 contained in each answer. For example, the Assessment Engine 102 may be operable to count the number of Interactive Visualization Inputs 116 in each answer to generate the following point scores based on the number of Interactive Visualization Inputs 116 in each answer: 3 for the top-left answer, 4 for the top-middle answer, 3 for the top-right answer, 24 for the bottom-left answer, 18 for the bottom-middle answer, and 24 for the bottom-right answer.

Figure 16A:
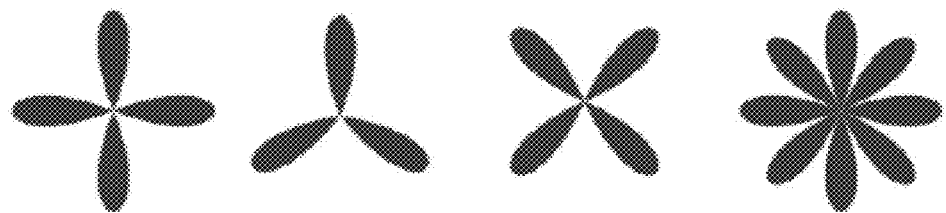
FIGS. 16A and 16B show examples of answers to a creativity assessment having different flexibility scores.
Figure 16B:
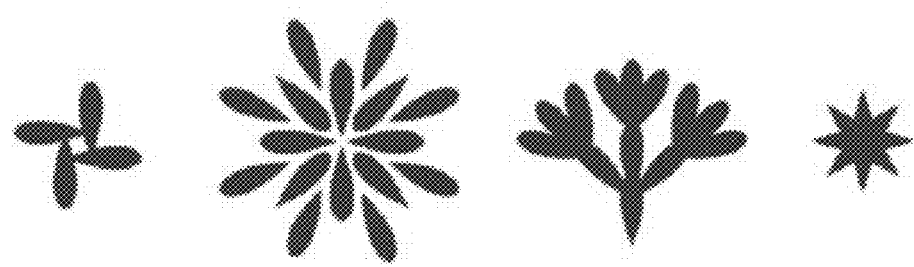

Referring back to FIG. 11, at step 414, a flexibility score for the answers provided by the user may be generated corresponding to the variation in arrangement and/or manipulation of Interactive Visualization Inputs 116 in the answers to each prompt. In some embodiments, the Assessment Engine 102 may be operable to automatically generate a numerical value or point score according to the flexibility of the answers provided by the user in the User Interface 108 in each of the user manipulable spaces, grids, sub-spaces, or sub-grids or generated by the Assessment Engine 102 based on answers input and/or uploaded by the user to the User Interface 108, Assessment Engine 102, and/or Client 114 corresponding to each of the answers provided by the user to the particular prompt. In certain embodiments, the Assessment Engine 102 may be operable to compare or evaluate each answer contained in one of the user manipulable spaces, grids, sub-spaces, or sub-grids against the other answers provided in the other user manipulable spaces, grids, sub-spaces, or sub-grids to evaluate how similar or different each particular answer is from the other answers provided by the user. The Assessment Engine 102 may be operable to automatically compare and/or contrast the answers to each prompt according to one or more methods to determine the similarities and/or differences. For example, FIGS. 16A and 16B each show four sample answers to a prompt (using a petal-shaped Interactive Visualization Input 116, draw as many flowers as possible). The Assessment Engine 102 may be operable to automatically determine that the answers in FIG. 16B have a higher flexibility score than the answers provided in FIG. 16A as the answers in FIG. 16A are all radial flowers that emanate from a single, center point whereas the answers in FIG. 16B are flowers with different designs and/or structures. The Assessment Engine 102 may be operable to apply any suitable one or more calculation methods for generating the numerical value or point score according to the flexibility of the answers provided by the user. In certain embodiments, the Assessment Engine 102 may implement a neural network trained from historical data, a comparison to stored data or a database, such as stored in the Storage 110, historical answers to the prompt, or other deep learning algorithms known to persons skilled in the art to determine the flexibility of the answers provided by the user. For example, the Assessment Engine 102 may be operable to generate a numerical score or point value to the answers equal to the number of unique designs contained in the answers provided by the user, a numerical score or point value that is weighted according to the average number of design or answer types provided to the prompt (which could be stored in or generated from historical data stored in the Storage 110), or a numerical score or point value according to the number of manipulated Interactive Visualization Inputs 116 not contained in the other answers provided by the user. The Assessment Engine 102 may also be operable to automatically generate one or more flexibility scores based on a combination of one or more calculation methods, in parallel and/or in series. For example, the Assessment Engine 102 may concurrently perform two or more calculation methods and determine the highest score, weight an overall score based on the multiple calculations, and/or generate multiple flexibility scores according to the different calculation methods.

In some embodiments, the Assessment Engine 102 may be operable to automatically generate an overall flexibility point score for the answers provided by a user based on the n-dimensional mathematical representation of each answer generated by the Assessment Engine 102. The Assessment Engine 102 may automatically generate two-dimensional representations of each n-dimensional mathematical representation of each answer as described above, such as described in FIGS. 10A-10B and 13A-13C. The Assessment Engine 102 may then be operable to automatically generate an overall flexibility point score for the provided answers as a count of unique clusters of two-dimensional representations for the provided answers. For example, referring back to FIGS. 13B and 13C, the Assessment Engine 102 may generate an overall flexibility point score of 1 for the answers provided in FIG. 13B as answers A, B, and C are all contained in a single cluster and the Assessment Engine 102 may generate an overall flexibility point score of 4 for the answers provided in FIG. 13C as answers D, E, and F are in a cluster and answers G, H, and I are each in unique areas in the chart or projection.

In the illustrated embodiment of FIGS. 13A-13C, a single two-dimensional chart or projection is generated to represent the n-dimensional historical and user answers to a creativity and/or intelligence evaluation prompt. Such a two-dimensional chart or projection may represent a single two-dimensional view, projection, or perspective of the n-dimensional representations of each historical answer and each answer provided by the user. However, it will be appreciated by one of skill in the art that the Assessment Engine 102 may generate more than one two-dimensional representation of the answers to evaluate one or more answers provided by the user and generate a flexibility score for the answers provided by the user. For example, the Assessment Engine 102 may generate two or more different two-dimensional charts or projections representing the n-dimensional historical and user answers such that each two-dimensional chart or projection is a different view, projection, or perspective of the n-dimensional data representing the historical answers and the answers provided by the user. The Assessment Engine 102 may be further configured to generate a flexibility score for the answers provided by the user based on the multiple two-dimensional charts or projections. For example, the Assessment Engine 102 may be configured to generate a flexibility point score as described above for each answer for each two-dimensional representation and generate an overall flexibility point score for each answer that is an average, weighted average, sum, or other combination of the generated flexibility point scores for each two-dimensional view, projection, or perspective of the answers. In other embodiments, the Assessment Engine 102 may be operable to compare the n-dimensional representations of the answers provided by a user without generating two-dimensional representations for each answer to generate the flexibility point score.

In some embodiments, the Assessment Engine 102 may be operable to automatically generate a flexibility score for the answers provided by the user as a percentile rank compared to other users with similar ages and/or educational levels. For example, the Assessment Engine 102 may generate a flexibility point value for the answers provided by the user as a count of unique answer clusters provided by the user when the answers are represented in two-dimensional form in a data chart or projection and then compare or evaluate the generated flexibility point value against flexibility point values of other uses with similar ages and/or educational levels contained in a historical data set (e.g., stored in the Storage 110). The Assessment Engine 102 may then automatically generate a flexibility score for the answers provided by the user as a percentile ranks of the generated flexibility point value for the user compared to the flexibility point values of users with similar ages and/or educational levels contained in the historical data set.

At step 416, a creativity and/or intelligence evaluation value or point score may be generated based on the answers provided by the user to the creativity and/or intelligence evaluation prompts. In some embodiments, the Assessment Engine 102 may be operable to automatically generate an overall numerical value or point score for the creativity and/or intelligence evaluation based on the answers provided by the user in the User Interface 108 to the one or more prompts or generated by the Assessment Engine 102 based on inputs and/or uploads provided by the user. The Assessment Engine 102 may be operable to automatically implement one or more methods for calculating and generating the overall numerical value or point score for the creativity and/or intelligence evaluation. In certain embodiments, the Assessment Engine 102 may automatically add or combine the generated numerical values or point scores from each of steps 408 through 414 to generate the overall numerical value or point score for the creativity and/or intelligence evaluation. In other embodiments, the Assessment Engine 102 may generate the overall numerical value or point score by weighting one or more of the generated numerical values or point scores from steps 408 through 414, such as the originality, elaboration, and/or flexibility scores generated in the preceding steps. The Assessment Engine 102 may also automatically generate the overall numerical value or point score based on multiple values or point scores generated in steps 408 through 414. The Assessment Engine 102 may also automatically generate the overall numerical value or point score based on any suitable factors, such as the user's age, educational level, reading level, computer proficiency level, or any other suitable factor, such as, but not limited to, weighting a numerical value or point score according to the age and/or educational grade or level of the user. The Assessment Engine 102 may also be operable to automatically generate one or more creativity and/or intelligence evaluation values or point scores based on a combination of one or more calculation methods, in parallel and/or in series. For example, the Assessment Engine 102 may concurrently perform two or more calculation methods and determine the highest score, weight an overall score based on the multiple calculations, and/or generate multiple creativity and/or intelligence evaluation scores according to the different calculation methods.

The Assessment Engine 102 may generate the creativity and/or intelligence point score as a sum, weighted sum, average, or weighted average of one or more of the fluency score, originality score, elaboration score, and flexibility score. In some embodiments, the Assessment Engine 102 may automatically generate the creativity and/or intelligence point score as an average of the originality score and the highest two scores of the fluency, elaboration, and flexibility scores. For example, in an embodiment where the fluency, originality, elaboration, and flexibility scores are determined as rankings or percentile values compared to similar users, the Assessment Engine 102 may generate the following scores for a user: fluency score of 87%, originality score of 93%, elaboration score of 51%, and flexibility score of 90%. The Assessment Engine 102 would then calculate a creativity and/or intelligence point score as 90% as the average of 93% (the originality score), 90% (the flexibility score, the highest non-originality score), and 87% (the fluency score, the second-highest non-originality score). However, it will be appreciated that the Assessment Engine 102 may generate the creativity and/or intelligence point score according to other formulas. For example, the Assessment Engine 102 may generate the creativity and/or intelligence point score as an average of the originality score and the highest single other score, an average of the highest two scores, or an average of the highest three scores, or an average of all four scores.

At step 418, a creativity and/or intelligence evaluation level output may be generated corresponding to a creativity and/or intelligence level of the user. In some embodiments, the Assessment Engine 102 may be operable to automatically generate the creativity and/or intelligence evaluation level output corresponding to the creativity and/or intelligence level of the user based on the overall numerical value or point score for the creativity and/or intelligence evaluation generated in step 416. The Assessment Engine 102 may automatically calculate and generate the creativity and/or intelligence evaluation level based on the overall numerical value or point score for the creativity and/or intelligence evaluation generated in step 416 according to one or more calculation methods. The Assessment Engine 102 may be operable to implement a neural network trained from historical data, a comparison to stored data or a database, such as stored in the Storage 110, or other deep learning algorithms known to persons skill in the art to automatically generate the creativity and/or intelligence evaluation level output corresponding to the creativity and/or intelligence evaluation generated in step 416. For example, the Assessment Engine 102 may compare the overall numerical value or point score to historical numerical values or point scores, such as scores stored in the Storage 110, corresponding to known creativity and/or intelligence levels to determine a creativity and/or intelligence level output for the user. In other embodiments, the Assessment Engine 102 may be operable to calculate the creativity and/or intelligence level output of the user based on the one or more creativity and/or intelligence evaluation scores generated in step 416. For example, the Assessment Engine 102 may be operable to apply a suitable weight or scale to the creativity and/or intelligence evaluation scores to generate the creativity and/or intelligence level output. In some embodiments, the Assessment Engine 102 may generate the creativity and/or intelligence evaluation level output as a percentile rank of the creativity and/or intelligence point score of the user compared to the creativity and/or intelligence point scores of other similar users, such as other users with similar ages and/or educational levels.

In certain embodiments, the Assessment Engine 102 may be operable to automatically implement more than one calculation method for generating the creativity and/or intelligence evaluation level output. For example, the Assessment Engine 102 may be operable to implement more than one method for generating one or more of the fluency score, originality score, elaboration score, flexibility score, creativity score, and creativity evaluation score. In further embodiments, the Assessment Engine 102 may be operable to implement one or more of the calculation methods in parallel.

In some embodiments, the Assessment Engine 102 may be operable to update or dynamically adjust the one or more calculation methods for generating one or more of the fluency score, originality score, elaboration score, flexibility score, creativity score, creativity evaluation score, and creativity evaluation level output based on one or more inputs, such as historical user test data. In certain embodiments, the Assessment Engine 102 may be operable to automatically update the one or more calculation methods in near time or near-real time. For example, the Assessment Engine 102 may be operable to implement a neural network with a node hierarchy and node parameters that may be altered or adjusted according to additional answers provided by users. In certain embodiments, the Assessment Engine 102 may be operable to alter the calculation or weighting methods for generating one or more of the fluency score, originality score, elaboration score, flexibility score, creativity score, creativity evaluation score, and creativity evaluation level output based on additional answers provided by users. For example, the Assessment Engine 102 may store additional user responses in the Storage 110 which may be used to adjust the algorithm or methodology by which the Assessment Engine 102 generates an originality score, such as by using the additional responses to update the frequency determination of a particular answer or the weighting to assign a particular score.

Figure 17:
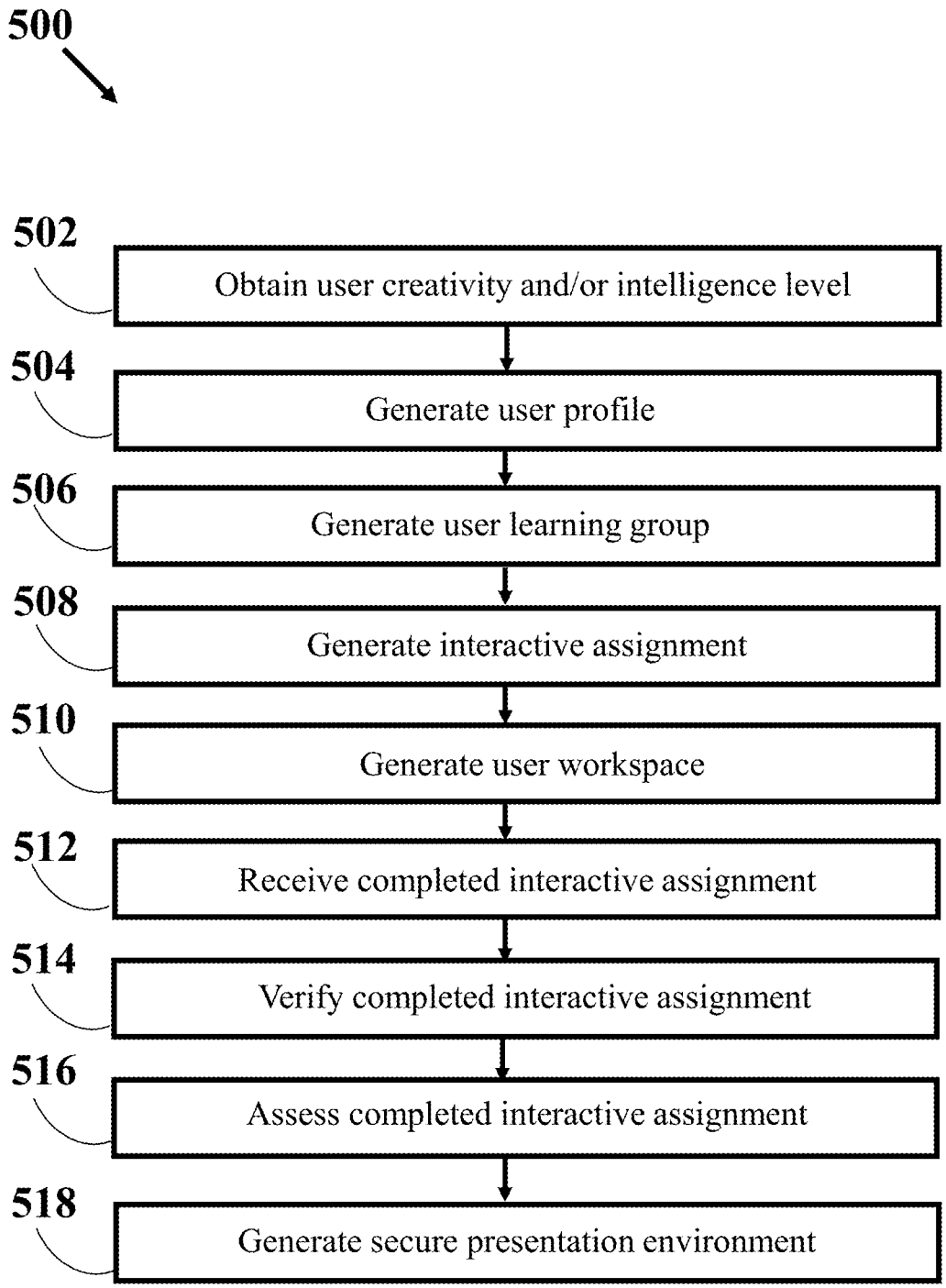
FIG. 17 shows an exemplary method for enhancing a user's creativity.

FIG. 17 shows steps according to an exemplary method 500 for enhancing the creativity and/or intelligence of a user. It will be appreciated that the illustrated method and associated steps may be performed in a different order, with illustrated steps omitted, with additional steps added, or with a combination of reordered, combined, omitted, or additional steps. The steps may be implemented in one or more computer readable instructions, such as by the Assessment Engine 102.

At step 502, a user creativity and/or intelligence level of a user may be received or obtained. The creativity and/or intelligence level may be the creativity and/or intelligence evaluation level output corresponding to the creativity and/or intelligence level of a user generated in step 418. In some embodiments, the Assessment Engine 102 may be operable to automatically receive, obtain, or generate a creativity and/or intelligence level of a user. The Assessment Engine 102 may receive or obtain the creativity and/or intelligence level of the user from the User Interface 108, Storage 110, or Network 112 or the Assessment Engine 102 may be operable to generate the creativity and/or intelligence level of the user, such as shown in FIGS. 3, 5, and 11.

At step 504, a user profile may be generated for the user based, in part, on the user creativity and/or intelligence level of the user. The user profile may contain additional personal information about the user including, but not limited to, the age, primary or native language, educational level, interest areas, expression styles, and/or learning styles of the user. In some embodiments, the Assessment Engine 102 may be operable to generate the user profile for the user. In certain embodiments, the Assessment Engine 102 may be operable to automatically generate the user profile from data input by the user in the User Interface 108 via the input of one of the Clients 114. For example, the user may input his or her personal information though the User Interface 108 such as by selecting options from drop downs, typing in the information, selecting check-boxes, or any other suitable manner. In other embodiments, the Assessment Engine 102 may be operable to generate an assessment to obtain personal information of the user such as by evaluating the interest areas, expression styles, learning styles, or any other suitable factor of the user.

At step 506, a user learning group may be generated for the user. In some embodiments, the user may be linked to an administrative user, such as a teacher, depending on the generated user profile. In certain embodiments, the user may also be linked to one or more other users having similar user profiles. For example, the user learning group may link users with similar creativity and/or intelligence levels, learning styles, expression styles, interest areas, educational levels, or any other suitable factors. However, in other embodiments, the user learning group may not contain other users and the user learning group may contain only the user and the administrative user. In some embodiments, the Assessment Engine 102 may be operable to automatically generate the user learning group. In some embodiments, the Assessment Engine 102 may be operable to generate the user learning group based on historical data, such as historical data stored in the Storage 110.

At step 508, an interactive assignment may be generated which may be unique to the user learning group. The interactive assignment may be a task or assignment designed or intended to enhance the creativity and/or intelligence level of the users of the user learning group. In certain embodiments, the Assessment Engine 102 may be operable to automatically generate the interactive assignment, such as based on the user profiles of the users in the user learning group. In other embodiments, the interactive assignment may be generated by the administrative user through the User Interface 108. For example, the Assessment Engine 102 may generate a unique interactive assignment or may select from one of a number of stored or historical interactive assignments, such as an interactive assignment stored in the Storage 110. The interactive assignment may ask the user learning group to answer one or more questions or complete one or more tasks which may enhance the creativity and/or intelligence of the users in the user learning group by answering the questions or completing the tasks. In still further embodiments, the interactive assignment may be generated by the Assessment Engine 102 and may be altered or edited by the administrative user through the User Interface 108.

In some embodiments, the Assessment Engine 102 may automatically generate the interactive assignment based on one or more of the fluency score, originality score, elaboration score, and flexibility score of a user and/or the user learning group. The Assessment Engine 102 may generate the interactive assignment to target one or more creativity and/or intelligence areas (e.g., fluency, originality, elaboration, and flexibility) that the user and/or user learning group scored lowly on in the creativity and/or intelligence evaluation. For example, the Assessment Engine 102 may generate an interactive assignment which tasks the user and/or user learning group to increase the total number of designs in response to prompts for users with low fluency scores, to increase the uniqueness of designs in response to prompts for users with low originality scores, to increase the complexity of designs in response to prompts for users with low elaboration scores, and increase the variation of designs in response to prompts for users with low flexibility scores.

At step 510, a user workspace may be generated for the interactive assignment for the user learning group to complete and resubmit the interactive assignment. The user workspace may be a space in which the users of the learning group may work on the interactive assignment and which facilitates communication and collaboration in a digital space over a network. In certain embodiments, the Assessment Engine 102 may be operable to automatically generate a user interactive space in the User Interface 108 in which the users in the user learning group may each work, either alone or in collaboration, to complete the interactive assignment. In some embodiments, the Assessment Engine 102 may be operable to generate a workspace interface in the User Interface 108 which allows the users of the user learning group to communicate to each other via the inputs of the Clients 114, such as via chat, call, video call, or other communication method. The users of the learning group may interact and/or communicate together via the Network 112, such as using the inputs of the Clients 114 in data communication with the Network 112.

At step 512, the completed interactive assignment may be received from one or more of the users in the user learning group. In some embodiments, the completed interactive assignment may be submitted by one or more of the users in the user learning group through the User Interface 108. In some embodiments, the Assessment Engine 102 is operable to automatically receive the completed interactive assignment such as from the User Interface 108, the Network 112, or one of the Clients 114.

At step 514, the completed interactive assignment may be verified. In some embodiments, the Assessment Engine 102 may be operable to verify that the received interactive assignment is complete. For example, the Assessment Engine 102 may be operable to automatically assess the received interactive assignment to determine that the received interactive assignment is complete, such as by assessing whether each section or question of the interactive assignment has been answered or completed and may be operable to confirm a digital signature generated on the completed interactive assignment, such as a time stamp. The Assessment Engine 102 may also be operable to automatically verify that the completed interactive assignment was not plagiarized or otherwise completed through cheating. For example, the Assessment Engine 102 may be operable to compare the completed interactive assignment against historical completed interactive assignments, such as completed interactive assignments stored in the Storage 110, to verify that the received completed interactive assignment is substantially unique and was not copied. In other embodiments, the completed interactive assignment may be verified by another user, such as the administrative user of the user learning group.

At step 516, the completed interactive assignment may be assessed or evaluated. In some embodiments, the Assessment Engine 102 may be operable to automatically assess or evaluate the completed interactive assignment. For example, the Assessment Engine 102 may be operable to read and interpret the completed interactive assignment to evaluate the completed interactive assignment, such as by comparing the completed interactive assignment to a predetermined answer key or set. In other embodiments, the completed interactive assignment may be assessed or evaluated by another user, such as the administrative user of the user learning group. For example, the administrative user may apply subjective standards for grading, weighting, or otherwise evaluating the completed interactive assignment.

In some embodiments, feedback may be generated and shared with the users of the user learning group. For example, the assessment or evaluation of the completed interactive assignment may be shared with the user learning group, such as through the User Interface 108 or via the Network 112. The assessment or evaluation may be generated and displayed in the User Interface 108 for the users of the user learning groups to view, such as via the display of the Client 114. In certain embodiments, one or more users of the user learning group may respond to the assessment or evaluation of the completed interactive assignment by editing or altering the completed interactive assignment in the User Interface 108 and resubmit the altered interactive assignment for further assessment or evaluation.

At step 518, a secure presentation environment may be generated to present or display the competed interactive assignment. The secure presentation environment may be automatically generated by the Assessment Engine 102 in the User Interface 108 such that the completed interactive assignment may be viewed by users via the display of one or more Clients 114 connected to the Network 112. One of the users, such as the administrative user, may select a display preference such that the completed interactive assignment may be displayed via the User Interface 108 to only specified users, such as users in the user learning group, the district, region, state, country, or other suitable group.

In some embodiments, the System 100 or Assessment Engine 102 may be operable to automatically generate reports or audits related to the creativity and/or intelligence evaluation and/or the creativity and/or intelligence enhancement of one or more users or user learning groups. For example, the System 100 or Assessment Engine 102 may be operable to generate reports confirming the completion of creativity and/or intelligence evaluation steps by a user, the receipt and/or completion of interactive assignments by one or more users or user learning groups, the verification of one or more completed interactive assignments, the assessment of one or more completed interactive assignments, the generation of one or more secure presentation environments, and/or the user access to one or more of the secure presentation environments.

While the embodiments discussed herein have been related to the systems and methods discussed above, these embodiments are intendent to be exemplary and are not intended to limit the applicability of these embodiments to only those discussed set forth herein. While the present invention has been illustrated by the description of embodiments thereof, and while the embodiments have been described in some detail, it is not the intention of the applicant to restrict or in any way limit the scope of the appended claims to such detail. Additional advantages and modifications will readily appear to those skilled in the art. Therefore, the invention in its broader aspects is not limited to the specific details, representative apparatus and methods, and illustrative examples shown and described. Accordingly, departures may be made from such details without departing from the spirit or scope of the applicant's general inventive concept.

The invention claimed is:

1. A method for evaluating a creativity level of a user, the method comprising the steps:
    generating a prompt;
    generating at least one interactive visualization input based on the prompt;
    receiving data indicative of a user's modification of the at least one interactive visualization input;
    generating a mathematical representation of the data with an assessment engine comprising a processor and a memory;
    generating a creativity evaluation score from the data; and
    generating a creativity evaluation level output based on the creativity evaluation score;
    wherein the step of generating the mathematical representation of the user input comprises determining a position and an orientation of each interactive visualization input in the data.

2. The method of claim 1, further including the step of determining whether the data is a valid answer to the prompt.

3. The method of claim 1, wherein the step of generating the creativity evaluation score comprises generating a fluency score based on the data.

4. The method of claim 1, wherein the step of generating the creativity evaluation score comprises generating an originality score based on the data.

5. The method of claim 1, wherein the step of generating the creativity evaluation score comprises generating an elaboration score based on the data.

6. The method of claim 1, wherein the step of generating the creativity evaluation score comprises generating a flexibility score based on the data.

7. The method of claim 1, wherein the step of generating the mathematical representation of the data comprises determining a scale of each interactive visualization input in the data.

8. The method of claim 1, wherein each interactive visualization input is a two-dimensional shape.

9. A system for testing a creativity level of a user:
    an assessment engine including a processor;
    a user interface;
    a storage;
    a client; and
    a network connecting the assessment engine, user interface, storage, and client;
    wherein the assessment engine is operable through the user interface to generate a creativity evaluation prompt, generate at least one interactive visualization prompt, and generate a mathematical representation of an answer to the creativity evaluation prompt;
    further wherein the assessment engine evaluates the mathematical representation of the answer, and generates a creativity level output; and
    wherein the mathematical representation of the answer to the creativity evaluation prompt comprises a mathematical representation of a position and an orientation of each interactive visualization element in the answer.

10. The system for testing a creativity level of a user according to claim 9, wherein the assessment engine is further operable to determine whether the answer is valid.

11. The system for testing a creativity level of a user according to claim 9, wherein the evaluation of the mathematical representation of the answer includes a fluency score.

12. The system for testing a creativity level of a user according to claim 9, wherein the evaluation of the mathematical representation of the answer includes an elaboration score.

13. The system for testing a creativity level of a user according to claim 9, wherein the evaluation of the mathematical representation of the answer includes an originality score.

14. A method for evaluating a creativity level of a user, the method comprising the steps:
    providing an assessment engine having a processor and a memory, wherein the memory contains instructions that, when executed by the processor, cause the processor to perform acts comprising:
    generating a prompt;
    generating at least one interactive visualization input based on the prompt;
    receiving data indicative of a user's modification of the at least one interactive visualization input;
    generating a mathematical representation of the data;
    generating a creativity evaluation score from the data; and
    generating a creativity evaluation level output based on the creativity evaluation score;
    wherein the step of generating the mathematical representation of data comprises determining a scale of each interactive visualization input in the data.

15. The method of claim 14, further including the step of determining whether the data is a valid answer to the prompt.

16. The method of claim 14, wherein the step of generating the creativity evaluation score comprises generating a fluency score based on the data.

17. The method of claim 14, wherein the step of generating the creativity evaluation score comprises generating an originality score based on the data.

18. The method of claim 14, wherein the step of generating the creativity evaluation score comprises generating an elaboration score based on the data.

19. The method of claim 14, wherein the step of generating the creativity evaluation score comprises generating a flexibility score based on the data.

20. The method of claim 14, wherein each interactive visualization input is a two-dimensional shape.

\* \* \* \* \*